United States Patent [19]

Tanaka

[11] Patent Number: 4,980,780

[45] Date of Patent: Dec. 25, 1990

[54] IMAGE FORMING SYSTEM

[75] Inventor: Hidetake Tanaka, Tokyo, Japan

[73] Assignee: Ricoh Company, Ltd., Tokyo, Japan

[21] Appl. No.: 393,692

[22] Filed: Aug. 14, 1989

[30] Foreign Application Priority Data

| Aug. 29, 1988 | [JP] | Japan | 63-214530 |
| Sep. 17, 1988 | [JP] | Japan | 63-233273 |
| Oct. 22, 1988 | [JP] | Japan | 63-266669 |
| Nov. 14, 1988 | [JP] | Japan | 63-287147 |
| Jun. 28, 1989 | [JP] | Japan | 1-167827 |

[51] Int. Cl.$^5$ ............................................. H04N 1/00
[52] U.S. Cl. ................................. 358/401; 358/408;
358/468; 358/296
[58] Field of Search .............. 358/401, 408, 468, 498,
358/296

[56] References Cited

U.S. PATENT DOCUMENTS

| 4,156,798 | 5/1979 | Doelz | 358/408 |
| 4,658,299 | 4/1987 | Tanaka et al. | 358/401 |

Primary Examiner—Edward L. Coles, Sr.
Attorney, Agent, or Firm—Cooper & Dunham

[57] ABSTRACT

An image forming system includes a printer main body and optional units coupled thereto through a serial communication line. Each of the optional units has its own device identification code. The printer system main body includes a table memory for storing logical identification codes each of which is assigned one of the device identification codes. Each of the optional units includes a memory for storing its own device identification code and the logical identification codes which has been assigned to its own device identification code, and a discerning circuit for discerning whether one of the logical identification codes sent from the printer main body is identical to its own assigned logical identification code stored in the memory. The printer main body receives paper from one of the optional units related to one of the logical identification codes sent by the printer main body, and ejects paper to one of the optional units related to one of the logical identification codes sent by the printer main body.

62 Claims, 40 Drawing Sheets

FIG. 3A

MEMORY (TABLE)

| LOGICAL ID | DEVICE ID |
|---|---|
| IN #1 | IN 0000 |
| IN #2 | IN 0010 |
| OUT #1 | OUT 0000 |
| OUT #2 | OUT 0010 |
| DPX #1 | DPX 0001 |

FIG. 3B

LOGICAL ID    OWN DEVICE ID

| IN #1 | IN 0000 |
|---|---|

FIG. 4A

| ARGUMENT | | | | | | | | OPERATOR | | | | | | | |
|---|---|---|---|---|---|---|---|---|---|---|---|---|---|---|---|
| $b_7$ | $b_6$ | $b_5$ | $b_4$ | $b_3$ | $b_2$ | $b_1$ | $b_0$ | $b_7$ | $b_6$ | $b_5$ | $b_4$ | $b_3$ | $b_2$ | $b_1$ | $b_0$ |
| 1 | 1 | 1 | x | x | x | x | x | ← | ID | → | x | x | x | x | x |

FIG. 4B

| ARGUMENT | | | | | | | | OPERATOR | | | | | | | |
|---|---|---|---|---|---|---|---|---|---|---|---|---|---|---|---|
| $b_7$ | $b_6$ | $b_5$ | $b_4$ | $b_3$ | $b_2$ | $b_1$ | $b_0$ | $b_7$ | $b_6$ | $b_5$ | $b_4$ | $b_3$ | $b_2$ | $b_1$ | $b_0$ |
| 1 | 1 | 1 | x | x | x | x | x | 1 | 1 | 0 | x | x | x | x | x |

GLOBAL ID    KIND OF INSTRUCTION

FIG.11A

| COMMAND | | | | | | | | | RESPONSE | | | | | | | |
|---|---|---|---|---|---|---|---|---|---|---|---|---|---|---|---|---|
| ARGUMENT | | | | | | | | OPERATOR | | | | | | | | |
| b7 | b6 | b5 | b4 | b3 | b2 | b1 | b0 | | b7 | b6 | b5 | b4 | b3 | b2 | b1 | b0 |

FIG.11B

ASSIGN DEVICE ID <ENHANCED COMMAND>

| 1 | 1 | 1 | x | DEVICE ID CODE | ***11001 | 0 | LOGICAL ID CODE | ASSIGN DEVICE ID CODE |

FIG.11C

INQUIRE ASSIGNED DEVICE ID <ENHANCED COMMAND>

| 1 | 1 | 1 | ///// | ///// | ***11010 | 0 | LOGICAL ID CODE | ASSIGN DEVICE ID CODE |

FIG.11D

INQUIRE DEVICE ID <ENHANCED COMMAND>

| 1 | 1 | 1 | x | DEVICE ID CODE | ***11011 | 0 | UNIT CODE | x | ASSIGN DEVICE ID CODE |

FIG.12A  b7 b6 b5 b4 b3 b2 b1 b0 | 1 | x | x | x | x | x | x | x |   ARGUMENT

FIG.12B  | 0 | x | x | x | x | x | x | x |   OPERATOR

FIG.12C  b7 b6 b5 b4 b3 b2 b1 b0 | 0 | x | x | x | x | x | x | x |   RESPONSE

FIG.12D  b7 b6 b5 b4 b3 b2 b1 b0 | 1 | 1 | 1 | 1 | 1 | 1 | 1 | 1 |   RESPONSE TO ILLEGAL COMMAND

FIG.12E  b7 b6 b5 b4 b3 b2 b1 b0 | 1 | x | x | x | x | x | x | x |   EVENT REPORT

FIG. 21

| b6 --- b0 | paper size | width | length | |
|---|---|---|---|---|
| 000 0000 | free size 1 | max. | auto. | :paper size undefined |
| 000 0001 | free size 2 | max. | max. (20 inches) | |
| 000 0010 | (A3) | 420mm | 297mm | |
| 000 0011 | A3 R | 297mm | 420mm | |
| 000 0100 | (B4) | 364mm | 257mm | |
| 000 0101 | B4 R | 257mm | 364mm | |
| 000 0110 | A4 | 297mm | 210mm | |
| 000 0111 | A4 R | 210mm | 297mm | |
| 000 1000 | B5 | 257mm | 182mm | |
| 000 1001 | B5 R | 182mm | 257mm | |
| 000 1010 | A5 | 210mm | 148mm | |
| 000 1011 | A5 R | 148mm | 120mm | |
| 000 1100 | B6 | 182mm | 128mm | |
| 000 1101 | B6 R | 128mm | 182mm | |
| 000 1110 | A6 | 148mm | 105mm | |
| 000 1111 | A6 R | 105mm | 148mm | |
| 001 0000 | (double letter) | $17^M$ | $11^M$ | |
| 001 0001 | double letter R | $11^M$ | $17^M$ | |
| 001 0010 | (legal) | $14^M$ | $8.5^M$ | |
| 001 0011 | legal R | $8.5^M$ | $14^M$ | |
| 001 0100 | government L.G. | $13^M$ | $8.5^M$ | |
| 001 0101 | government L.G. R | $8.5^M$ | $13^M$ | |
| 001 0110 | letter | $11^M$ | $8.5^M$ | |
| 001 0111 | letter R | $8.5^M$ | $11^M$ | |
| 001 1000 | government L.T. | $10.5^M$ | $8^M$ | |
| 001 1001 | government L.T. R | $8^M$ | $10.5^M$ | |
| 001 1010 | executive | $10.5^M$ | $7.25^M$ | |
| 001 1011 | executive R | $7.25^M$ | $10.5^M$ | |
| 001 1100 | half letter | $8.5^M$ | $5.5^M$ | |
| 001 1101 | half letter R | $5.5^M$ | $8.5^M$ | |
| 001 1110 | reserved | --- | --- | |
| 001 1111 | reserved | --- | --- | |

FIG.30A
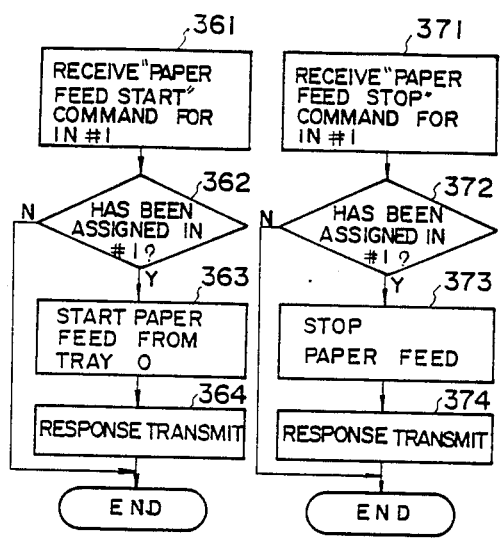
FIG.30B
FIG.30C
FIG.30D
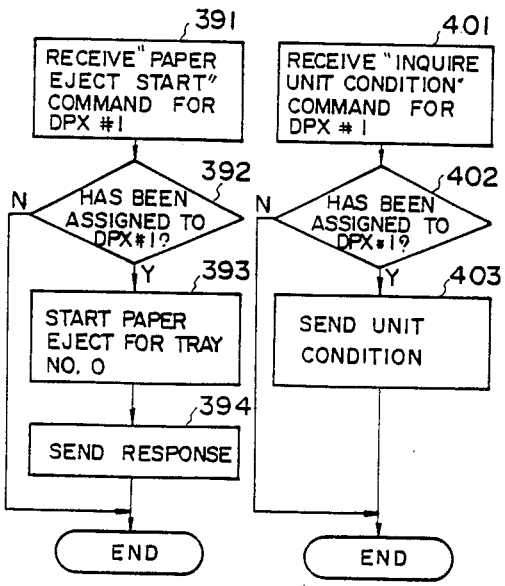
FIG.30E
FIG.30F

FIG. 31A

| HOST SYSTEM | PRINTER MAIN BODY | EACH OPTIONAL UNIT |
|---|---|---|
| ASSIGN IN0000 TO IN #1 (11000000,00011100) → | | |
| | ASSIGN IN 0000 TO IN #1 (00000000) → | |
| | | → IN0000 SENDS ACCEPTANCE (00000000) |
| | ← (111X0000,00011001) | |
| ← END OF ASSIGNING IN0000 TO IN #1 (00000000) | | |
| ASSIGN IN0010 TO IN #2 (10010010,00011100) → | | |
| | ASSIGN IN0010 TO IN #2 (00010010) → | |
| | | → IN0010 SENDS ACCEPTANCE (00010010) |
| | ← (111X0010,00111001) | |
| ← END OF ASSIGNING IN0010 TO IN #2 (00010010) | | |
| ASSIGN OUT0000 TO OUT #1 (11000000,00011100) → | | |
| | ASSIGN OUT0000 TO OUT #1 (01000000) → | |
| | | → OUT0000 SENDS ACCEPTANCE (01000000) |
| | ← (111X0000,10011001) | |
| ← END OF ASSIGNING OUT0000 TO OUT #1 (01000000) | | |
| ASSIGN OUT0010 TO OUT #2 (11010010,00011100) → | | |
| | ASSIGN OUT0010 TO OUT #2 (01010010) → | |
| | | → OUT0010 SENDS ACCEPTANCE (01010010) |
| | ← (111X0010,10111001) | |
| ← END OF ASSIGNING OUT0010 TO OUT #2 (01010010) | | |
| ASSIGN DPX0001 TO DPX #1 (10100001,00011100) → | | |
| | ASSIGN DPX0001 TO DPX #1 (00100001) → | |
| | | → DPX0001 SENDS ACCEPTANE (00100001) |
| | ← (111X0001,01011001) | |
| ← END OF ASSIGNING DPX0001 TO DPX #1 (00100001) | | |

FIG. 31B

| HOST SYSTEM | PRINTER MAIN SYSTEM | EACH OPTIONAL UNIT |
|---|---|---|
| SELECT TRAY#0 IN IN#1 | (INPUT TRAY SELECTION) — <br> SELECT TRAY#0 IN IN#1 (TRAY SELECTION) — <br> —IN#1 SENDS ACCEPTANCE(UNIT CONDITION VECTOR) | |
| —END OF SELECTION | (INPUT TRAY STATUS) | |
| SELECT TRAY#0 IN DPX#1 | (OUTPUT TRAY SELECTION)— <br> SELECT TRAY#0 IN DPX#1 (TRAY SELECTION)— <br> —DPX#1 SENDS ACCEPTANCE(UNIT CONDITION VECTOR) | |
| —END OF SELECTION | (OUTPUT TRAY STATUS) | |
| PAPER FEED START (FEED START)— <br> —ACCEPTANCE(PAPER ID) | | |
| | PAPER FEED START FOR IN#1 (PAPER FEED START)— <br> —IN#1 SENDS RESPONSE (UNIT CONDITION VECTOR) | |
| —EVENT REPORT OF FEED STARTED (EVENT REPORT #0) | | |
| | PAPER FEED STOP FOR IN #1 (PAPER FEED STOP)— <br> —IN#1 SENDS RESPONSE (UNIT CONDITION VECTOR) | |
| —EVENT REPORT OF PRINT START READY (EVENT REPORT #0) | | |
| PRINT START (PRINT START)— <br> —ACCEPTANCE (PAPER ID) | | |
| | PAPER FEED RESTART FOR IN#1(PAPER FEED RESTART) <br> —IN#1 SENDS RESPONSE (UNIT CONDITION VECTOR) | |
| <<<<< IMAGE FORMING >>>>> | | |
| | PAPER FEED STOP IN#1 (PAPER FEED STOP) — <br> —IN#1 SENDS RESPONSE( UNIT CONDITION VECTOR ) | |
| | PAPER EJECT START FOR DPX#1(PAPER EJECT START)— <br> —DPX#1 SENDS RESPONSE( UNIT CONDITION VECTOR) | |
| | PAPER EJECT END FOR DPX#1(PAPER EJECT END) — <br> —DPX#1 SENDS RESPONSE(UNIT CONDITION VECTOR) | |
| —EVENT REPORT OF EJECTED PAPER ID (EVENT REPORT #24) | | |

FIG. 31C

| HOST SYSTEM | PRINTER MAIN BODY | EACH OPTIONAL UNIT |
|---|---|---|
| SELECT TRAY#0 IN DPX#1 | (INPUT TRAY SELECTION) — | |
| | SELECT TRAY#0 IN DPX#1 (TRAY SELECTION) — | |
| | — DPX 1 SEND ACCEPTANCE(UNIT CONDITION VECTOR) | |
| — END OF SELECTION | (INPUT TRAY STATUS) | |
| SELECT TRAY#2 IN OUT#2 (OUTPUT TRAY SELECTION) | | |
| | SELECT TRAY#2 IN OUT#2 (TRAY SELECTION) — | |
| | — OUT#2 SENDS ACCEPTANCE(UNIT CONDITION VECTOR) | |
| — END OF SELECTION | (OUTPUT TRAY STATUS) | |
| PAPER FEED START(FEED START) — | | |
| — ACCEPTANCE (PAPER ID) | | |
| | PAPER FEED START FOR DPX#1 (PAPER FEED START) | |
| | DPX#1 SENDS RESPONSE (UNIT CONDITION VECTOR) | |
| — EVENT REPORT OF FEED STARTED (EVENT REPORT #0) | | |
| | PAPER FEED STOP FOR DPX#1 (PAPER FEED STOP) — | |
| | — DPX#1 SENDS RESPONSE (UNIT CONDITION VECTOR) | |
| — EVENT REPORT OF PRINT START READY (EVENT REPORT #0) | | |
| PRINT START (PRINT START) — | | |
| — ACCEPTANCE (PAPER ID) | | |
| | PAPER FEED RESTART FOR DPX#1(PAPER FEED RESTART) | |
| | DPX#1 SENDS RESPONSE (UNIT CONDITION VECTOR) | |
| | <<<<< IMAGE FORMING >>>>> | |
| | PAPER FEED STOP FOR DPX#1 (PAPER FEED STOP) — | |
| | DPX#1 SENDS RESPONSE (UNIT CONDITION VECTOR) | |
| | PAPER EJECT START OUTX#2 (PAPER EJECT START) — | |
| | — OUT#2 SENDS RESPONSE (UNIT CONDITION VECTOR) | |
| | PAPER EJECT END FOR OUT#2 (PAPER EJECT END) — | |
| | — OUT#2 SENDS RESPONSE(UNIT CONDITION VECTOR) | |
| — EVENT REPORT OF EJECTED PAPER ID (EVENT REPORT #24) | | |

FIG. 35A

| | | INPUT UNIT (00) | | | DUPLEX UNIT (01) | | OUTPUT UNIT (10) | | | |
|---|---|---|---|---|---|---|---|---|---|---|
| CONTROL-LER | PRINT ENGINE | | | | DEVICE ID | | | | | |
| | | 0000 | 0001 | 0010 | 0000 | 0001 | 0000 | 0001 | 0010 | 0011 |
| 3. INQUIRE ASSIGNED DEVICE ID | | ASSIGNED 001 ACTIVE | NOT ASSIGNED ACTIVE | ASSIAGED 000 INACTIVE | NOT ASSIGNED INACTIVE | ASSIGNED 010 ACTIVE | NOT ASSIGNED INACTIVE | ASSIGNED 100 ACTIVE | NOT ASSIGNED ACTIVE | ASSIGNED 101 INACTIVE |

1000XXXX, ID_H
(LOGICAL 000 ?)
→
00000010
(LOGICAL 000 IS IN0010)
1001XXXX, ID_H
(LOGICAL 001 ?)
→
00010000
(LOGICAL 001 IS IN0000)

FIG. 35

| FIG. 35A |
|---|
| FIG. 35B |

FIG. 38
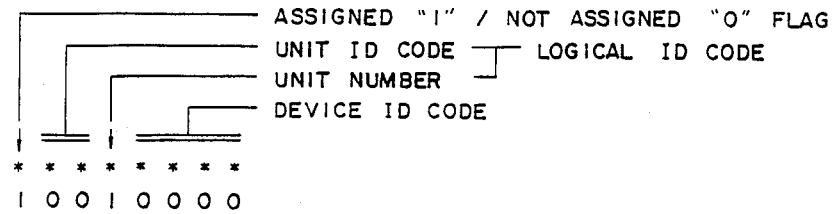
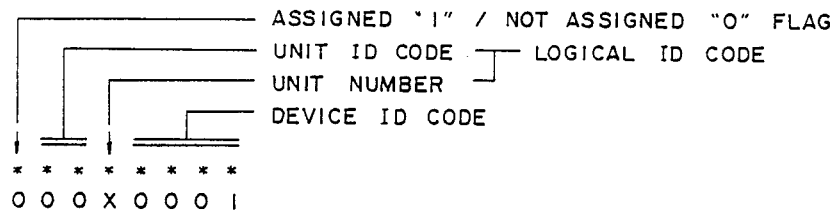
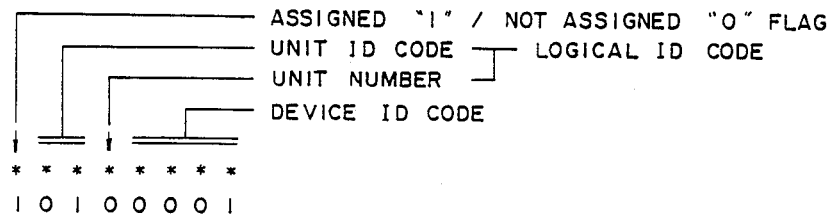
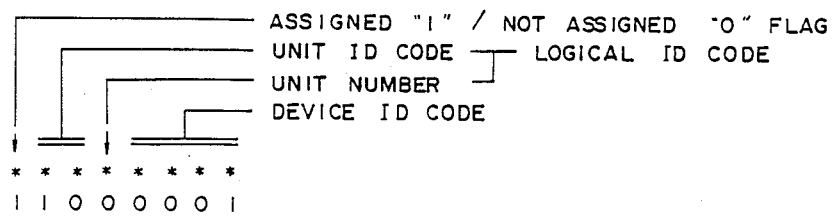
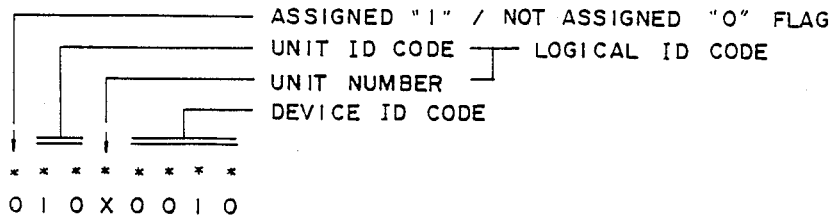

IMAGE FORMING SYSTEM

BACKGROUND OF THE INVENTION

The present invention generally relates to an image forming system, and particularly to an image forming system related to a printer system such as a laser beam printer, a light-emitting device (LED) printer, a liquid crystal shutter printer or an ink jet printer, or related to a high performance copier or a high performance facsimile machine.

Currently, an image forming system is formed as "a system". Generally, an image forming system such as a laser beam printer is made up of a main body of the system (system main body), and various optional units which are detachably attached to the system main body. A system main body receives character code information or image information supplied from a host system coupled to the image forming system, and forms an image on a recording medium. A word processor, an office computer or a personal computer may be used as a host system. Another type of the system main body is known which directly receives image information from a host system. In this case, the image forming function is provided in the host system. Optional units are coupled to the system main body through respective interfaces. Those examples of optional units are a recording medium feed unit such as a large capacity paper feed unit or a multistage paper feed unit, a recording medium transporting unit such as a paper transporting unit for use in duplex print, and a recording medium eject unit such as a large capacity paper eject unit or a multistage paper eject unit.

Conventionally, every optional unit is independently designed. An interface between an optional unit and the system main body is different for different optional units. Further, each optional unit is connected to a system main body one by one in parallel form, as shown in FIG. 1.

In conventional image forming systems as mentioned above, all specifications related to the system main body and optional units connected thereto must be determined at an initial stage of system design. Additionally, there is no interchangeability between different optional units used in different image forming systems. Further, since every optional unit is connected to the system main body one by one, a limited number of optional units can be connected thereto. Once the system design is completed, the number of usable optional systems is limited. This is poor in flexibility and system expansion.

There has been proposed an image forming system which has a system main body capable of discriminating operable optional units connected thereto by using a registered identification code specifically assigned to each optional unit. However, the system main body cannot discriminate an optional unit having an identification code other than the registered identification codes. In other words, a command system employed in conventional image forming systems is lacking in flexibility and is not suitable for system expansion.

SUMMARY OF THE INVENTION

It is a general object of the present invention to provide a novel and useful image forming system in which the aforementioned disadvantages are eliminated.

A more specific object of the present invention to provide an image forming system in which various optional units can arbitrarily be connected to a system main body, and can be controlled by a common interface and a common protocol irrespective of the number of connected optional units. Thereby, an increased system flexibility can be obtained and the system can be expanded with ease.

Another object of the present invention is to provide an image forming system in which a system main body can simultaneously send every optional unit information in urgent cases so that the image forming system can immediately take necessary steps for dealing with the occurrence of a fault such as a paper jam.

The above objects of the present invention can be achieved by an image forming system comprising image forming means for receiving data from an external system and forming an image on a recording medium from the received data, optional units coupled to the image forming means, optional units including at least one recording medium feed unit feeding the recording medium to the image forming means, and at least one recording medium eject unit ejecting the recording medium supplied from the image forming means, and a serial signal line coupling the image forming means and the optional units, the serial signal line being in common with the optional units. The optional units have their own device identification codes. The image forming means includes table memory means for storing logical identification codes each being assigned one of the device identification codes, and serial communication means for communicating with the optional units through the serial signal line in serial form, the logical identification codes being sent to the serial signal line through the serial communication means. Each of the optional units includes memory means for storing its own device identification code and the one of the logical identification codes which has been assigned the its own device identification code, discerning means for whether one of the logical identification codes sent from the image forming means is identical to its own assigned logical identification code stored in the memory means, and serial communication means for communicating with the image forming means through the serial signal line in serial form. The image forming means receives the recording medium from one of the optional units related to one of the logical identification codes sent by the image forming means, and ejects the recording medium to one of the optional units related to one of the logical identification codes sent by the image forming means.

The aforementioned objects of the present invention can also be achieved by an image forming system comprising image forming means for receiving data from an external system and forming an image on a recording medium from the received data, optional units coupled to the image forming means, optional units including at least one recording medium feed unit feeding the recording medium to the image forming means, and at least one recording medium eject unit ejecting the recording medium supplied from the image forming means, and a serial signal line coupling the image forming means and the optional units, the serial signal line being in common with the optional units. The optional units have their own device identification codes. The image forming means includes generating means for generating a number of logical identification codes equal to a number of optional units which are coupled to the image forming means through the serial signal line, assigning means for assigning one or the logical identification codes one of the device identification codes, table memory means for storing the logical identification codes and the device identification codes to which the related logical identification code have been assigned by the assigning means, and serial communication means for communicating with the optional units through the serial signal line in serial form. The logical identification codes are sent to the serial signal line through the serial communication means. Each of the optional units includes memory means for storing its own device identification code and the one of the logical identification codes which has been assigned the its own device identification code, discerning means for whether one of the logical identification codes sent from the image forming means in identical to its own assigned logical identification code stored in the memory means, and serial communication means for communicating with the image forming means through the serial signal line in serial form. The image forming means receives the recording medium from one of the optional units related to one of the logical identification codes sent by the image forming means, and ejects the recording medium to one of the optional units related to one of the logical identification codes sent by the image forming means.

The aforementioned objects of the present invention can also be achieved by image forming system comprising image forming means for receiving data from an external system and forming an image on a recording medium from the received data, optional units coupled to the image forming means, optional units including at least one recording medium feed unit feeding the recording medium to the image forming means, and at least one recording medium eject unit ejecting the recording medium supplied from the image forming means, and a serial signal line coupling the image forming means and the optional units, the serial signal line being in common with the optional units. The optional units have their own device identification codes. The image forming means includes generating means for generating a number of logical identification codes equal to the number of optional units which are coupled to the image forming means through the serial signal line, assigning means for assigning one of the logical identification codes one of the device identification codes, table memory means for storing the logical identification codes and the device identification codes to which the related logical identification code have been assigned by the assigned means, serial communication means for communicating with the optional units through the serial signal line in serial form, the logical identification codes being sent to the serial signal line through the serial communication means, and command generating means for generating commands which instructs desired one or more optional units to execute predetermined operations. The commands are sent to the desired one or more optional units through the serial communication means and the serial signal line. Each of the optional units includes memory means for storing its own device identification code and the one of the logical identification codes which has been assigned the its own device identification code, discerning means for whether one of the logical identification codes sent from the image forming means is identical to its own assigned logical identification code stored in the memory means, serial communication means for communicating with the image forming means through the serial signal line in serial form, and interpreting means for interpreting the commands supplied from the image forming means. The image forming means receives the recording medium from one of the optional units related to one of the logical identification codes sent by the image forming means, and ejects the recording medium to one of the optional units related to one of the logical identification codes sent by the image forming means. Each of the optional units being controlled by the commands supplied from the image forming system.

Other objects, features and advantages of the present invention will become apparent from the following detailed description when read in conjunction with the accompanying drawings.

BRIEF DESCRIPTION OF THE DRAWINGS

FIG. 3A is a diagram of a memory table which stores logical ID codes and device ID codes assigned to the respective logical ID codes;

FIG. 3B is a diagram illustrating how to store the device ID code and the assigned logical ID code for each optional unit;

FIG. 4 is a diagram of examples of commands which are issued to each optional unit by a system main body;

FIG. 11 is a diagram of commands and responses used in the embodiment of the present invention;

FIG. 12 is a diagram of commands and responses used in communication between the controller and the print engine;

FIG. 21 is a view illustrating the relation between paper size codes and paper sizes;

FIGS. 22 through 25, 26A through 26C, 27A through 27C, 28, 29A and 30A through 30F are flowcharts of the entire printer system;

FIGS. 31A, 31B and 31C are diagrams illustrating how commands and responses are actually sent; and FIGS. 32 through 38 are views diagrams of examples showing how to actually use "inquire communication active device ID" command, "assign device ID" command, "inquire assigned device ID" command, and operation results which are stored in respective memories of the controller 21, the print engine and optional units.

DESCRIPTION OF THE PREFERRED EMBODIMENTS

A description is given of a preferred embodiment of the present invention.

Figure 1:
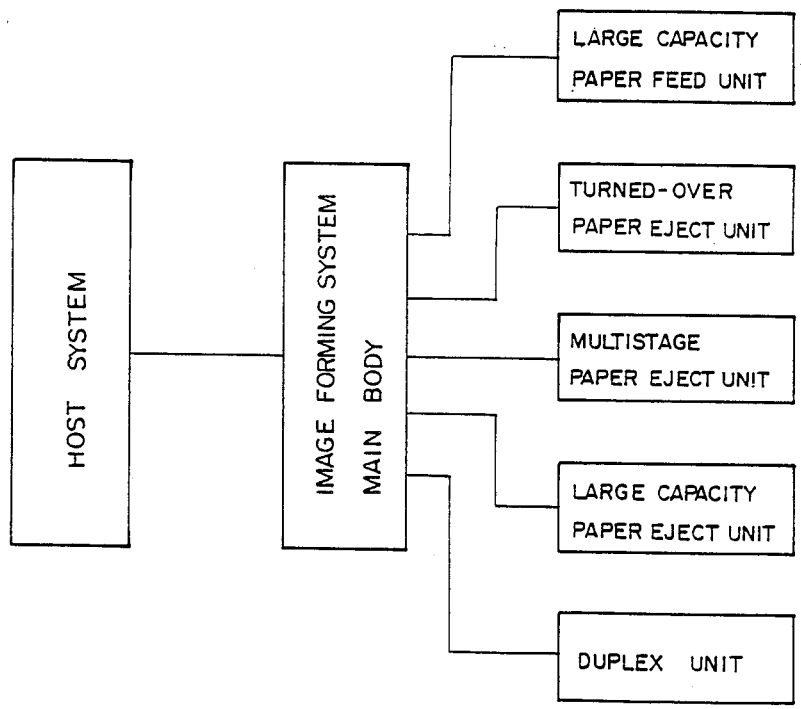
FIG. 1 is a block diagram of a conventional image forming system.
Figure 2:
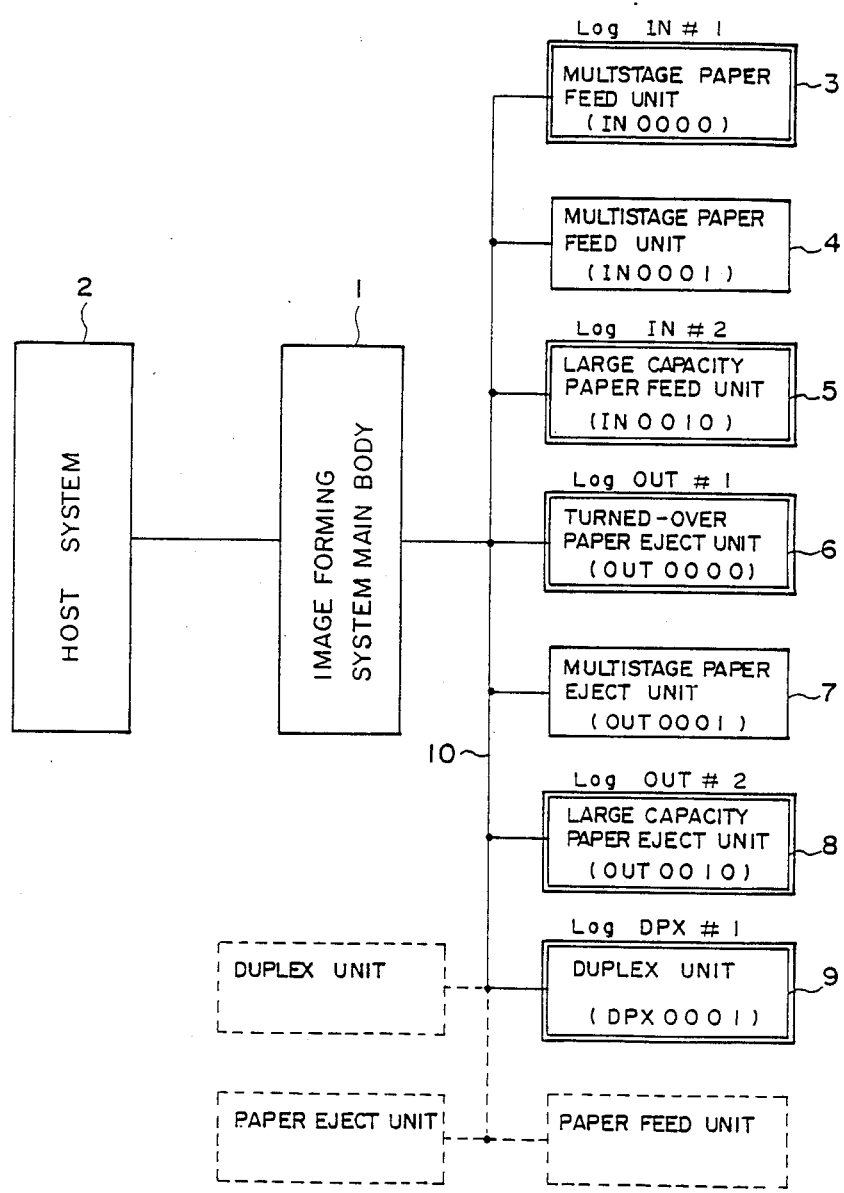
FIG. 2 is a block diagram of a fundamental structure of a printer system according to an embodiment of the present invention.

FIG. 2 is a block diagram of the fundamental structure of an image forming system according to a preferred embodiment of the present invention. The image forming system of the embodiment includes a system main body 1 and seven optional units 3 through 9, which are detachably attachable to the system main body 1. The system main body 1 is connected to a host system 2, and is supplied with character code information or image information therefrom. Then, the system main body 1 forms an image on a recording medium. The optional units 3 to 5 are recording medium feed units. For example, the optional units 3 and 4 are multistage paper feed units each having a plurality of trays, and the optional unit 5 is a large capacity paper feed unit. The optional units 6, 7 and 8, which serve as recording medium units, are a turned-over paper eject unit, a multistage paper eject having a plurality of trays, and a large capacity paper eject unit, respectively. The optional unit 9 is a paper transport unit for duplex print. A signal line 10 is provided in common with the optional units 3 to 9, and electrically connects the optional units 3 to 9 to the system main body 1 of the image forming system. Therefore, it is possible to further provide optional units as indicated by blocks of broken lines to thereby expand the system.

The system main body 1 can simultaneously handle a maximum of two optional paper feed units, a maximum of two optional paper eject units and a maximum of one optional transport unit for duplex print (hereinafter simply referred to a duplex unit). The simultaneous control by the system main body 1 denotes a state where the following three conditions are satisfied. First, the system main body 1 communicates with optional units and can process execution commands, inquire commands, selection commands, and so on. Second, feed, transport and eject of paper can be done by commands. Third, optional units are selected as transport paths of paper.

The system main body 1 has five logical identification codes (hereinafter simply referred to logical ID codes) as identification codes for controlling optional units. Every optional unit is classified into any of three types, that is, a paper feed unit, a paper eject unit and a duplex unit. The following logical ID codes are provided for the different types:

Optional paper feed units: IN#1, IN#2.
Optional paper eject unit: OUT#1, OUT#2,
Optional duplex unit: DPX#1

For example, the following bits are given to logical ID codes. That is, IN#1=000, IN#2=001, OUT#1=100, OUT#2=101, DPX#1(INP)=010, and DPX#1(OUT)=011. Each of the logical ID codes consists of three bits. High-order two bits among the three bits form a unit type code for identifying the type (IN, OUT, or DPX) of an optional unit of concern. The remaining low-order one bit forms a code for identifying a unit number (#1 or #2).

The system main body 1 has a serial communication function of sending the logical ID codes to the signal line 10. Normally, an image processing part and an image forming part which are included in the system main body 1, as well as the host system 2 can designate the optional units 3 to 9 by using the logical ID codes.

The optional units 3 to 9 have individual identification codes (hereinafter simply referred to device ID codes), and has a communication function of sending the respective device ID codes to the signal line 10. Further, each of the optional units 3 to 9 stores a 2-bit code, which identifies its own unit type in a similar manner as the logical ID codes include 2-bit unit type codes. Each optional unit can determine which one of a paper feed u-it (IN), a paper eject unit (OUT), and a duplex unit (DPX) is its own unit type.

When a device ID code provided for each unit type consists four bits, 16 optional units can be identified for each unit type, and therefore a maximum of 48 optional units can be identified.

The following device ID codes are used in the present embodiment:

Multistage paper feed unit 3: IN0000,
Multistage paper feed unit 4: IN0001,
Multistage paper feed unit 5: IN0010,
Turned-over paper eject unit 6: OUT0000,
Multistage paper eject unit 7: OUT0001,
Large amount paper eject unit 8: OUT0010, and
Duplex unit 9: DPX0001

In actuality, every optional unit independently stores the own unit type in the form of a 2-bit unit type code. Thus, the 4-bit code following the unit type code is a device ID code.

The system main body 1 has a table as shown in FIGS. 3A and 3B in its internal memory. Referring to FIG. 3A, the logical ID codes having the same unit type are assigned optional units of the same unit type, and device ID codes of the optional units of the same unit type are stored in the table as shown in FIG. 3A. For example, the logical ID code IN#1 is assigned an optional unit identified by the device ID code IN0000, which is the same unit type as IN#1. On the other hand, as shown in FIG. 3B, each of the optional units 3 to 9 has a memory which stores its own device ID code, and a memory which stores a logical ID code when it is assigned the optional unit.

It is noted that the unit type code (a code for identifying IN, OUT and DPX) is shown in FIGS. 3A and 3B as if it is stored as a part of the device ID code. However, as described above, the unit type can be specified by the logical ID code, and the device ID code is stored for the specified logical ID code. For this reason, in actuality, the unit type code is not required to be stored in the device ID code memory.

In the above-mentioned manner, by defining five logical ID codes and the same number of device ID codes, the system main body 1 can designate and control ever optional unit by only the related logical ID code.

In the present embodiment, as shown in FIGS. 2 and 3A, logical ID code IN#1 is assigned the multistage paper feed unit 3. In FIGS. 2 and 3A, the logical ID code IN#1 is shown together with 'Log'. Logical ID code IN#2 is assigned the large capacity the turned-over paper eject unit 6. Logical ID code OUT#2 is assigned the large capacity paper eject unit 8, and logical ID code DPX#1 is assigned the duplex unit 9. In FIG. 2, the optional units which are assigned the logical ID codes are denoted by blocks drawn by double lines. Thus, the system main body 1 can simultaneously control the five optional units 3, 5, 6 ,8 and 9.

The assignment of logical ID codes can be changed as necessary. Thereby, the system main body 1 can use the other optional units 4 and 7 and increased optional units.

The system main body 1 has the function of assigning a logical ID code to a device ID code of an optional unit. During assignment, the system main body 1 determines, for plural times, as to whether every optional unit having its own device ID code is in a communication active state where it can communicate with the system main body 1. The system main body 1 sequentially assigns logical ID codes to optional units set in the communication active state.

The system main body 1 can communicate through the signal line 10 with the optional units 3 to 9 in accordance with a communication protocol for use in a serial communication (FIG. 2). The communication protocol provides two levels of commands. Commands of a first level are basic commands, and commands of a second level are enhanced commands.

A basic command is used for controlling optional units which are assigned logical ID codes as follows. If the image forming system has and will have less than three optional paper feed units, less than three optional paper eject units, and less than two duplex unit, the "basic command" protocol can support all of system features. Such a system is defined as a basic system. In the basic system, the code number of the device ID code may be identical to the code number of the logical ID code.

An enhanced command is used in case where the image forming system includes three or more optional paper feed units, three or more optional paper eject units, or two or more duplex units. In such a case, the system main bodY 1 can control paper feed, paper ejection and duplex print to be executed by the third or n-th (n is an arbitrary number larger than 3) optional paper feed unit or paper eject unit, or the second or more optional duplex unit by re-assigning the device ID code to a logical ID code, using an enhanced command. In this case, the code number of the device ID code for each optional unit is required to be set to an appropriate number consisting of four bits. This can be done by providing each optional unit with a device for setting the code number, such as a DIP switch.

The system main body 1 has the function of issuing commands. A command used in the present embodiment is a command including the device ID code for individually identifying each of the optional units 3 to 9, or a command including a global ID code for designating all the optional units. Commands derived from the system main body 1 are sent to the optional units 3 to 9 through the signal line 10.

Therefore, normally, the system main body 1 can individually designate and control the optional units 3 to 9 (only an optional unit having the assigned logical ID code during printing) Alternatively, the system main body 1 can simultaneously control all the optional units 3 to 9 by sending a command including the global ID code. When a serious fault occurs in the image forming system and thus it is required to urgently stop all the optional units, the system main body 1 can urgently stop all the optional units at the same time by supplying all the optional units with the command including the global ID code.

A description is briefly given of two types of commands. A first type of command (general command) is shown in FIG. 4(a). A command consists of an argument consisting of eight bits, and an operator consisting of eight bits. The argument is sent first, and the operator is sent second. The most significant bits $b_7$ to $b_5$ of the argument are always set to "111". The remaining bits of the argument are used for selecting one of trays provided in the multistage paper feed unit 4, for example. The argument may be of a variable length. A logical ID code number for identifying an optional unit with which the system main body 1 wants to communicate, is formed by the most significant three bits $b_7$–$b_5$ of the operator. A code indicative of the type of an instruction is formed by bits $b_4$–$b_0$.

FIG. 4(b) is a command including the global ID code (hereinafter simply referred to as a global ID command). The global ID command has the most significant bits $b_7$–$b_5$ of "110" (which is a code of the global ID), and bits $b_4$–$b_0$ for forming an instruction ("01111" for the urgent stop instruction). When each of the optional units 3 to 9 receives the global ID command, it immediately executes the received instruction without sending a response.

The global ID command is used:
(1) when the image forming system is initialized (initialization and self-diagnosis),
(2) when a paper size is set in an optional unit which does not have a paper size self-detection function, or
(3) when the system main body 1 requires to inform each optional unit of urgent information (when paper jamming occurs, for example).

PRINTER SYSTEM

A description is given of a printer system of the embodiment, in which the system main body 1 is a laser beam printer.

Figure 5:
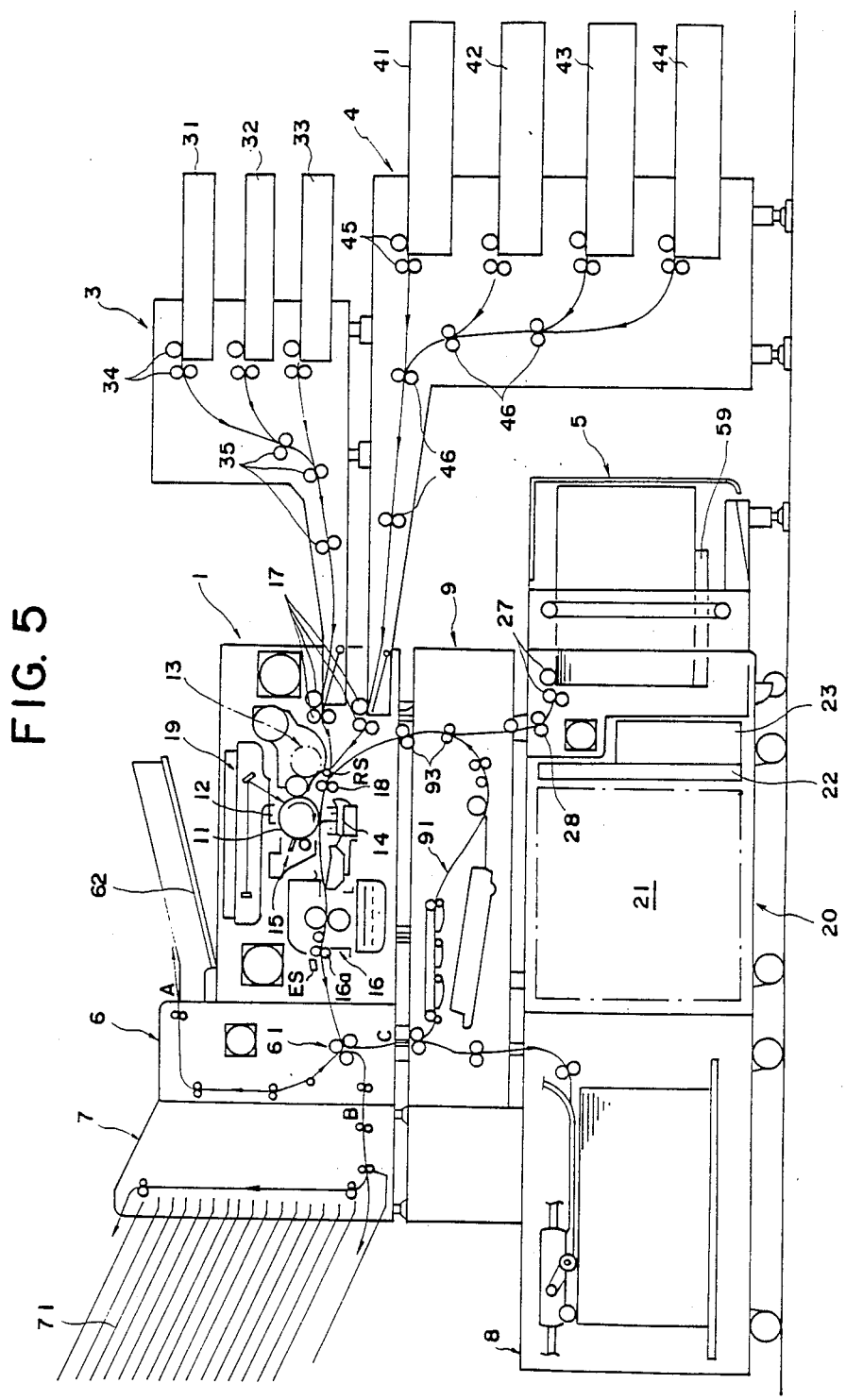
FIG. 5 is a side view of a mechanical part of the printer system according to the embodiment of the present invention.

FIG. 5 is a diagram of a mechanical portion of a laser beam printer system which includes the laser beam printer and optional units. In FIG. 5, those parts which are the same as those in FIG. 4 are given the same reference numerals. A paper transport path is indicated by a solid line having an arrow.

The illustrated laser beam printer system is made up of the printer main body 1, a system table 20, and seven optional units. The seven optional units consist of the first and second multistage paper feed units 3, 4, the large capacity paper feed unit 5, the turned-over paper eject unit 6, the multistage paper eject unit (mail box or sorter) 7, the large capacity paper eject unit (job stacker) 8, and the duplex printer unit 9.

The system table 20 includes a controller control board (hereinafter simply referred to as a controller) 21, a print engine control board (hereinafter simply referred to as a print engine controller) 22, and an AC (alternating current) distribution unit 23. These elements form a controller of the entire printer main body 1. The controller 21 is connected to the host system 2 (FIG. 2) such as a word processor or a computer. The print engine controller 22 controls a print engine mechanical part of the printer main body 1, and the optional units. The AC distribution unit 23 supplies the printer main body 1 and the optional units 3 to 9 with AC power (AC lines are omitted for convenience, sake).

The printer main body 1 is a laser beam printer and has two cassette insertion openings. The main body of a conventional laser beam printer also has two cassette insertion openings into which upper and lower paper feed cassettes which accommodate paper of the different sizes, are inserted. In the present laser beam printer system, two optional multistage paper feed units 3 and 4 are inserted into the two cassette insertion openings.

The first multistage paper feed unit 3 has three detachable paper feed cassettes (trays) 31 to 33, paper pickup/feed rollers 34, guide members and paper transport rollers 35, and driving mechanisms including motors for driving the rollers 34 and 35. The detachable paper feed cassettes 31 to 33 are elevationally arranged. The paper pickup/feed rollers 34 of the first multistage paper feed unit 3 are arranged in the vicinity of a front portion of each of the paper feed cassettes 31 to 33, and have the function of picking up and feeding paper accommodated therein. The guide members and paper transport rollers 35 function to guide paper picked up by the paper pickup/feed rollers 34 up to the paper pickup/feed rollers 17 provided in the printer main body 1.

The multistage paper feed unit 4 has four detachable paper feed cassettes 41 to 44, paper pickup/feed rollers 45, guide members and paper transport rollers 46, and driving mechanisms including motors for driving the rollers 45 and 46. The detachable paper feed cassettes 41 to 44 are elevationally arranged. The paper pickup/feed roller 45 are arranged in the vicinity of a front portion of each of the paper feed cassettes 41 to 44, and have the function of picking up and feeding paper accommodated therein. The guide members and paper transport rollers 46 function to guide paper picked up by the paper pickup/feed rollers 45 up to the paper pickup/feed rollers 17 provided in the printer main body 1. The second multistage paper feed unit 4 is placed on a floor, on which the first multistage paper feed unit 3 is mounted.

As described previously, the printer main body 1 has the print engine mechanical part 25, which is made up of an optical write unit 19, a photosensitive drum 11, a corona (electrifying) charger 12, a develop unit 15, an image transfer charger 14, a cleaning unit 15, an image fixing unit 16, two pairs of paper pickup/feed rollers 17, a number of paper transport rollers including resist rollers 18, and driving mechanisms including motors for driving the rollers.

The large capacity paper feed unit 5 and the duplex unit 9 are provided as paper sources in addition to the first and second multistage paper feed units 3 and 4 attached to the printer main body 1. When any one of the paper feed units 3, 4, 5 and 9 is selected, paper is fed by the related paper pickup/feed rollers 17 and is held stationary in the position where it is put between the resist rollers 18.

The large capacity paper feed unit 5 has an ability of accommodating up to 2000 sheets of paper of up to B4 size, a tray 59, and a driving mechanism including a motor for driving the tray 59. When the large capacity paper feed unit 5 is selected and supplied with a paper feed instruction from the print engine controller 22 (described in detail later), a sheet of paper is picked up therefrom and transported in the duplex unit 9 by the paper pickup/reed roller 27. Then the paper passes through the position where the present transport path joins a paper re-feed path 91, and is further transferred, by a plurality of transport rollers 93, to the position where the transported paper is put between the resist rollers 18 provided in the printer main body 1.

When one of the first and second multistage paper feed units 3 and 4 is selected and supplied with a paper feed instruction from the print engine controller 22, a sheet of paper supplied therefrom is transported to the position of the paper pickup/feed rollers 17 provided in the printer main body 1. Further, the paper is transported to the position where it is put between the resist rollers 18.

A registration sensor RS is provided upstream by a predetermined distance (resist distance) from the resist rollers 18. When a leading edge of the sheet of paper reaches the registration sensor RS, it detects the leading edge.

The photosensitive drum 11 provided in the printer main body 1 is rotated in the direction of an arrow, and the circumferential surface thereof is electrified by the corona charger 12. The electrified surface of the photosensitive drum 11 is scanned in a main scanning direction (the axial direction of the photosensitive drum 11) by a laser beam emitted from the optical write unit 19. The laser beam has been modulated by a video signal, which forms an image to be printed. Thus, an electrostatic latent image is formed on the surface of the photosensitive drum 11.

The electrostatic latent image formed on the surface of the photosensitive drum 11 is developed with toner supplied from the develop unit 13. Then the developed image is transferred, by the image transfer charger 14, to paper, which is fed to an image transfer portion with a predetermined timing. The image transferred paper is transported to the fixing unit 16 and is heated thereby. Then, the paper is ejected from the printer main body 1 by paper eject rollers 16a, and is transferred to the turned-over paper eject unit 6. A paper eject sensor ES is provided in a predetermined position which is downstream from the paper eject rollers 16a, and detects the leading and rear ends of the paper.

When the above-mentioned image transfer process is completed, remaining toner particles are removed from the surface of the photosensitive drum 11 by the cleaning unit 15. Then light from a charge removing lump (not shown) is projected onto the surface of the photosensitive drum 11, so that remaining charge is completely eliminated from the photosensitive drum 11. Thus, the photosensitive drum 11 has made provision for the next charge process by the corona charger 12.

The paper which has been ejected from the printer main body 1 and fed in the turned-over paper eject unit 6, is selectively transferred to any one of upper side and lower paper outlets A, B and C by a transport switching mechanism 61. The turned-over paper eject unit 6 has a turned-over paper stack function of accommodating up to A3 size paper having a print image on one side thereof. Further, the turned-over paper eject unit 6 has the function of selecting one of the paths related to the paper outputs A, B and C. When the turned-over paper eject unit 6 selects the output A, paper is transported to a paper eject tray 62 provided in the printer main body 1. When the turned-over paper eject unit 6 selects the output B, paper is transported to the multistage paper eject unit 7. When the turned-over paper eject unit 6 selects the outlet C, paper is transported to either the duplex unit 9 or the large capacity paper eject unit 8.

The multistage paper eject unit 7 includes a number of bins 71, and ejects paper which has a printed image to one or more bins 71 designated by the print engine controller 22 (described later). The large capacity paper eject unit 8 receives (through the transport path in the duplex unit 9 for the illustrated example) paper which has a printed image and is supplied from the lower paper outlet C of the turned-over paper eject unit 6, and sorts and stacks paper for each job. The large capacity paper eject unit 8 can accommodate a maximum of 2000 sheets of paper of up to A3 size. The duplex unit 9 receives, through the paper outlet C, paper which has a printed image on one side thereof, and supplies the printer main body 1 with the received paper through the paper re-feed path 91 so as to carry out duplex print. Thus, the duplex unit 9 has both the paper eject and feed functions.

CONTROL SYSTEM OF THE PRINTER SYSTEM

Figure 6:
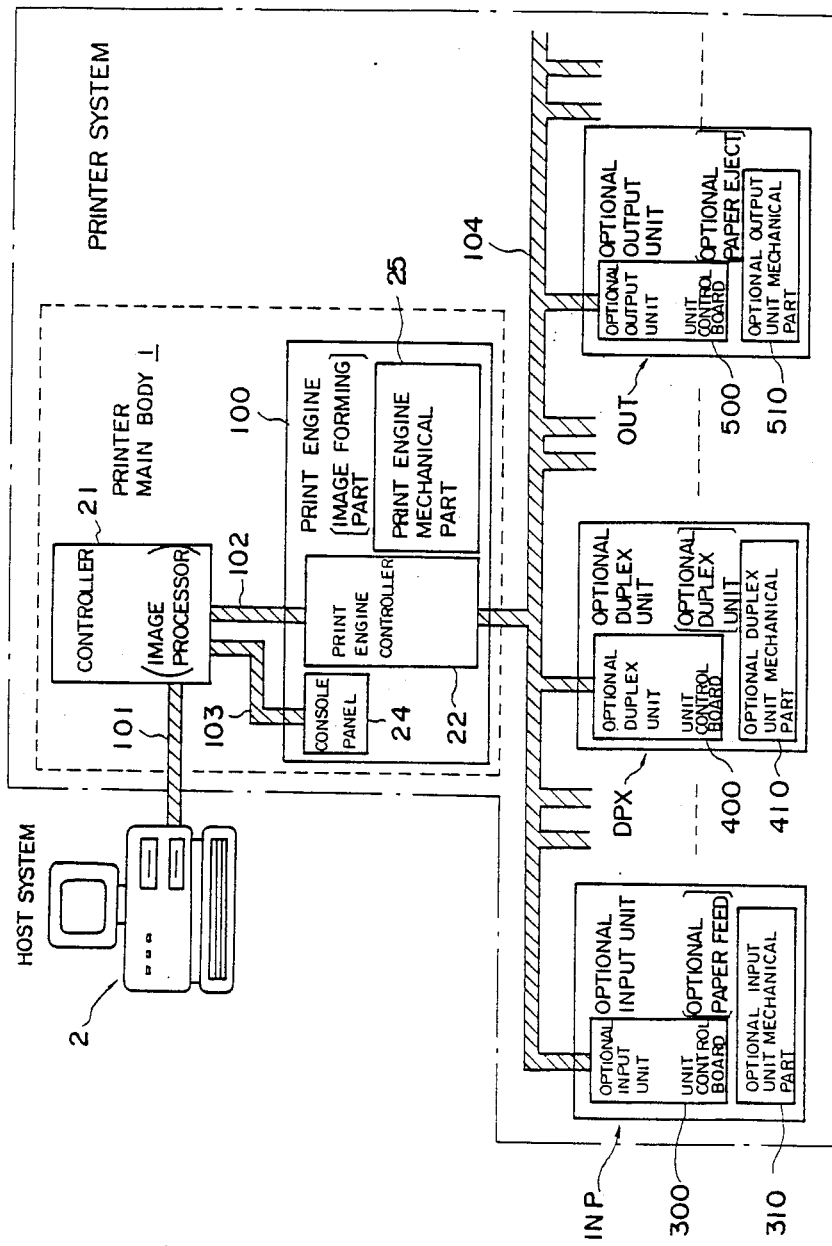
FIG. 6 is a block diagram of a control system provided in the printer system where an internal video interface is employed.
Figure 7:
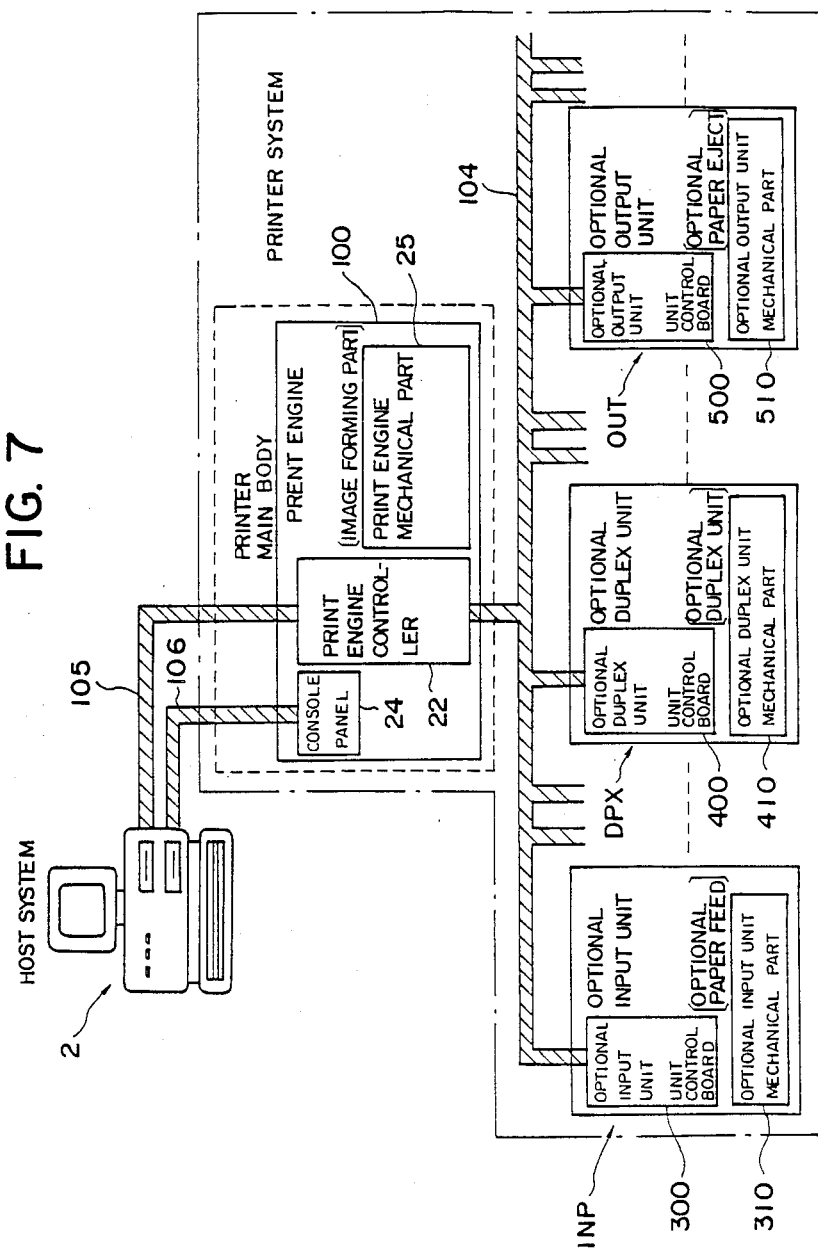
FIG. 7 is a block diagram of a control system provided in the printer system where an external video interface is employed.

A description is given of a control system of the present printer system. FIG. 6 is a block diagram of a control system which is to be used when an internal video interface is employed, and FIG. 7 is a block diagram of a control system which is to be used when an external video interface is employed.

Referring to FIG. 6, the printer main body 1 includes controller 21 and print engine 100. The controller 21 forms an image processor which creates image data from character code data. The print engine 100 forms a print image from the image data generated by the controller 21, and is made up of print engine controller 22, console panel 24 and print engine mechanical part 25.

The controller 21 is connected to the host system 2 through a parallel signal line 101 based on a host interface. The controller 21 is connected to the print engine controller 22 through a parallel and serial signal line 102 based on a controller/engine interface. The controller 21 is connected to the console panel 24 through a serial signal line 103 based on a controller/console panel interface. The print engine controller 22 of the print engine 100 is connected to control boards 300, 400 and 500 of three different type optional units through a serial signal line 104 based on an engine/option interface which is in common with all the optional units. The serial signal line 104 corresponds to the signal line 10 shown in FIG. 2.

In FIG. 6, the first and second multistage paper feed units 3, 4, and the large capacity paper feed unit 5 shown in FIG. 5 are illustrated as an optional input unit INP, which is made up of the aforementioned control board 300 and an optional input unit mechanical part 310. Similarly, taking into account of a case where a plurality of duplex units 9 are connected to the printer main body 1, these duplex units 9 are illustrated as an optional duplex unit DPX, which is made up of the aforementioned control board 400 and an optional duplex unit mechanical part 410. The turned-over paper eject unit 6, the multistage paper eject unit 7, and the large capacity paper eject unit 8 shown in FIG. 5 are illustrated as an optional output unit OUT, which is made up of the aforementioned control board 500 and an optional output unit mechanical part 510.

A printer main body 1' of the printer system shown in FIG. 7 does not have any controller serving as an image processor. The printer main body 1' is formed by only a print engine 100' serving as an image forming mechanism. The print engine 100' is made up of the print engine controller 22, the console panel 24 and the print engine mechanical part 25. The print engine controller 22 is directly connected to the host system 2 through a parallel signal line 105 based on a host/engine interface. The console panel 24 is directly connected to the host system 2 through a serial signal line 106 based on a host/console panel interface. The print engine controller 22 of the print engine 100' is connected in common with the control boards 300, 400 and 500 of the optional units INP, DPX and OUT through the serial signal line 104 based on the engine/option interface in the same manner as the printer system shown in FIG. 6.

In the printer system shown in FIG. 7, the host system 2 has the image processing function, and supplies the printer main body 1' with image data (or video data) as print data. Further, the host system 2 has functions similar to those provided the controller 21 shown in FIG. 6.

A description is given of the control boards and other structural elements in the printer system shown in FIG. 6.

[Controller 21]

Figure 8:
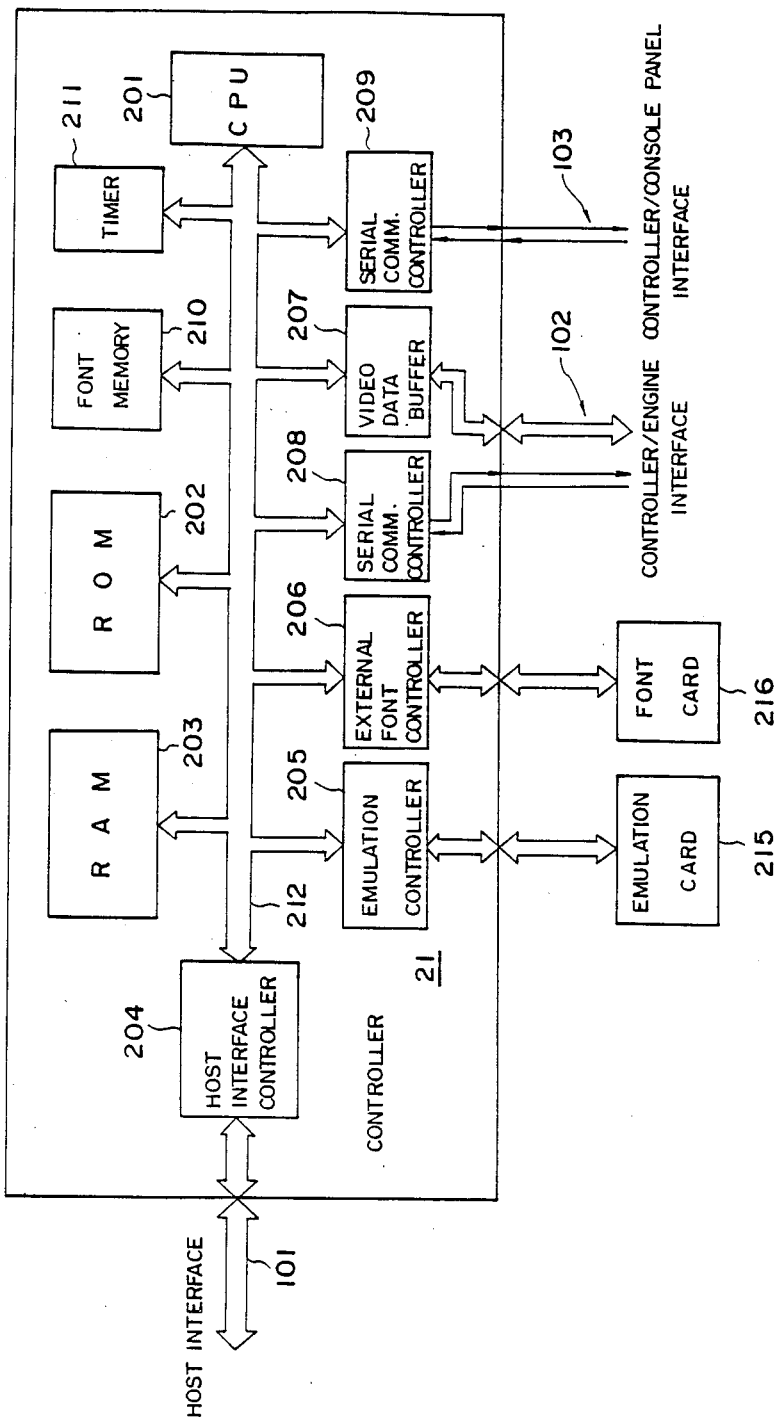
FIG. 8 is a block diagram of a controller control board (controller) provided in the printer main body.

FIG. 8 illustrates an example of the structure for the controller 21. The illustrated controller 21 is made up of a central processing unit (hereinafter simply referred to as CPU) 201, a read only memory (hereinafter simply referred to as ROM) 202, a random access memory (hereinafter simply referred to as RAM) 203, a host interface controller 204, an emulation controller 205, an external font controller 206, a video data buffer 207, and serial communication controllers 208 and 209, all of which are mutually connected through a bus 212. It is possible to provide a plurality of host interface controllers 204, a plurality of emulation controllers 205, or a plurality of external font controllers 206. Alternatively, the emulation controller 205 and the external font controller 206 may be omitted if they are unnecessary.

The CPU 201 controls the entire controller 21, and is formed by a conventional 16-bit or 32-bit CPU, for example. The ROM 202 is a program memory, which stores various programs to be used by the CPU 201 and permanent data. The ROM 202 stores at least the following programs which are provided as software for directly controlling hardware of the controller 21:
  (a) Host interface handler,
  (b) Print engine handler, and
  (c) Operation panel handler. Further, the ROM 202 stores the following programs as software which can be used in common irrespective of printer software:
  (d) Diagnostic program,
  (e) Test program, and
  (f) Service program.
The printer software is stored in an emulation card 215, and is loaded into the RAM 203 as necessary. Alternatively, the printer software may be stored beforehand, as standard printer software, in the ROM 202.

The RAM 203 is a memory of a large storage capacity, and is used as data buffers and data registers. Mainly, the RAM 203 serves as an input buffer which temporarily stores data received from the host system 2, and serves as a page buffer which stores page data formed by the CPU 201 based on the data stored in the input buffer. Further, the RAM 203 functions as a video buffer which stores video data which is generated per page from page data stored in the page buffer, font data and so on. Moreover, the RAM 203 functions as a font file which stores a down load font supplied from the host system 2, and functions as a working memory of the CPU 201.

The host interface controller 204 is coupled to the host system 2 through the host interface, and provides interfaces for data transmission and reception between the host system 2 and the printer main body 1. The following interfaces are provided as the host interfaces so as to conform to the type of the host system 2:
(a) Parallel interface/Centronics,
(b) Parallel interface/SCSI,
(c) Serial interface/RS-232C,
(d) Serial interface/RS-422, and
(e) LAN (Local Area Network) interface.

The emulation controller 205 provides an interface for reading the printer software from the emulation card 215 which is inserted into the printer main body 1. The emulation card 215 is a sequential memory for parallel data, which consists of a ROM storing printer software and an address counter for designating an address of the ROM 202. The external font controller 206 provides an interface for reading the font data from the font card 216 which is inserted into the printer main body 1. The font card 216 consists of a ROM for storing font data which defines the style of character image, an address latch circuit, and a data buffer.

The video buffer 207 and the serial communication controller 208 are connected to the print engine controller 22 through the parallel and serial signal line 102 based on the controller/engine interface. The video data buffer 207 is used as follows. When video data formed in the video buffer formed in the RAM 203 is read therefrom for every 16 or 32 bits which correspond to a unit of processing of the CPU 201, the video data buffer 207 converts the read-out video data into 8-bit parallel or serial data by using control signals and a write synchronizing signal (/WCLK) supplied from the print engine controller 22. The converted parallel or serial data is supplied to the print engine controller 22.

Video data (/WDATA, /WDATA1-/WDATA7) consisting of parallel data or serial data indicates a black pixel when it is low, and indicates a white pixel when it is high. Data /WDATA is the least significant bit of serial video data or 8-bit parallel video data. Data /WDATA1-/WDATA7 are the seven remaining bits of the video data. The video data is in synchronism with the fall edge of the write synchronizing clock /WCLK. The most significant bit of the parallel video data corresponds to the leftest pixel. A symbol "/" shows a low active signal.

The serial communication controller 208 controls data transmission of various commands and responses which are transferred between a serial communication controller 118 (FIG. 9) provided in the print engine controller 22 and the controller 21. The serial communication controller 209 controls data transmission which is performed between a serial communication controller 144 (FIG. 9) of the console panel 24 and the controller 21 through the serial signal line 103 based on the controller/console panel interface. Examples of those data to communicate with the serial communication controller 144 of the console panel 24 are various commands, responses, key input data, and display data.

The font memory 210 stores font data which is always used in the present printer system. A timer 211 is a system timer, and functions to define operation timing and time-out control for each controller.

[Print Engine 100]

Figure 9:
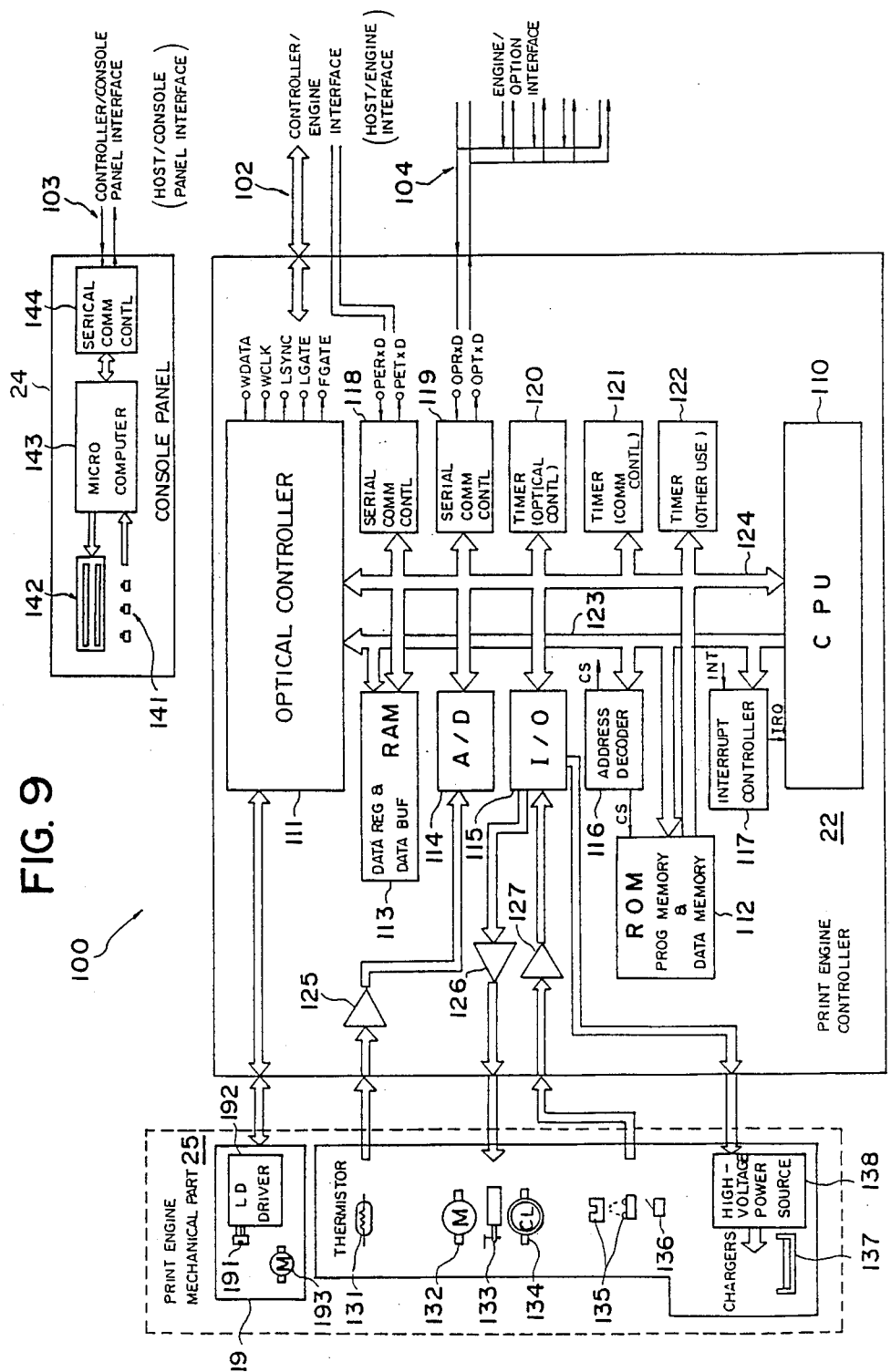
FIG. 9 is a block diagram of a print engine provided in the printer main body.

Referring to FIG. 9, there is illustrated an example of the structure for the print engine 100. The print engine controller 22 is made up of an optical controller 111, a ROM 112, a RAM 113, an analog-to-digital converter (hereinafter simply referred to as A/D converter) 114, an input/output port (hereinafter simply referred to as I/O port) 115, an address decoder 116, an interrupt controller 117, two serial communication controllers 118, 119, and three timers 120, 121, and 122. These structural elements are controlled by the CPU 110, and are mutually connected through an address bus 123 and/or a data bus 124, as shown in FIG. 9. Further, the print engine 100 includes an operational amplifier 125, a driver 126, and an amplifier 127.

The CPU 110 not only controls the above-mentioned structural elements but also functions as command issue means for issuing commands to be sent in the optional units connected to the printer main body 1. The optical controller 111 has an oscillator, a frequency divider, various counters, and flip-flop circuits, and generates the aforementioned write synchronizing clock WCLK, a line synchronizing signal LSYNC, and gate signals LGATE and FGATES. These synchronizing signals themselves are being used in conventional laser beam printer systems. Further, the optical controller 111 inputs the video data (write data) WDATA, and controls the optical write unit 19 of the print engine mechanical part 25 on the basis of the received video data. This is done by controlling a laser diode driver (LD driver) 192 so as to have a laser diode 191 emit light, and a polygon motor 193 which rotates a polygonal mirror for deflecting the laser beam so as to scan the photosensitive drum 11 (FIG. 5) and write an image on the surface of the photosensitive drum 11.

The ROM 112 stores programs to be executed by the CPU 110 and permanent data. The RAM 113 is used as a data register or data buffer for storing data related to operation or discrimination results supplied from the CPU 110 and for temporarily storing data. The aforementioned table which stores the logical ID codes and device ID codes assigned thereto as shown in FIG. 3A, is formed in the RAM 113.

The A/D converter 114 receives, through the operational amplifier 125, an amplified detection signal from a sensor outputting an analog signal, such as a thermistor 131 provided in the print engine mechanical part 25, and converts the amplified detection signal into a corresponding digital signal, which is input to the CPU 110.

The I/O port 115 receives, through the amplifier 127, signals derived from various sensors 135 which generate binary sensor output signals, and a signal from a switch 136. Further the I/O port 115 outputs, through the driver 126, signals from the data bus 124 to various motors 132 such as a main motor and transport motors, a plunger 133 a clutch 134, and so on.

The address decoder 116 outputs a chip select signal CS which designates a chip when the CPU 110 executes data read or write for the chip. The interrupt controller 117 outputs an interrupt request signal IRQ to the CPU 110 when an interrupt signal INT is supplied to the interrupt controller 117.

The serial communication controller 118 communicates with the serial communication controller 208 provided in the controller 21, as described previously. The serial communication controller 119 communicates with the control boards 300, 400 and 500 of the optional units INP, DPX and OUT through the serial communication line 104. For example, commands and responses are transferred between the print engine controller 22 and the connected optional units. The serial signal lines including the serial signal line 104 can be formed by an optical fiber cables. In this case, the above-mentioned communication controllers have optical communication functions.

The timer 120 is used for optical controls, and the timer 121 is used for communication controls. The timer 122 is for use in other controls.

The console panel 24 has various key switches 141, and a display module 142, which are controlled by a microcomputer 143. The console panel 24 can communicate with the controller 21 through a serial communication controller 144. For example, key input data and display data are transferred between the console panel 24 and the controller 21.

[Optional Units]

Figure 10:
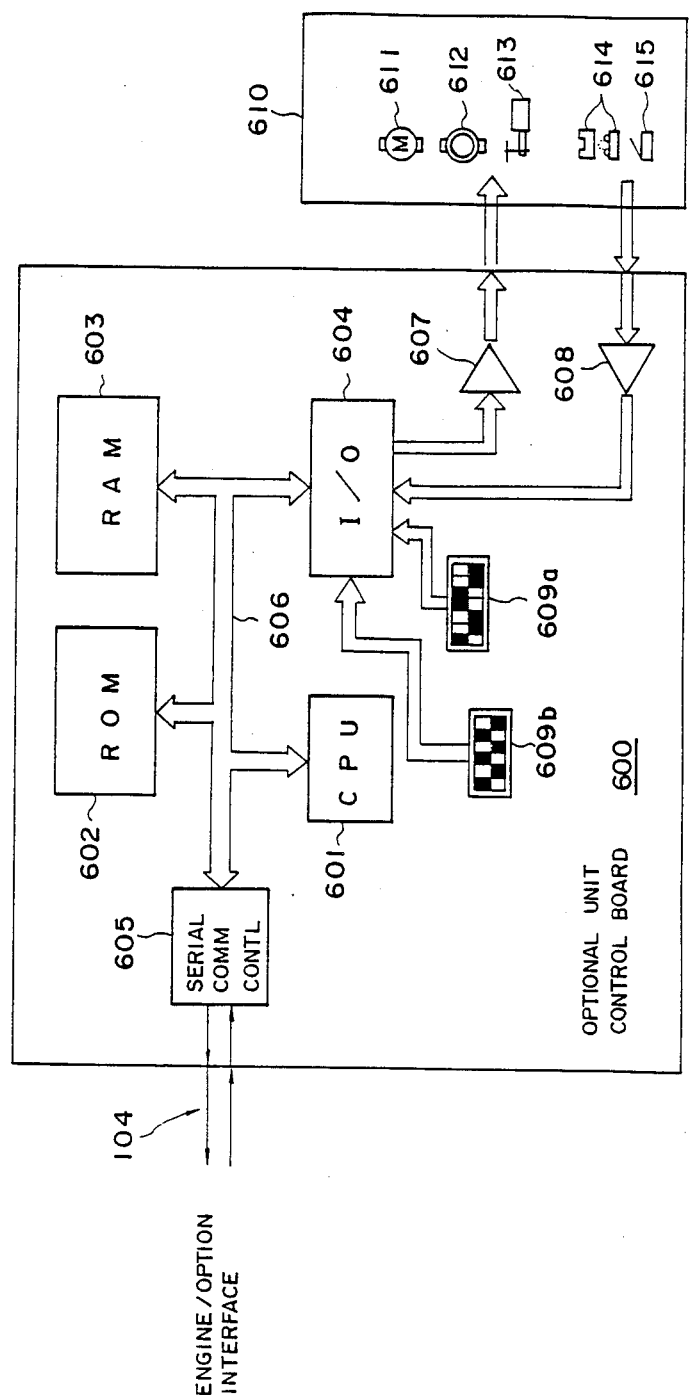
FIG. 10 is a block diagram of a structure provided in each optional unit.

Each of the optional input unit INP, optional duplex unit DPX and optional output unit OUT (FIG. 6) has a configuration shown in FIG. 10. In FIG. 10, the same configuration provided in each of the optional-unit control boards 300, 400 and 500 is depicted as an optional-unit control board 600, and the same configuration provided in each of the optional-unit mechanical parts 310, 410 and 510 is depicted as an optional-unit mechanical part 610.

The optional-unit control board 600 is made up of a CPU 601, a ROM 602, a RAM 603, an I/O port 604, and a serial communication controller 605, all of which are mutually connected through a bus 606. The ROM 602, RAM 603, I/O port 604 and serial communication controller 605 are controlled by the CPU 601. Further, the optional-unit control board 600 includes a driver 607, an amplifier 608 and DIP switches 609a and 609b, all of which are connected to the I/O port 604.

The ROM 602 serves as a program memory or a data memory. That is, the ROM 602 stores programs to be executed by the CPU 601 and related permanent data, and stores the unit type of the optional unit (one of INP, DPX and OUT) and attribute data thereof. For the optional input unit INP the attribute data thereof relates to the number of paper feed cassettes, information on whether the paper size self detection function is provided, and information on whether a manual paper feeding function is provided, for example. For the optional output unit OUT, the attribute data thereof relates to information on whether a job separation function is provided, and information whether paper is to be ejected in the face down or up state.

The attributes may be different for optional units of the same type. For example, a multistage paper feed unit of a first type has five paper feed trays, and a multistage paper feed unit of a second type has ten paper feed trays. In the case where it is desired to control these optional units by a single optional-unit control board, the attribute data related thereto may be stored in a non-volatile memory.

The RAM 603 functions as a data register memory and a data buffer memory. Further, the RAM 603 serves as a temporary data storage memory or a working memory. Moreover, when the present optional unit is assigned, the RAM 603 stores a flag indicative of the above assignment. Further, the RAM 603 serves as a register which stores the 3-bit logical ID code included in a command, which is supplied from the print engine 100 at that time. The device ID code of the optional unit is a 4-bit code (0000–1111) and is input by the DIP switch 609a. The optional-unit may be designed to input 2-bit unit type code (INP:00, DPX:01, OUT:10) used for specifying its own unit type by the dip switch 609a. The DIP switch 609b is used to input the connector position of the printer main system 1 where the optional unit is coupled through the cable.

The serial communication controller 605 communicates with the serial communication controller 119 of the aforementioned print engine controller 22 (FIG. 8). As described previously, commands and responses are transferred between the optional-unit control board 600 and the print engine controller 22. In response to an instruction supplied from the CPU 601, the I/O port 604 makes access to the RAM 603, and reads the device ID code or the unit type code which have been set by the DIP switches 609a and 609b. Further, the I/O port 604 outputs signals for driving actuators of the optional-unit mechanical part 610, such as a motor 611, clutch 612 and a plunger 613, and receives detection signals from a sensor 614, a switch 615 and so on through the amplifier 608.

[Communication Protocol Between Print Engine and Optional Units]

A description is given of a communication protocol between the print engine 100 and each optional unit. The following is communication condition defined between the print engine 100 and the optional units INP, DPX and OUT:

Interface: asynchronous serial interface,
Bit rate: 9600 baud,
Parity bits: none, and
Stop bit: 1. A communication protocol is as follows. Transmission from the print engine 100 to each optional unit is executed by sending a command. On the other hand, transmission from each optional unit to the print engine 100 is executed by sending a response. The formats of the commands and responses used in the present system are shown in FIG. 11. A command consists of an argument and an operator. The operator indicates the end of one command. The argument consists of eight bits b7 to b0. The bits b7 to b5 of the argument are always set to "111". Similarly, an operator consists of eight bits b7 to b0. The bits b7 to b5 of the operator indicates the logical ID code of an optional unit with which the print engine 100 wants to communicate.

The present printer system uses the following commands.

[Basic Commands]

1. Inquire unit status "***100001"

This command inquires the status of each optional unit. The print engine 100 may send operator only (may omit an argument). In this case, the previous argument is effective.

2. Inquire paper size "***10010"

This command inquires the paper size in each optional unit. The print engine 100 can omit the argument if asking the same tray again. In this case, the previous tray code is effective.

3. Inquire unit condition "***10011"

This command inquires the condition of each optional unit. The print engine 100 can omit an argument if asking the condition of the some tray, and in this case the previous tray code is effective.

4. Inquire unit availability "***10100"

This command inquires the availability of each optional unit (manual feed function, jogger function and number of trays).

5. Inquire unit specification #1 "***10101"

This command inquires the specification of each optional unit. Each optional unit informs the print engine 100 to which paper entrance position the designated input tray is connected or to which paper exit position the designated output tray is connected. Each optional unit also notifies the print engine 100 whether it has features of detecting tray status and paper status on the designated tray or not. The argument can be omitted if the print engine 100 inquires the same tray. In this case the previous tray code is effective.

6. Inquire unit specification #2 "***10110"

This command inquires set/unset of the paper size detecting function for each input tray, and the face up feature of each output tray (or back side orientation of duplex unit). The command also inquires the feed in and eject out time for each tray. Feed in time or eject out time information is used by the print engine 100 to determine whether a paper jam occurred in the optional unit or not. The argument can be omitted if the print engine 100 inquires the same tray again. In this case, the previous tray code is effective.

7. Inquire unit specification #3 "***10111"

This command inquires the tray capacity of each optional unit. The argument can be omitted if the print engine 100 inquires the same tray again. In this case, the previous tray code is effective.

8. Inquire eject paper ID "***11000"

This command inquires of each optional output unit ejected (ejection completed) paper ID.

9. Inquire unit firmware version "***1111"

This command inquires an available firmware version provided in each optional unit.

10. Tray selection "***00001"

This command selects an input tray and an output tray. This command is effective from the next "paper feed start" command and on the following "paper eject start" command. The argument can be omitted if the print engine 100 selects the same tray again. In this case, the previous tray selection is effective.

11. Mode setting "***00010"

This command sets the various modes for each optional unit. The argument can be omitted if the print engine 100 sets the same mode. In this case, the previous setting mode is effective.

12. Paper size setting "***00011"

This command notifies the currently selected input tray, output tray and duplex unit of the paper size information. If an optional input unit can detect paper size for all input trays thereof, it is not necessary to send this command. The argument can be omitted if the print engine 100 sets the same paper size. In this case, the previous paper size code is effective.

13. Paper feed start "***00100"

This command instructs the currently selected input unit or duplex unit to start feeding a sheet of paper to the registration position of the print engine 100.

14. Paper feed stop "***00101"

This command instructs each optional input unit or each optional duplex unit to stop feeding paper. The print engine 100 issues this command when the leading edge of a sheet passes through the registration sensor RS of the print engine 100. After receiving this command, the optional unit continues to feed all sheets of paper in the path for a predetermined distance (predetermined time) and then stops paper feed.

15. Paper feed restart "***00110"

This command instructs each optional input unit or each optional duplex unit to restart feeding sheets of paper which have stopped in the paper path of the optional unit. Stopped sheets are those which were fed initially by the "feed start" command and were stopped in the path by the "feed step" command. Therefore, this command is effective only for sheets whose feed is initiated by the "feed start" command.

16. Paper eject start "***01000"

This command instructs each optional output unit or each optional duplex unit to start ejecting a sheet of paper from the print engine 100. The print engine 100 issues this command every time a sheet of paper is to be ejected. The argument can be omitted if the print engine 100 inquires paper eject start without paper ID information. No previous argument is effective for this command, and the optional unit recognizes that there is nc paper ID information when it receives only an operator.

17. Paper eject end "***01001"

This command instructs each optional output unit or each optional duplex unit to finish ejecting a sheet of paper. It is not necessary for the print engine 100 to issue this command every time a sheet of paper is ejected during continuous printing.

18. Initialization "***01110"

This command initializes the optional units.

19. Abort "***01111"

This command urgently stops paper transport within the optional units and sets every actuator thereof to the initial position.

20. Length of print engine path "***01010"

This command notifies each optional unit of the length of the print engine paper path. For an input unit, the distance is measured from the engine entrance position for the currently selected tray to the registration position of the print engine 100. For an output unit, the distance is measured from the exit sensor position ES of the print engine 100 to the engine exit position for the currently selected tray. The argument can be omitted if the print engine 100 issues the same length. In this case, the previous length is effective.

21. Registration distance "******01011"

This command notifies each optional unit of the length of paper path from the registration sensor position RS to the registration stop position ES within the print engine 100. This length indicates the distance between the actuation position where the print engine 100 issues the "paper feed stop" command and the registration position where the optional unit should stop feeding the sheet of paper. The argument can be omitted if the print engine 100 issues the same length. In this case, the previous length is effective.

22. Transport velocity "***01100"

This command notifies each optional unit of the velocity of paper transport mechanism within the print engine 100. The argument can be omitted if the print engine 100 sets the same velocity. In this case, the previous velocity is effective.

[Enhanced Commands]

23. Assign device ID "***11001"

The print engine 100 can reassign device ID codes to logical ID codes and can change the system configuration using this command.

24. Inquire assigned device ID "***11010"

The print engine 100 can confirm device ID code numbers which are currently assigned to each logical ID code number using this command.

25. Inquire device ID "***11011"

The print engine 100 can confirm all device ID code numbers of all unit types which are currently in a communication active state by using this command.

The above-mentioned commands are executed in real time by the optional units. Each optional unit retains modes, status or assignment which was specified the tray selection, mode setting, paper size setting, length of print engine path, registration distance, transport velocity and assign device ID until the mode, status or designation is re-selected by these commands.

The correct format for a command is to send the argument first and the operator second. As described previously, an argument can be omitted for commands consisting of "argument" and "operator". Optional units also recognize "non-argument" command accurately. If an "argument+operator" command ("request unit status" command, for example) is issued without an argument by the print engine 100, the previous argument of the same command for the same logical ID unit is effective as a virtual argument. This is except for the "paper eject start" command, "assign device ID" command and "request device ID" command. The previous argument cannot be effective for the "paper eject start" command, "assign device ID" (FIG. 11(b)), and "request device ID" command (FIG. 11(d)). If no effective argument exits for an optional unit on receiving a command, the optional unit adopts default values as the virtual argument.

A response is a message which is sent from every optional unit to the print engine 100 and indicates receipt of a command. Every response is one byte in length with the most significant bit $b_7$ set to "0". If an optional unit does not support the received command, the optional unit returns [$7F_{hex}$], "01111111", as a response.

FIG. 11(b) shows the format of "assign device ID" command which is sent by the print engine 100 when it assigns a device ID code to an logical ID code. Further, FIG. 11(b) shows the format of a response which is sent from the optional unit on receiving the "assign device ID" command. The assigned device ID code is set in the least significant bits $b_3$ to $b_0$ of the argument, and the logical ID code is set to the most significant bits $b_7$ to $b_5$ (shown as ***) of the operator.

For example, "assign device ID" command of "111×0010, 00011001" means an instruction of "assign device ID code "0010" (INP#3: large capacity paper feed unit 5) to logical ID code "000" (IN#1)". The CPU 601 of the optional unit having device ID code "0010" (large capacity paper feed unit 5 for this example) interprets the above-mentioned "assign device ID" command, and returns response "00000010" having the meaning that device ID code "0010" has been assigned as logical ID code "000" (IN#1). Although there is no unit type code in the device ID code, two bits $b_6$ and $b_5$ form a unit type code. In this example, "00" shows the optional input units.

FIG. 11(c) shows a device ID code which has been assigned to a specific logical ID code, that is, a command for inquiring a communication active optional unit, "inquire assigned device ID" command, as well as its response. This command has no argument. For example, "inquire assigned device ID" command "00011010" is a command which inquires of each optional unit what is assigned in logical ID code "000" (whether communication is available). If the optional unit having the assigned device ID code is the large capacity paper feed unit 5, it returns response "00000010", which indicates that optional input unit "0010" has been assigned to IN#1 of the logical ID code.

FIG. 11(d) shows the "inquire device ID" command for inquiring whether an optional unit is in the communication active state, and its response. Bits $b_3$ to $b_0$ of the argument of this command is given the device ID code to be inquired, and bits $b_7$ and $b_6$ therefore given the unit type code thereof. For example, "111×0010, 00×11011" is a command for inquiring of optional input unit "0010" (large capacity paper feed unit 5) whether communications are available. If the large capacity paper feed unit 5 is in the communication active state, it sends back a response of "000×0010" to the print engine 100.

Now, the aforementioned global ID commands are further described. The global ID commands are commands in which bits $b_7$ to $b_5$ of the operator thereof is "110", which is a global ID address. When a global ID command is sent by the print engine 100, all optional units in the communication active state execute this command with the highest priority. All the optional units are inhibited from issuing responses for the global ID command. The print engine 100 can issue the next command without waiting for any responses.

A description is given of general rules of the protocol of communication between the print engine 100 and optional units.

(a) The print engine 100 must send a command only after receiving the response to the previous command (except global ID commands). The print engine 100 may issue a command before receiving the response to the previous command. Each optional unit must always send responses for commands except global ID commands.

(b) If the global ID command is issued by the print engine 100, all optional units in communication active state executes this command with the highest priority. The optional units are inhibited from issuing any responses to this command. The print engine 100 issues the next command without waiting for a response to the global ID command.

(c) Optional units are inhibited from transmitting any messages before receiving a command from the print engine 100.

(d) Optional units, other than the physical optional unit whose device ID code number corresponds to the specified logical unit ID code number in the command, do not transmit any responses to the print engine 100.

(e) An optional unit, when if it was the specified unit by the logical ID code in the operator, ignores a command and does not transmit any response if it detects a communication error in the command from the print engine 100.

(f) A command is configured such that the argument is sent first and the operator second. An argument can be omitted for a command consisting of "argument" and "operator". Every optional unit can recognize "non-argument" commands accurately.

(g) If the print engine 100 detects a communication error while waiting for a response from an optional unit, the print engine 100 sends the previous command again. If the error is detected again, the print engine 100 concludes that the optional unit is in a "communication inactive" state, and informs the controller 21 of this status.

(h) If the print engine 100 detects a communication error while not waiting to receive a response from an optional unit, the print engine 100 may ignore it. If the error is detected again, the print engine 100 concludes that all optional units are in the communication inactive state, and informs the controller 21 of this status. That is, the print engine 10 informs the controller 21 that all the optional units are in the communication inactive state.

(i) Communication errors which may occur between the print engine 100 and the optional units are classified into the following types:
(1) Framing or over run error
   This is a hardware error.
(2) Data format error
   (a) Too many arguments
      Length of argument is equal to or more than 2 bytes.
   (b) Multi commands
      Next argument or operator other than a global ID command is received before transmitting a response to the previous command.
   (c) Too many responses
      Length of response is equal to or more than 2 bytes.
   (d) Unexpected response
      Responses are received before issuing a command.
(3) Out of range error
   Received data (argument, operator or response) is outside of the assigned range.
(j) Time out error
(1) No operator
   No operator is received within a predetermined time after receiving an argument.
(2) no response
   No response occurs within a predetermined time although a command other than a global ID command is issued.

(k) When each optional unit detects a communication error in the received command, it ignores both the argument and operator thereof.

(l) If the print engine 100 receives two or more responses for a single command, it recognizes that all received responses are invalid.

(m) Each optional unit sends a response within normally 20 milliseconds (a maximum of 80 milliseconds) after receiving a command except global ID commands. Each optional unit is inhibited from sending any responses after the lapse of 80 milliseconds. The print engine 100 recognizes that a communication error (time cut error) has occurred when it receives no response within 100 milliseconds after issuing the command.

(n) When sending a command that consists of two bytes or more, consecutive bytes are sent within 80 milliseconds of the previous byte. If each optional unit does not receive an operator within 100 milliseconds after receiving an argument, the print engine 100 concludes that a communication error has occurred.

(o) All commands issued by the print engine 100 are executed by the related optional units. That is, all optional units execute all the commands in real time.

[Enhanced Commands]

A further description is given of the aforementioned enhanced commands and related responses.

"Assign device ID" command "***11001"

The print engine 100 can reassign device ID codes to logical ID codes and can change the system configuration using this command. The format of this command is as follows:

Format: "argument" + "operator":

argument;
   $b_7-b_5$: "111"
   $b_4$: "X" (reserved for enhancement)
   $b_3-b_0$: device ID code
operator;
   $b_7-b_5$: logical ID code
      unit type code ($b_7$, $b_6$)+unit
      number ($b_5$)
   unit type code
   $b_5$ unit type number ("00": IN, "01": DPX, "10": OUT)
   unit number "0": unit #1, "1": unit #2
   $b_4-b_0$ "11001"

The following five operators are obtained when operators consisting of 8 bits $b_7-b_0$ are represented by 2-bit hexa codes:
   [19hex] optional input unit #1
   [39hex] optional input unit #2
   [59hex] optional duplex unit
   [99hex] optional output unit #1
   [B9hex] optional output unit #2.

Response: "ID assignment"

$b_7$: "0"
$b_6-b_4$: specified logical ID
   unit type code $b_6$, $b_5$)+unit
   number ($b_4$)
$b_3-b_0$: assigned device ID code The following notes are given to the "assign device ID" command.

(i) After receiving this command, the newly assigned optional unit sends a response. However, the previously assigned optional unit is inhibited from sending any response, even if the newly assigned optional unit did not return a correct response (i.e. is not assigned correctly).

(ii) If the optional unit corresponding to the specified device ID really exits and if it can communicate with the print engine 100 at that time, the specified unit sends a response to the print engine 100.

(iii) Optional units other than the unit which has the specified device ID code and the specified unit type code, do not transmit any responses to the print engine 100.

(iv) The print engine 100 can confirm whether the specified device ID of the specified unit type is successively assigned to the logical unit ID, by using the following command sequence.
   a. Transmit "assign device ID" command once.
   b. If the correct response is received within 100 milliseconds, the specified optional unit is in communication active state and "assign device ID" command was accepted.

c. If a response is not received within 100 milliseconds after transmitting "assign device ID" command, the print engine 100 sends the "assign device ID" code again.

d. If the second try fails, the print engine 100 concludes that the optional unit having the specified device ID is in the communication inactive state.

(v) If the argument is omitted when issuing this command, all the optional units ignore it and do not send any responses.

(vi) Code "011", "110" and "111" are inhibited from being used for (unit type code) +(unit number). If the print engine 100 issues this command with one of these operators, all the optional units ignore it and do not send any responses to the print engine 100.

"Inquire assigned device ID" command: "***11010"

The print engine 100 can confirm device ID codes which are currently assigned to the logical ID codes by using this command.

Format: only "operator"

$b_7$–$b_5$: logical ID codes
$b_4$–$b_0$: "11010"

Operators each consisting of $b_7$ to $b_0$ can be represented by two-digit hexa codes as follows:
 [1Ahex] optional input unit #1
 [3Ahex] optional input unit #2
 [5Ahex] optional duplex unit (INP)
 [7Ahex] optional duplex unit (OUT)
 [9Ahex] optional output unit #1
 [BAhex] optional output unit #2

Response: "ID assignment"

$b_7$: "0"
$b_6$–$b_4$: specified logical ID code
$b_3$–$b_0$: currently assigned device ID Default:

a. Basic engine system

Every device ID code number is identical to the logical I code number.

b. Enhanced engine system

Optional units do not send any responses to this command before being assigned to a logical ID code with the "assign device ID" command.

The following notes are given to the "inquire assigned device ID" command.

(a) If the optional unit corresponding to the specified logical ID is not currently available, the optional unit do not return any response.

(b) Code "110" and "111" are not used for logical ID codes. If the print engine 100 issues this command with one of these operators, all the optional units ignore it and do not send any responses to the print engine 100.

"Inquire device ID" command: "***11011"

The print engine 100 can confirm that all device ID code numbers of all unit types which are currently in the communication active state, by using this command.

Format: "argument" +"operator"

argument:
 $b_7$–$b_5$: "111"
 $b_4$: "X" (reserved for enhancement)
 $b_3$–$b_0$: device ID code
operator:
 $b_7$, $b_5$ unit type code
 $b_5$ "X" (reserved for enhancement)
 $b_4$–$b_0$: "11011"

Response "ID assignment"

$b_7$: "0"
$b_6$, $b_5$: specified unit type code
$b_4$: "X" (reserved for enhancement)
$b_3$–$b_0$: specified device ID code The following notes are given to the "inquire device ID" command.

(i) If the optional unit related to the specified device ID and the specified unit type really exists, and if it can communicate with the print engine 100 at that time, the specified optional unit sends a response to the print engine 100.

(ii) No optional unit other hand the unit which has the specified device ID code and the specified unit type code, transmits a response to the print engine 100.

(iii) The print engine 100 can determine whether the optional unit related to the specified device ID and the specified unit type is in communication active state, by the following command sequence.

a. Transmit the "inquire device ID" command once.

b. If the correct response is received within 100 milliseconds, the specified optional unit is in communication active state and the "inquire device ID" command was accepted.

c. If the response is not received within 100 milliseconds after transmitting "inquire device ID" command, the print engine 100 transmits the "inquire device ID" command again.

d. If the second tray also fails, the print engine 100 concludes that the optional unit having the specified device ID code is in the communication active state.

(iv) If the argument is omitted when issuing this command, all the optional units ignore it and do not send any responses.

(v) Codes "011", "100" and "111" are inhibited from being used as logical ID codes. If the print engine 100 issues any of these codes, all optional units ignore the issued code and do not send the print engine any responses.

A description is given of specific basic commands which are allowed to use the global ID address.

"Initialize" command: "***01110"

This command initializes each optional unit.

Format; "operator" only operator;
 $b_7$–$b_5$: logical ID code or global ID address "110"

$b_4$–$b_0$: "01110"

The operators each consisting of $b_7$ to $b_0$ can be represented by two-digit hexa codes as follows.
 [0Ehex] optional input unit #1
 [2Ehex] optional input unit #2
 [4Ehex] optional duplex unit
 [8Ehex] optional output unit #1
 [AEhex] optional output unit #2
 [CEhex] global ID address "11001110"

Response $b_7$: "0"
$b_6$–$b_0$: unit status code

The following notes are provided for the "initialization" command.

(i) This command is used for initializing the optional units.

(ii) Upon receiving this command, each optional unit returns "unit status at preset" as a response, and executes self-initialization and diagnosis. Therefore, a paper jam may occur if the print engine 100 issues this command during paper feed, transport or printing.

(iii) If the print engine 100 issues this command with a global ID address, all the optional units execute the "initialization" command with the highest priority. However, the optional units do not any responses.

"Paper size setting" command: "***00011"

This command is used for informing the currently selected optional input units, optional output units and optional duplex unit of the paper size information. If an input unit can detect the paper size for all paper feed trays thereof, it is not necessary to send this command. As described previously, the argument can be omitted if the print engine 100 sets the same paper size. In this case, the previous paper size code is effective.

Format: "argument" +"operator"

argument;
 $b_7-b_5$: "111"
 $b_4-b_0$: paper size code (see FIG. 21)
operator;
 $b_7-b_5$: logical ID code or global ID address "110"
 $b_4-b_5$: "00011"
Operators each consisting of bits $b_7$ to $b_0$ are represented by 2-bit hexa codes as follows.
 [03hex] optional input unit #1
 [23hex] optional input unit #2
 [43hex] optional duplex unit
 [83hex] optional output unit #1
 [A3hex] optional output unit #2
 [C3hex] global ID address "11000011"

Response
 $b_7$: "0"
 $b_6-b_0$: paper size code (see FIG. 21).

Default:

Default paper size code of the argument is "00000" (free size 1, paper size undefined).

The following notes are given to the "paper size setting" command.

Figure 19:
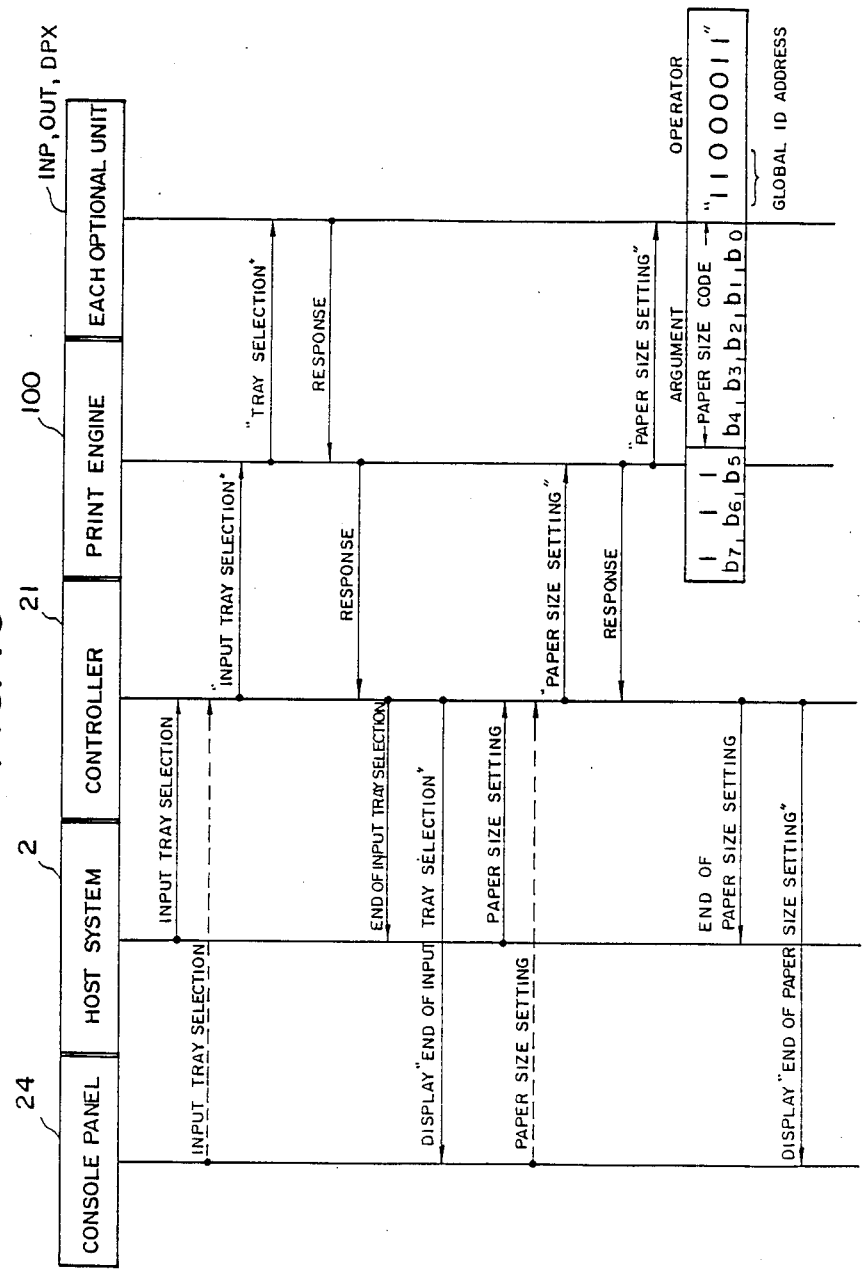
FIG. 19 is a diagram of an operation of the entire printer system when an input tray is selected and a paper size is set.

(i) The bits $b_4-b_0$ of each of the codes listed in FIG. 19 are used for setting the paper size code in the argument of the command.

(ii) A 5-bit paper size code is detected by the print engine 100, or is set by the controller 21, or is provided by an optional input unit capable of detecting the paper size. If such a 5-bit paper size code is not identical to any of the codes shown in FIG. 19, the print engine 100 selects the paper size code having the nearest length from among those codes, and lets the optional unit know the selected paper size code.

(iii) The "paper size setting" command is effective for optional output units and duplex units. This command is also effective for optional input units if they cannot detect the paper sizes of their own trays automatically. However, if the print engine 100 issues this command to a paper size detectable input unit, this optional input unit returns the paper size code which is automatically detected independently of the information from the print engine 100.

(iv) If the print engine 100 issues this command with a global ID address, all optional units set the paper size in the currently selected tray to the designated paper size code with the highest priority. However, the optional units do not send any responses.

"Abort" command: "***01111"

This command urgently stops paper transport within optional units and sets every actuator of each optional unit to the initial position.

Format: "operator" only operator;
 $b_7-b_5$: logical ID code or global ID address "110"
 $b_4-b_0$: "01111"
The operators each consisting of bits $b_7$ to $b_0$ can be represented by 2-bit hexa codes as follows.
 [0Fhex] optional input unit #1
 [2Fhex] optional input unit #2
 [4Fhex] optional duplex unit
 [8Fhex] optional output unit #1
 [AFhex] optional output unit #2
 [CFhex] global ID address "11001111"

Response
 $b_7$: "0"
 $b_6-b_0$: unit status code
The following notes are given to the "abort" command.

(i) This command stops paper transport urgently within each optional unit. After receiving this command, the specified optional unit immediately stops all operation even if it is transporting sheets of paper.

(ii) This command sets actuators of an optional unit (an actuator for lifting a paper bottom table in the large capacity input paper feed unit, for example) at the respective initial positions.

(iii) If the print engine 100 issues this command with a global ID address, all optional units execute the "abort" command with the highest priority. However, the optional units do not send any responses.

A description is given of examples about how to use global ID commands, and advantages presented by the use thereof.

(1) "Initialization" command

When initializing the printer system, the controller 21 issues the "initialization" command to the print engine 100. Then the print engine 100 issues the "initialization" command to all the optional units. It is noted that it takes long to carry out the initializing operation and self diagnosis. It is further noted that conventionally, every optional unit is sequentially subjected to initialization, or in other words, every optional unit is sequentially supplied with the "initialization" command. Thus, it takes extremely long to complete initialization for all the optional units. On the other hand, according to the present embodiment, it is possible to initialize all the optional units at the same time and thus reduce a time it takes to initialize all the optional units. Further, since the global ID command is effective for all the device ID codes including optional units which have not been assigned any logical ID codes, all the optional units connected to the printer main body 1 can execute the "initialization" command at (2) "Paper size setting" command When printing is executed with an optional input unit which does not have the paper size self detection function, it is possible to set the paper size in the optional input unit, output unit and duplex unit at the same time by using the "paper size setting" command as a global ID command. Thus, it is possible to reduce the number of times that the print engine 100 issues commands, so that the paper size setting procedure can be simplified.

(3) "Abort" command

When a paper jam occurs in an optional unit, paper may be damaged or a plurality of sheets of paper are jammed at the same position, unless paper transport of all paper is stopped urgently. Conventionally, an instruction for stopping paper feed is sequentially sent to the optional units one by one. In this procedure, there is a possibility that a secondary paper jam may occur before the instruction is issued. On the other hand, according to the present embodiment, all the optional units can execute the "abort" command at the same time, so that the printer system can stop printing immediately and thus the occurrence of a secondary paper jam can be prevented.

(4) Others

When the same mode is set to all optional units, the "mode setting" command may be used as a global ID command. Thereby, it is possible to reduce the number of times that commands are issued. The "length of print engine path" command, "registration distance" command or "transport velocity" command may be used as a global ID command. Thereby, the related procedures can be simplified.

COMMUNICATION BETWEEN CONTROLLER 21 AND PRINT ENGINE 100

A description is given of communication between the controller 21 and the print engine 100. The communication conditions defined between the controller 21 and the print engine 100 are the same as those for communication between the print engine 100 and the optional units. That is, the following is defined.

Interface: asynchronous serial interface
Bit rate: 9600 baud
Parity bit: none
Stop bit: "1"

The following communication interface signals are transferred between the controller 21 and the print engine 100.

(1) /PERXD ("/" denotes a low-active logic signal.)

This signal is a reception data signal in serial communication for sending the controller 21 to the print engine 100.

(2) /PETXD

This signal is a transmission data signal in serial communication for sending a response and an event report from the print engine 100 to the controller 21.

(3) /PEDTR

This signal is a ready signal in serial communication for transmitting a command. When this signal is low, the controller 21 is allowed to send a command to the print engine 100. The print engine 100 must always hold this signal low except the time of power up or initialization (including the system configuration).

(4) /PECTS

This signal is a ready signal in serial communication for sending a response or an event report. When this signal is low, the print engine 100 is allowed to send a response or an event report to the controller 21. The controller 21 always holds this signal low except the time when the power supply is started or the controller 21 cannot communicate with the print engine 100. If the print engine 100 receives a large number of event reports during the time when the "/PECTS" signal is high, the print engine 100 may destroy old event reports.

A description is given of a communication protocol between the controller 21 and the print engine 100. Communication is carried out by sending a command from the controller 21 to the print engine 100 and then returning a response from the print engine 100 to the controller 21.

FIGS. 12(a) and 12(b) are diagrams of an argument and an operator of the command transferred between the controller 21 and the print engine 100. The most significant bit of the argument is always "1", and the most significant bit of the operator is always "0". The command is transferred by sending its argument first and its operator second. The argument may be omitted. Even when the print engine 100 receives a command having no argument, it correctly recognizes this command. When a command originally consisting of argument and operator (when the "status request" command is issued without argument) is issued without an argument, the argument of the previous same command is effective. When the print engine 100 finds no effective command, it uses the default value as the argument.

Information required by the controller 21 is transferred by sending a response from the print engine 100 to the controller 21. The length of a response is equal to one byte, and the most significant bit thereof is normally "0", as shown in FIG. 12(c). All bits of a response to "illegal" command are "1", as shown in FIG. 12(d).

An event report is used for sending information which is not requested as a response when an event occurs in an optional unit or the print engine 100 (the occurrence of paper jamming or short supply). Each even report is of a one-byte length and the most significant bit thereof is "1". A 'ETB' command generated by the controller 21 controls the occurrence of event reports.

The controller 21 sends the following commands to the print engine 100. The commands transferred between the controller 21 and the print engine are classified into thirteen basic commands and three enhanced commands.

[Basic Commands]

1. Status request 'ENQ'

This command requests the status of the print engine 100. If the controller 21 requests the same status again, it can send the operator only. In this case, the previous argument is effective.

2. Inquire input tray condition 'SI'

This command inquires the status of the input tray designated by an argument. If the controller 21 inquires the status of the same input tray again, only the operator is necessary. In this case the previous input tray is effective.

3. Inquire output tray condition 'SO'

This command inquires the status of the output tray designated by an argument. If the controller 21 inquires the status of the same tray again, only the operator is necessary. In this case, the previous output tray is effective.

4. Inquire paper size of input tray 'EM'

This command inquires the paper size of the input tray designated by an argument. If the controller 21 inquires the status of the same tray again, only the operator is necessary. In this case, the previous input tray is effective.

5. Field start 'FF' (*)

This command requests the print engine 1 00 to feed a sheet of paper from the current active input tray or duplex unit to the registration position of the print engine 100. The sheet of paper remains at the registration position until a "print start" command is issued to the print engine !00. The print engine 100 returns the paper ID code number.

6. Print start 'VT' (*)

This command has two modes of operation. In the first mode, the "print start" command is preceded by a "feed start" command, whereas in the second mode the "print start" command instructs the print engine 100 to print a sheet of paper which is waiting at (or is in transit to) the registration position due to the preceding 'FF' command (the 'VT' command can be sent to the print engine 100 at any time or sequence after an 'FF' command is issued). In the second mode, the 'VT' command instructs the print engine 100 to execute the effect of a "feed start⇌ command immediately followed by a first mode "print start" command. A second mode 'VT' command is not preceded by a 'FF' command. The print engine 100 judges automatically whether 'VT' command is used in the first mode or in the second mode by the sequence of commands received.

7. Input tray selection 'DC1' (*)

This command selects a desired paper input tray. The "input tray selection" command is effective from the following 'FF' commands or from the following second mode 'VT' commands.

8. Output tray selection 'DC2' (*)

This command selects a desired paper output tray. The "output tray selection" command is effective from the following command or from the following second mode 'VT' command.

9. Event report cable 'ETB'

This command enables or disables the print engine 100 to transmit an event report.

10. Print engine mode setting 'DC4' (*)

This command sets the print engine mode.

11. Paper size setting 'DC3' (*)

This command sets the paper size of the last designated input tray by using 'DC1' "input tray selection" command. Therefore, this command is issued after sending 'DC1' command. "Paper size setting" command is effective only for the input tray which cannot detect the size of paper automatically.

12. Inquire existed paper ID 'ACK'

This command inquires an eject paper ID number. The print engine 100 sends ejected paper ID and ID buffer status as a response to the 'ACK' command. The print engine 100 stacks ejected ID numbers into the internal ID buffer and eliminates reported ID numbers from the ID buffer. However, the print engine 100 retains the last stacked ID number. "Reported ID number" is the paper ID which the print engine 100 sent to the controller 21 as an event report or as a response to the 'ACK' command. The print engine 100 always sends the earliest ID number in the internal ID buffer.

13. Reset 'CAN'

This will be described later.

[Enhanced Commands]

14. Assign device ID 'FS'
15. Inquire assigned device ID 'GS'
16. Inquire communication active device ID 'RS'

Those enhanced commands will be described later.

The commands given "*" are stored in a command queue buffer formed in the RAM 203 (FIG. 8) and are sequentially executed. However, if "input tray select", "output tray select", "print engine mode setting" and "paper size setting" commands (commands with an argument) are not followed by the "feed start" command nor by the "print start" command, the same kind of command but with a different argument will take precedent over the previous command. Thus, the previous command will be eliminated from the command queue buffer and will not be effective. Therefore, a tray, a paper size or a mode designated by a command is not actually selected until the 'FF' or 'VT' command is issued. Also, commands issued after 'FF' or 'VT' command do not effect commands sent prior to the 'FF' or 'VT' command.

The print engine 100 retains the status or mode which was designated by the command of "input tray select", "output tray select", "print engine mode select" or "paper size setting" until the status or mode is selected by these commands again. The print engine 100 does not spontaneously clear the command queue buffer, and clears it in response to the command from the controller 21. The "feed start" command and the "print start" command are deleted from the command queue buffer when these are executed. If the mode setting and tray select are appropriate and a sufficient number of "paper start" and "print start" commands are stored in the command queue buffer or these commands are issued by the controller 21 at appropriate intervals, the print engine 100 executes these commands with a maximum throughput (print speed).

The following is the general command sequence for the controller 21 when requesting the print engine 100 to print.

(1) Input tray selection

This command selects one of the available input trays including the duplex unit or units. If the argument is omitted, the previous input tray is effective. In case where the "input tray select" command is not issued, the previous input tray is effective.

(2) Output tray selection

This selects one of the available output trays including the duplex unit or units. If the argument is omitted, the previous output tray is effective. In case where the "output tray select" command is not issued, the previous output tray is (3) Feed request This is done by sending the "feed start" command to the print engine 100. If this command is not issued, the next "print start" command is effective for paper feeding and printing.

(4) Print request

This is done by sending the "print start" command to the print engine 100. The controller 21 can also request the print engine 100 to execute printing with a "print request sequence of /PRINT and /PREADY handshaking", when the "Ignore /PRINT signal flag" for the "system current mode" is false "0".

This request sequence is to be executed prior to 'FF' and 'VT' commands. However, it is not to be stacked into the command queue buffer and is available only with real time execution. If the controller 21 will not request printing through /PRINT signal, the controller 21 sets the print engine mode to "ignore /PRINT signal" mode by issuing the appropriate 'DC4' command. If the print engine 100 receives a request for printing both through /PRINT signal and 'FF' and 'VT' commands, execution of commands will be incorrect due to the command timing and sequence. The controller 21 requests the current status of the print engine 100 (for example, "current active input tray") just before requesting the print engine 100 to execute printing through the /PRINT signal line.

The response to the commands that are marked with "*" are stored in the command queue buffer, are transmitted by the print engine 100 just after receiving the command, not when executing the command. Therefore, the contents of a response may sometimes differ from the actual status of the executing command. For example, after replying to the input selection command, if another cassette size is mounted in the selected input tray (due to paper end, etc.), the actual paper size differs from the size sent by the print engine 100 as a response to the input selection command. In this situation, the print engine status reflects an error condition ("input size mismatch").

Status request commands relate to the "current active input tray", "current active output tray" and "system current mode status". The print engine 100 returns the status of the current active trays (those designated for the 'FF' or 2nd mode 'VT' command just starting to be executed) or the current active mode. The print engine 100 does not return tray codes or modes designated by commands yet to be executed in the command queue buffer.

The capacity of the command queue buffer is desired to be as large as possible, and depends on the maximum print speed of the print engine 100. A capacity corresponding to 32 sheets of paper may be enough where the print speed of the print engine 100 is less than 20 pages/minute.

When the print engine 100 is busy and cannot execute the 'FF' or 'VT' command due to paper end or paper full condition, the controller 21 issues "clear command queue buffer" command ('CAN') first, and then reselect a new input tray or output tray in order to change the current active input tray of the current active output tray.

In some cases, the print engine 100 predicts the status of each optional unit and responds according to these predicted status. For example, overflow or paper end condition of the optional duplex unit is predicted because these conditions depend on the outcome of previous commands. This applies also to commands still in the command buffer and yet to be executed.

The "reset" command and its response are described below. Communication between the controller 21 and the print engine 100 is established by sending a command from the controller 21 to the print engine 100 and then sending a response to the received command from the print engine 100 to the controller 21. The "reset" command is used when the controller 21 instructs the print engine 100 to execute one of the following:

(a) Reset the command error flag (paper size error, for example)

(b) Reset a mis-feed flag, (c) Clear the command queue buffer, (d) Set the print system to the initial state, and (f) Execute the system initialization or reset the maintenance request flag.

If the controller 21 wants to request the same function again, the controller 21 can send the operator only. In this case, the previous function is effective.

Format: "argument" +'CAN'<18 (hex)> argument;

$b_7$: "1"

$b_6$–$b_3$: "XXXX" (reserved for enhancement)

$b_2$–$b_0$: function code (see the the following table)

For instance, "1xxxx100" is an argument of the "initialization" command.

Response

"printer general status"

| Function code | | | |
|---|---|---|---|
| $b_2$ | $b_1$ | $b_0$ | Function |
| 0 | 0 | 0 | Reset command error flag |
| 0 | 0 | 1 | Reset mis-feed flag |
| 0 | 1 | 0 | Clear the command queue buffer |
| 0 | 1 | 1 | Set the system to initial state |
| 1 | 0 | 0 | Request to execute system initialization |
| 1 | 0 | 1 | Reset waiting for restarting flag |
| 1 | 1 | 0 | Reserved for enhancement |
| 1 | 1 | 1 | Reset the maintenance request flag |

Default

If the controller 21 requests without an argument just after power up or initialization, the print engine 100 executes "reset function" corresponding to the lowest argument number and returns the general status.

[Enhanced Commands]

The enhanced commands sent from the controller 21 to the print engine 100 are described below.

"Assign device ID" 'FS'

The protocol specification between the controller 21 and the print engine 100 basically supports the print engine 100 consisting of:

print engine input trays, print engine output trays, a maximum of two optional input units (directly communicate with the print engine 100), a maximum of two optional output units (directly communicate with the print engine 100), and, a maximum of one optional duplex unit (directly communicate with the print engine 100).

The print engine 100 can deal with third, fourth and more optional units with allocating them to logical ID codes. The controller 21 can assign a device ID code to a logical ID code and can change system configuration by using this command. In other words, any communication active optional units can construct the engine system. The region of device ID code is #0–#15 for each "optional input unit", "optional output unit" and "optional duplex unit".

Format: "argument" +'FS'[1Chex]

argument;
$b_7$: "1"
$b_6$–$b_4$: logical ID code
$b_3$–$b_0$: device ID code

Response: "ID assignment"

$b_7$: "0"
$b_6$–$b_4$: specified logical ID code
$b_3$–$b_0$: assigned device ID code On power up or after initializing, the default value of the argument is as follows:

| $b_6$ | $b_5$ | $b_4$ | $b_3$ | $b_2$ | $b_1$ | $b_0$ |
|---|---|---|---|---|---|---|
| 0 | 0 | 0 | 0 | 0 | 0 | 0 |

The following notes ar given to the "assign device ID" code.

If the print engine 100 can not handle this command, the print engine 100 always replies 7Fhex for this command. The controller 21 recognizes that the print engine 100 is not an enhanced system (a device ID code is allocated the same number as a logical ID code). This command is issued during the time when the print engine 100 is in the absolutely ready state (There are no stacked 'FF' nor 'VT' commands in the command queue buffer and no sheets in the paper path of the system). Otherwise the print engine 100 will not accept this command and will reply the previous assignment. If the optional unit corresponding to the specified device ID is not currently available (is communication inactive at present), the print engine 100 replies the previous assignment. Moreover, if the previous assignment unit does not exist, the print engine 100 replies with $b_6$–$b_4$ set to "111" indicating that the specified unit is not available.

"Inquire assigned device ID" 'GS'

The controller 21 can confirm the device ID code which is assigned to each logical ID code number by using this command.

Format: "argument" +'GS'[1Dhex]

argument;
$b_7$:"1"
$b_6$–$b_4$: logical ID code
$b_3$–$b_0$: (reserved for enhancement)

Response: "ID assignment"

$b_7$: "0"
$b_6$–$b_4$: specified logical ID code
$b_3$–$b_0$: assigned device ID code On power up or after initializing, the default value of the argument is as follows:

| $b_6$ | $b_5$ | $b_4$ | $b_3$ | $b_2$ | $b_1$ | $b_0$ |
|---|---|---|---|---|---|---|
| 0 | 0 | 0 | x | x | x | x |

If the print engine 100 cannot handle this command, the print system 100 always replies 7Fhex for this command. An the controller 21 understands that the print engine 100 is not enhanced system (a device ID code is allocated the same number as a logical ID code). If the optional unit corresponding to the specified logical ID code is not currently available (is communication inactive at present), the print engine 100 replies with $b_6$–$b_4$ set to "111" indicating the specified unit is not available.

"Inquire communication active device ID" ,RS,

This command is used for the controller to confirm the device ID code of currently communication active unit, regardless of whether the designated unit is assigned to a logical ID code.

Format: "argument" +'RS'[1Ehex]

argument;
$b_7$: "1"
$b_6$–$b_5$: unit type code
$b_4$: (reserved for enhancement)
$b_3$–$b_0$: device ID code Response: "ID assignment"

$b_7$: "0"
$b_6$–$b_5$: specified unit type code
$b_4$: (reserved for enhancement)
$b_3$–$b_0$: communication active unit ID code On power up or after initializing, the default value of the argument is as follows:

| $b_6$ | $b_5$ | $b_4$ | $b_3$ | $b_2$ | $b_1$ | $b_0$ |
|---|---|---|---|---|---|---|
| 0 | 0 | x | 0 | 0 | 0 | 0 |

If the print engine 100 cannot handle this command, the print engine 100 always replies 7Fhex for this command. The controller 21 recognizes that the print engine 100 is not an enhanced system (a device ID code is allocated the same number as a logical ID code). The controller 21 can send this command with setting $b_3$–$b_0$ of the argument to any of device ID codes of #0–#15. The print engine 100 replies the nearest device ID code that is currently communication active. The nearest device ID code is the number which is equal to or greater than the specified device ID code number. If there is no communication active device ID code number, which is equal to or greater than the specified device ID code number of the specified unit type code, the print engine 100 replies with $b_6$–$b_4$ set to "111" indicating that the specified device ID code is not available.

INITIAL SET UP

Figure 13:
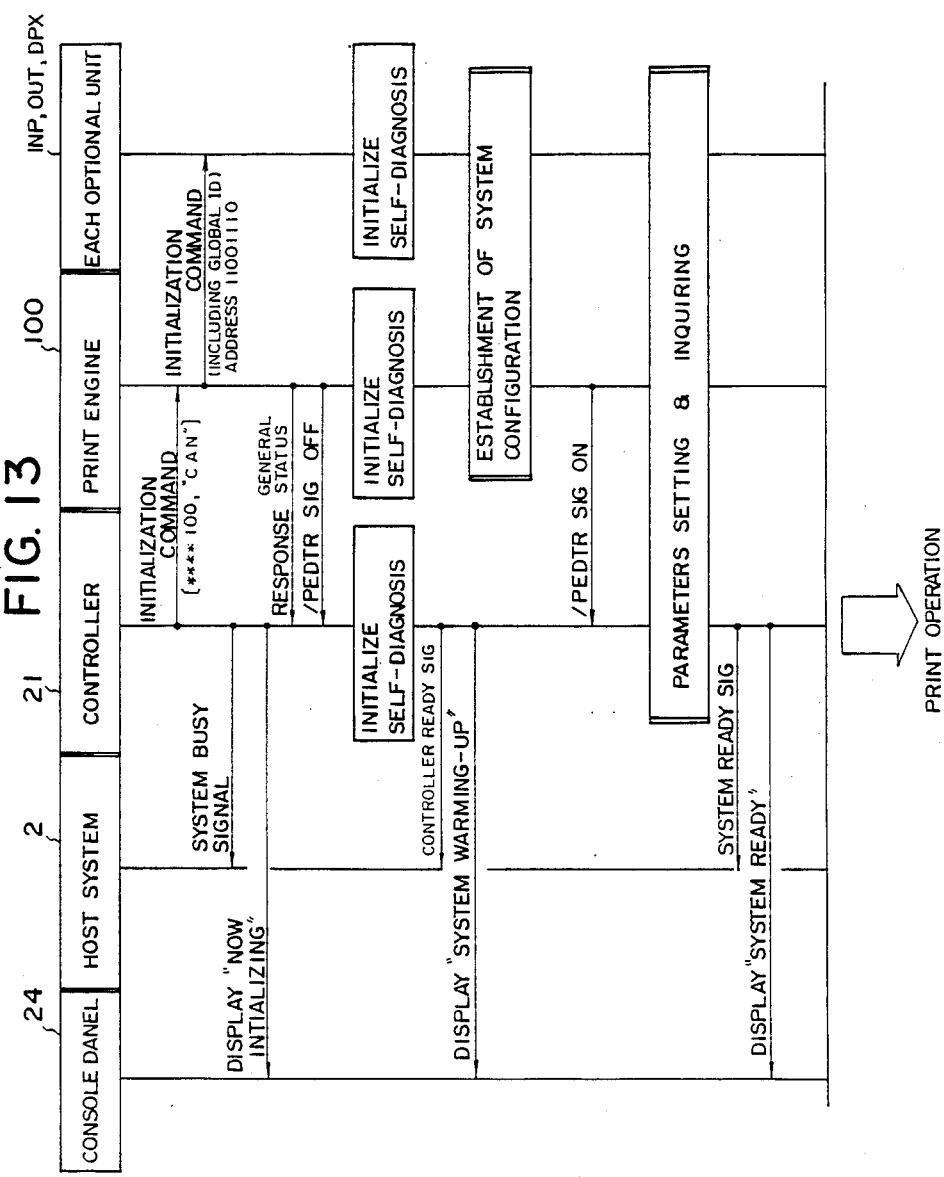
FIG. 13 is a diagram of an operation of the entire printer system when turning power on and executing initialization.
Figure 14:
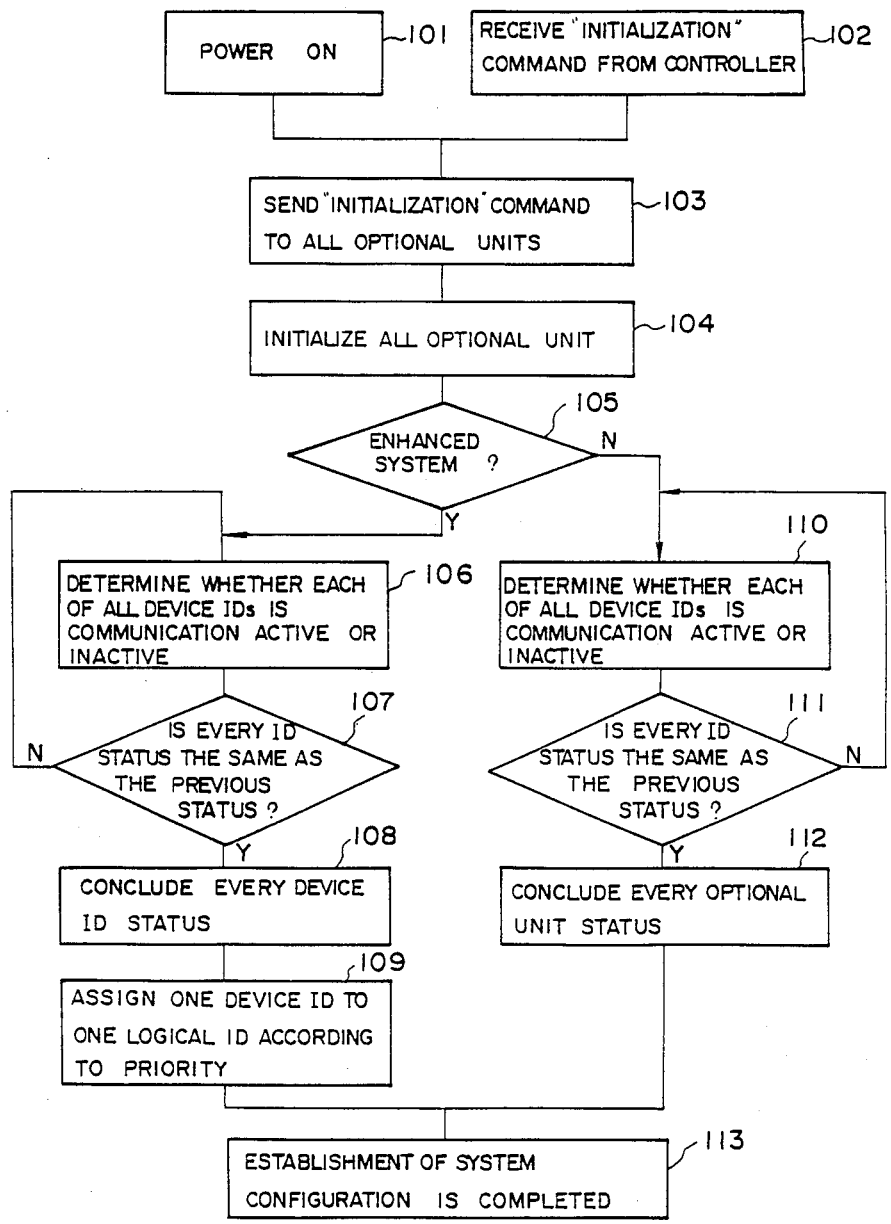
FIG. 14 is a flowchart of an operation of the print engine when turning power on and executing initialization.

A description is given of an initial set up with respect to FIGS. 13 and 14.

FIG. 13 relates to transmission performed when initializing. FIG. 13 is a diagram of a sequence of signal transmission between the console panel 24, the host system 2, the controller 21, the print engine 100 and each optional unit INP, OUT, DPX. FIG. 14 is a flowchart of an operation of the print engine 100 during initial set up.

When the print engine 100 is powered ON (step 101) or the print engine 100 receives the aforementioned "initialization" command supplied from the controller 21 (step 102), the print engine 100 sends the "initialization" command to all the optional units (step 103). The "initialization" command may have an operator of "11001110" which includes a global ID address "110". The print engine 100 is initialized by executing the self-initialization and self-diagnosis. On the other hand, all the optional units which are in the communication active state and receive the "initialization" command from the print engine 100, are initialized by executing self-initialization and self-diagnosis (step 104).

Thereafter, the print engine 100 determines whether the present printer system is an enhanced system (step 105). If the result in step 105 is YES, the printer system is an enhanced system, and therefore the print engine 100 determines, two times or more, whether all device ID codes (a maximum of 48 device ID codes) are in the communication active state or the communication inactive state (step 106). Then the print engine 100 discerns whether the status of each of the device ID codes is the same as the previous status (step 107). When the status of each of the device ID codes is the same as the previous status, the print engine 100 concludes the status of each of the device ID codes. It is to be noted that the above-mentioned procedure which is carried out two times or more, intends to prevent the print engine 100 from mistakenly concluding the status of each of the optional units which are in an unstable state (transient state). Thereafter, one device ID code is assigned to one logical ID code in the order of priority (step 109). When the procedure in step 109 is completed, the system configuration is established (step 113).

The priority defined in the present embodiment consists of priority #1 and priority #2.

Priority #1: communication active unit
Priority #2: younger device ID code

On the other hand, when the result in step 105 is NO (that is, the printer system is not an enhanced system but a basic system), the print engine 100 discerns whether all the logical ID units (5IDs) are in the communication active state for at least two times (step 110). When the status of each logical ID unit is the same as the previous status, the print engine 100 concludes the status of each optional unit (step 112), and completes the establishment of system configuration (step 113). It is noted that the print engine 100 is inhibited from issuing a command to the optional units during its own initialization. It is further noted that each optional unit is inhibited from sending a response to the print engine 100 during its own initialization.

After the system configuration is established, the print engine 100 is permitted to communicate with the controller 21. As shown in FIG. 13, the print engine 100 holds the aforementioned "/PEDTR" signal (communication ready signal) high (communication inhibited; OFF) until the completion of the establishment of system configuration. The /PEDTR signal ("/" denotes a low-active signal) is a ready signal for transmission of command. When this signal is low, the controller 21 is allowed to send a command to the print engine 100. The print engine 100 holds this signal low during power on or initialization (including the establishment of system configuration).

A description is given of the establishment of system configuration. Status of all the optional units (all device ID codes) viewed from the print engine 100 are classified into the following four groups.

(1) Allocated active: An optional unit has been assigned to a logical ID code, and can communicate with the print engine 100 at present.

(2) Allocated inactive: An optional unit has been assigned to a logical ID code; however presently it does not correctly communicate with the print engine 100.

(3) Deallocated active: Although an optional unit has not been assigned to any logical ID code, it can communicate with the print engine 100.

(4) Deallocated inactive: An optional unit has not been assigned to any logical ID code, and does not correctly communicate with the print engine 100.

A transmission from each status to different status is based on the following causes. (1)→(2): A communication error is detected for two times or more.

(1)→(3): An optional unit is deallocated by the "assign device ID" command (***11001).
(1)→(4): No direct transition
(2)→(1): A correct response to a command is sent back.
(2)→(3): No direct transition
(2)→(4): An optional unit is deallocated by the "assign device ID" command (***11001).
(3)→(1): A correct response to the "assign device ID" command (***11001) is sent back.
(3)→(2): An incorrect response to the "assign device ID" command (***11001) is sent back, or no response is sent back.
(3)→(4): An incorrect response to the "inquire device ID" command (***11011) is sent back, or no response is sent back.
(4)→(1): A correct response to the "assign device ID" command (***11001) is sent back.
(4)→(2): An incorrect response to the "assign device ID" command (***11001) is sent back, or no response is sent back.
(4)→(3): A correct response to the "inquire device ID" command (***11011) is sent back.

The establishment of system configuration is a procedure such that all device ID codes are classified into any one of the above-mentioned four statuses. As described previously, the total number of units is equal to a maximum of 48 device ID codes (16×3 =48: 16 units (#1-#16) may be provided for each of paper feed, paper eject and paper transport). In the case of an enhanced system, it is necessary to conclude the statuses of all the device ID codes. On the other hand, in the case of a basic system, all optional units are in the allocated state. Therefore, it is enough to conclude the statuses of only five units (paper feed units #1, #2, paper eject units #1, #2, and duplex unit).

Figure 15A:
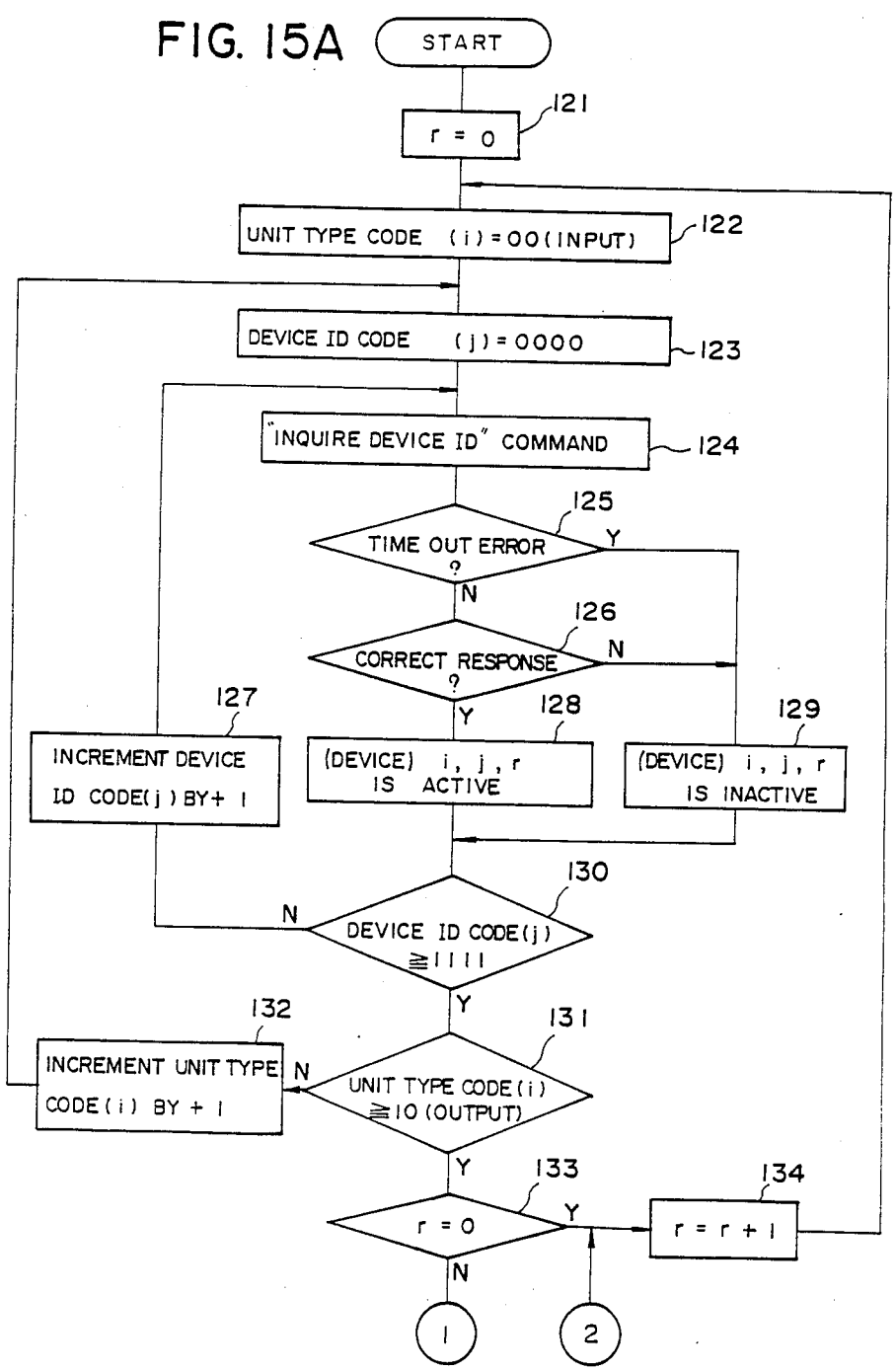
FIGS. 15A and 15B are flowcharts of an operation of the print engine when system configuration is established.
Figure 15B:
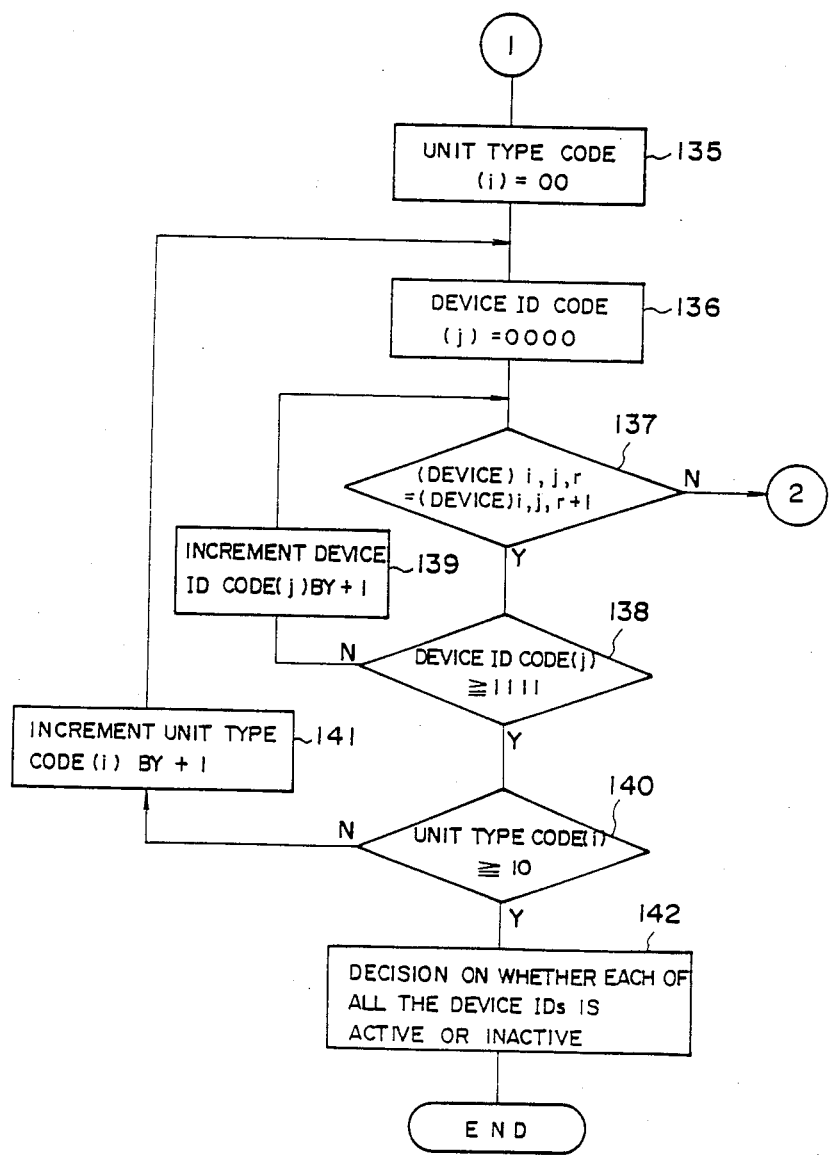

FIGS. 15A and 15B are flowcharts of a procedure for the establishment of system configuration by the print engine 100. Referring to FIG. 15A, the procedure commences to execute step 121 where a counter r for showing how many times the status of each optional unit is repetitively checked. In this step, the counter r is reset to "0". Then, the print engine 100 sets the unit type code (i) to "00" (IN) (step 122), and sets the device ID code (j) to "0000" (#1) (step 123). Then the print engine 100 sends the "inquire device ID" command shown in FIG. 11(d) (step 124). Thereafter, the print engine 100 determines whether a time-out error has occurred (step 125). If a time-out error has occurred, or if a received response is not correct (step 126) although no time-out error is detected in step 125, the print engine 100 concludes that the optional input unit IN#1 is in the communication inactive state for r=0, and stores this conclusion (step 129). Then the print engine 100 discerns whether the device ID code reaches "1111" (step 130). When the result in step 130 is NO, the print engine 100 increments the device ID code by +1 (step 127), and sends the device ID code (j+1) (step 123) and then the "inquire device ID" command (step 124). In this manner, the above-mentioned procedure is repetitively carried out until the device ID code becomes equal to "1111", and stores information on whether each of all the optional input units is in the communication active state or the communication inactive state.

When the device ID code reaches "1111" and the unit type code does not reach "10", the print engine 100 increments the unit type code by +1 so that the unit type code becomes "01" (step 132). Then the print engine 100 sequentially increments the device ID code from "0000" (step 123) and sends the "inquire device ID" command (step 124). In this manner, the print engine 100 stores information on whether each of the duplex units is in the communication active state or the communication inactive state.

In the same manner, the print engine 100 gets and stores information on whether each of the optional output units is in the communication active state or the communication inactive state.

When the print engine 100 completely gets and stores the communication active/inactive states of all the optional units, it increments the counter r by +1 so that it becomes r+1. Then, the same procedure is carried out. After this procedure is completed, the print engine 100 determines whether the present confirmation result is identical to the previous confirmation result for every optional unit in a procedure shown in FIG. 15B. That is, the print engine 100 sequentially increments the unit type code (i) and the device code (j) from "0000" (IN) and "1111" (#1), respectively, while it compares the confirmation result for r=0 and the confirmation result for r=1.

First, the print engine 100 sets the unit type code (i) to "00" (step 135). Then, the print engine 100 sets the device ID code (j) to "0000" (step 136). Then, the print engine 100 determines whether the present unit type code and the present device ID code are identical to the previous unit type code and the previous device ID code, respectively (step 137). When the result in step 137 is YES, the print engine 100 determines whether the device ID code (j) has reached "1111". When the result in step 138 is NO, the print engine 100 increments the device ID code (j) by +1 (step 139), and executes the process in step 137. On the other hand, when the result in step 138 is YES, the print engine 100 determines whether the unit type code (i) has reached "10" (step 140). When the result in step 140 is NO, the print engine 100 increments the unit type code (i) by +1 (step 141), and executes the process in step 136. On the other hand, when the result in step 140 is YES, the print engine 100 has obtained the statuses of all the optional units (step 142).

Figure 16:
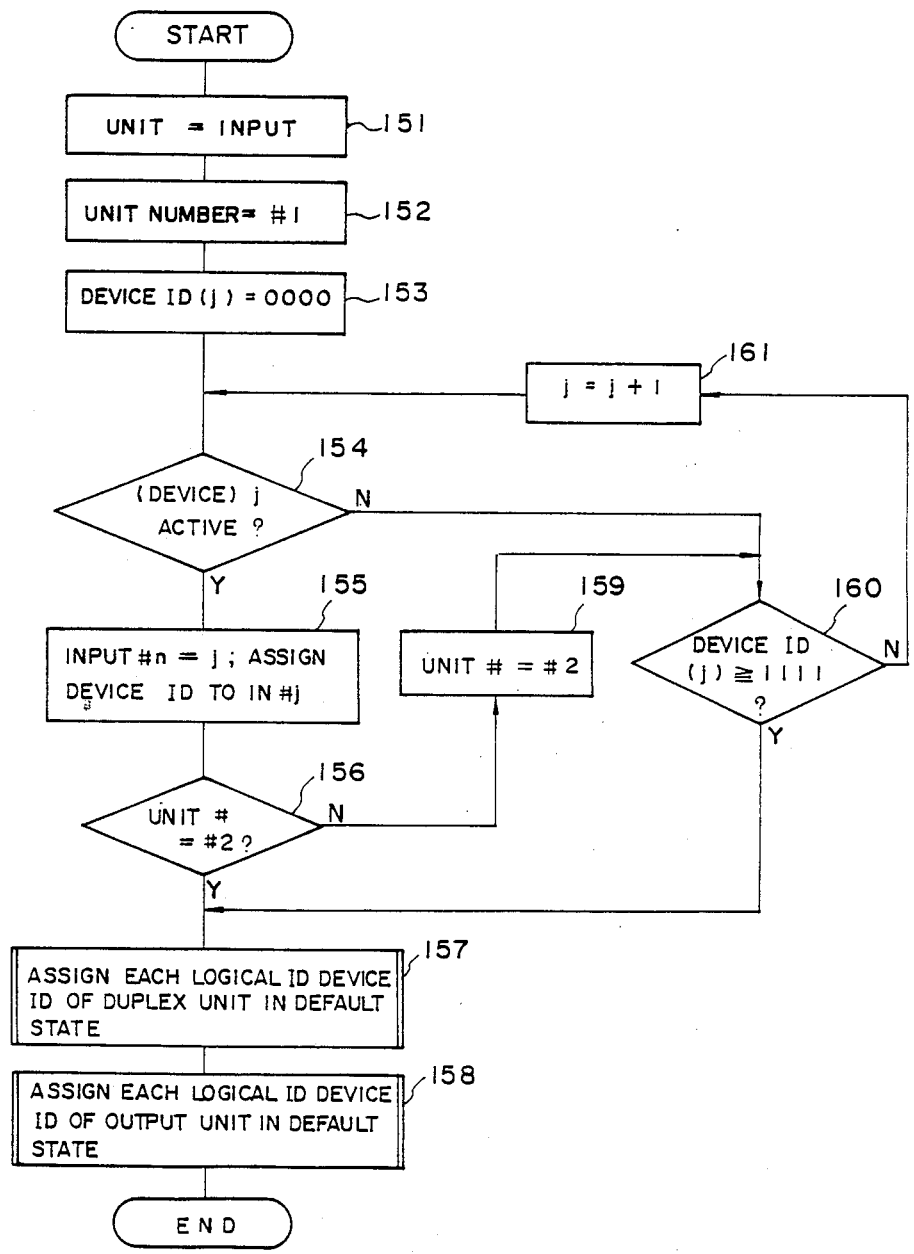
FIG. 16 is a flowchart of a procedure for setting logical ID codes;.

A description is given of a procedure for assigning logical ID devices (optional units) by the print engine 100 which is to be executed at the time of default with reference to FIG. 16. First, the print engine 100 sets the unit type code to INP (step 151), and sets the unit number to #1 (step 152). Thereafter, the print engine 100 sets the device ID code (j) to "0000" (step 153). Then the print engine 100 determines whether the optional input unit having an device ID code (j) of "0000" is in the communication active state (step 154). When the result in step 154 is YES, the print engine 100 assigns the present device ID code to IN#1 (step 155). Then the print engine 100 determines whether the present unit number is #2 (step 156). When the result in step 156 is NO, the print engine 100 sets the unit number to #2 (step 159). Then the print engine 100 determines whether the device ID code (j) reaches "1111" (step 160). When the result in step 160 is NO, the print engine 100 increments the device ID code (j) by +1 (step 161), and executes step 154. In the step 154, the print engine 100 determines whether the optional input unit of concern ("0001" for the second determination procedure) is in the communication active state step 155). When this optional input unit is in the communication active state, the print engine 100 assigns the present device ID code to IN#2 (step 155). If the optional input unit of concern is in the communication inactive state, the print engine 100 sequentially increments the device ID code until the device ID code becomes equal to "1111" (step 160). During this procedure, when the print engine 100 finds a communication active unit, it assigns the device ID code obtained at that time to the found communication active unit.

After the above-mentioned logical ID device assigning procedure for default of each optional input unit is completed, the print engine 100 executes the logical ID device assigning procedure for default of each duplex unit in the same manner (step 157), and thereafter executes the logical ID device assigning process (step 158) for default of each optional output unit.

COMMAND PROCESSING BY OPTIONAL UNITS

Figure 17:
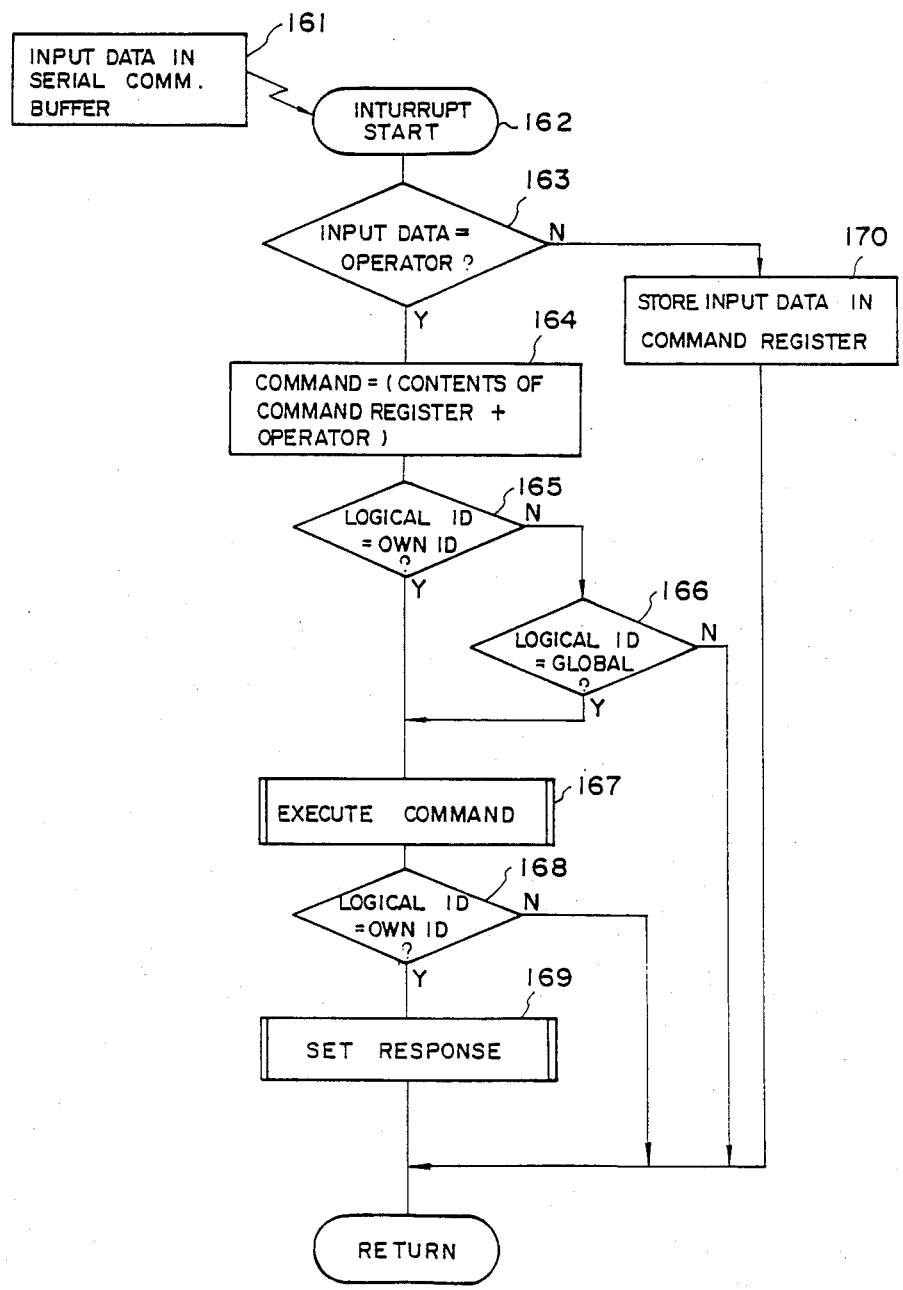
FIG. 17 is a flowchart of an operation of each optional unit when it receives a command from the print engine.

A description is given of a command processing by optional units with reference to FIG. 17.

This processing is executed by the CPU 601 (FIG. 10) when the optional-unit control board 600 (FIG. 10) receives a command from the print engine 100. When the serial communication controller 605 shown in FIG. 10 receives a command from the print engine 100, it stores data of the received command (input data) in the serial communication buffer formed in the RAM 603. When there is input data in the buffer, an interrupt occurs so that the CPU 601 starts the interrupt procedure (steps 161 and 162). The CPU 601 determines whether the received input data is an operator (step 163). When the result in step 163 is NO, the CPU 601 stores the input data into the command register formed in the RAM 603. Then the procedure returns to the main routine thereof. On the other hand, when the result in step 163 is YES, the CPU 601 recognizes that the received command consists of the contents of the command register and the operator (step 164). Then, the CPU 601 discerns whether the logical ID code indicated by bits $b_7$–$b_5$ is identical to its own logical ID code stored in the RAM 603 (step 165). If the result in step 165 is NO, the CPU 601 determines whether the present logical ID code is a global ID address (step 166). As described previously, when bits $b_7$–$b_5$ of the operator are "110", this is the global ID address. On the other hand, when the result in step 166 is NO, the procedure returns to the main routine thereof.

When the logical ID code is its own assigned code or when it is the global ID address even if it is not the own code, the CPU 601 executes the received command (step 167), and determines again as to whether the logical ID code is its own assigned code (step 169). When the result in step 168 is YES, the CPU 601 sets a response and returns to the main routine (step 169). On the other hand, when the result in step 168 is NO, the logical ID code is the global ID address, and thus the CPU 601 sets no response, and returns to the main routine.

ASSIGNMENT CHANGING PROCEDURE

Figure 18:
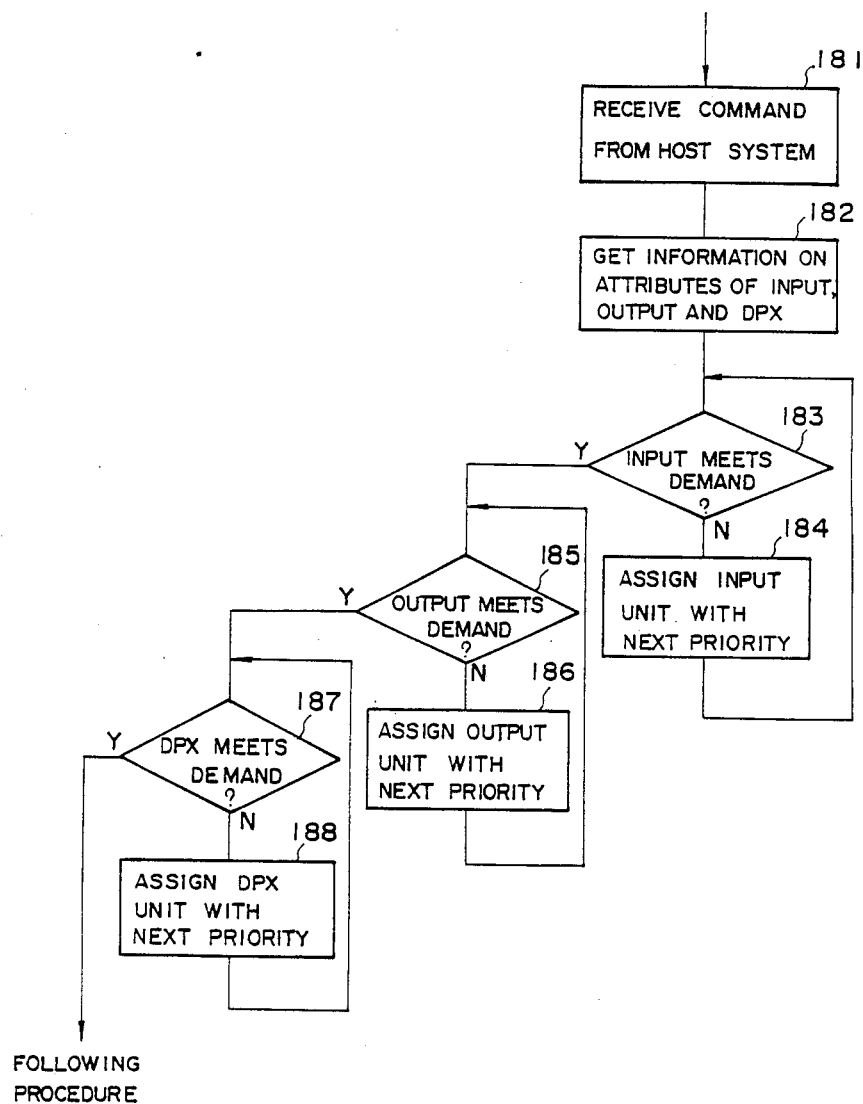
FIG. 18 is a flowchart of an operation of the print engine when it receives a command from a host system.

A description is given of an assignment changing procedure which is to be executed when an optional unit which does not match a demand from the host system 2, has been assigned to a logical ID code, by referring to FIG. 18.

When the print engine 100 receives commands from the host system 2 through the controller 21 (step 181), the print engine 100 gets information on attribute information on each of the assigned paper feed unit INP, the assigned paper eject unit OUT and the assigned duplex unit DPX, such as the paper size to be used, an amount of jobs to be processed, face up/down of ejected paper, duplex print set/unset or sort mode set/unset (step 182). The print engine 100 determines whether the assigned paper feed unit INP can satisfy a demand from the host system 2 (step 183). When the assigned paper feed unit INP is not appropriate, the print engine 100 assigns a paper feed unit having the next priority (step 184). The print engine 100 repetitively carries out the procedure consisting of steps 183 and 184. The print engine 100 executes change of assignment by sending the "assign device ID" command (shown in FIG. 11(b)) to each of the optional units.

When a paper feed unit suitable for the need is found, the print engine 100 determines whether the currently assigned paper eject unit can satisfy the need from the host system 2 (step 185). When the result in step 185 is NO, the print engine 100 assigns an output unit (paper eject unit) having the next priority (step 186). In this manner, the print engine 100 repetitively performs the procedure consisting of steps 185 and 186.

The print engine 100 executes the same process for the currently assigned duplex unit DPX (steps 187 and 188). It is noted that the aforementioned embodiment has only one duplex unit, and change of assignment is impossible if the duplex unit DPX cannot satisfy a need from the host system 2. However, the above-mentioned operation relates to the case where a plurality of duplex units are provided in the printer system.

PAPER SIZE SETTING

A description is given of a procedure for selecting an optional input unit (input tray) and for setting the paper size when the selected input tray does not have the paper size self detection function with reference to FIG. 19.

When the controller 21 receives the input tray selection instruction from the console panel 24 or the host system 2, it sends the print engine 100 the "input tray selection" command. After receiving this command, the print engine 100 sends each of the optional units the "tray selection" command, which is made up of the argument including the tray number, and the operator including the logical ID code to which the input unit having the tray has been assigned. The optional unit which has been assigned to the logical ID code of the received command selects the designated tray, and then returns the response to the print engine 100. The response includes information about whether the tray has been inserted or paper is served in the tray.

When the print engine 100 receives the response, it sends the same response to the controller 21. Then the controller 21 informs the host system 2 that the input tray has been selected, and lets the console panel 24 display "input tray selection end". Thereafter, when the controller 21 receives the "paper size setting" command from the host system 2 or the console panel 24, it sends the print engine 100 the "paper size setting" command which includes the paper size code shown in FIG. 21. The print engine 100 receives this command, and sends back the response including the designated paper size code to the controller 21. On the other hand, the print engine 100 sends the optional units the global ID command of the "paper size setting" command which consists of the argument including the paper size code for paper to be set, and the operator including the global ID address "110".

When receiving the global ID command, each of the optional units substitutes the paper size code defined by the received global ID code for the present paper size code. On the other hand, the controller 21 receives the response from the print engine 100, it lets the host system 2 know the completion of paper size setting and has the console panel 24 display "end of paper size setting".

ABORT PROCEDURE

Figure 20:
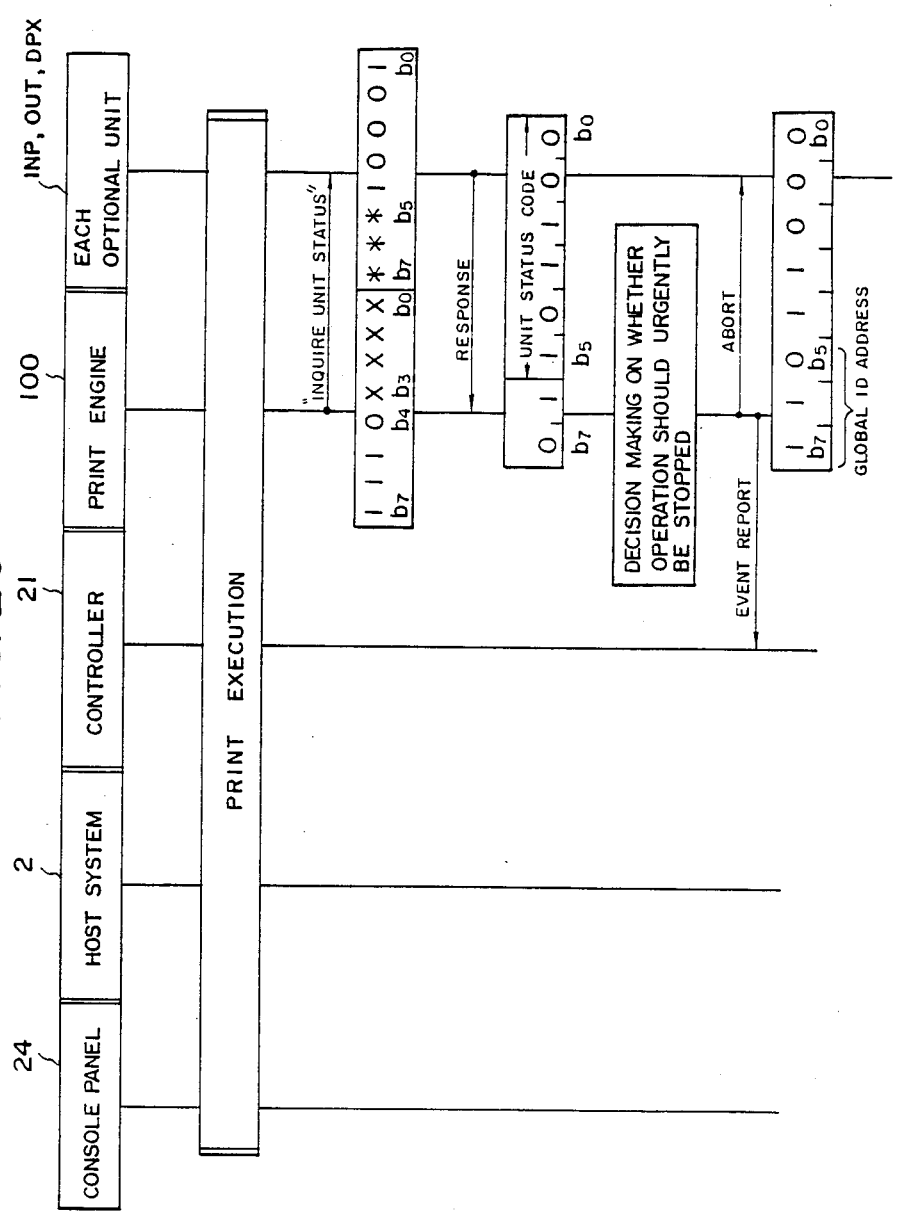
FIG. 20 is a diagram of an operation of the entire printer system when an error occurs during printing.

An abort procedure is described below with reference to FIG. 20. The print engine 100 can inquire the status of each of the optional units by sending it the "inquire unit status" command having the related logical ID code represented by bits $b_7$ to $b_5$. The optional unit which has been assigned to the logical ID code sends the print engine 100 a response which includes the "unit status code" indicative of the status of the unit. If the unit status code of the response is "101100", it is an error code which indicates the occurrence of paper jam at the paper eject position. The print engine 100 receives the response, and makes a decision about whether the system should urgently be stopped. If necessary, the print engine 100 sends the aforementioned "abort" command as a global ID command of "11011000". Thereby, the print engine 100 can urgently stop all the optional units that include a deallocated unit or units. Then, the paper transport in all the optional units is urgently stopped, so that the occurrence of a secondary trouble can be avoided. The print engine 100 sends the controller 21 the event report.

A description is given of an operation of the above-mentioned printer system. It is necessary to select an operational input unit, an operational output unit and a duplex unit which are optimum to a demand from the host system 2. The host system must grasp the functions of every optional unit beforehand. For this purpose, a procedure for assigning each of the optional units physically connected to the printer main body 1 to respective logical ID codes and inquiring of it the available functions. The host system 2 executes this process according to a procedure shown in FIG. 22. The following description relates to the printer system shown in FIG. 7. The printer system shown in FIG. 6 can operate in the same manner.

Figure 22:
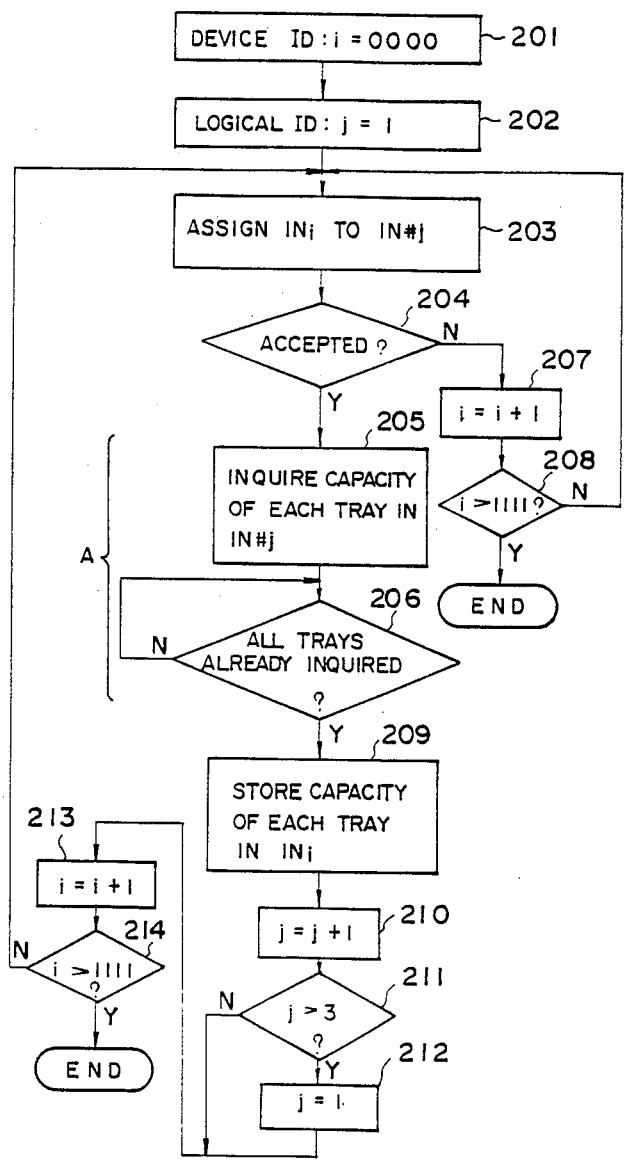

Referring to FIG. 22, the host system 2 sets the device ID code (i) to "0000" (i="0000"; step 201). Next, the host system 2 sets the logical ID code (j) to 1 (step 202). The host system 2 assigns the device ID code INi (an optional input unit) to the logical ID code IN#j (step 203). Then the host system 2 discerns whether the assignment in step 203 has been accepted (step 204). When the result in step 204 is YES, the host system 2 inquires the quantity of each tray provided in the optional input unit IN#j (step 205). When all the trays have been checked (step 206), the host system 2 executes step 209. On the other hand, when the result in step 204 is not accepted, the host system 2 increments the device ID code (i) by +1 (step 207), and discerns whether the device ID code (i) has reached "1111" (step 208). When the result in step 208 is YES, the procedure is terminated. Adversely, when the result in step 208 is NO, the host system 2 executes step 203.

In step 209, the host system 2 stores the quantity of each tray related to the optional input unit INi into an internal memory. Then the host system 2 increments the logical ID code by +1 (step 210), and determines whether the current logical ID code has a number less than 3 (step 211). When the result in step 211 is YES, the logical ID code is incremented by +1, and the procedure proceeds to step 213. On the other hand, when the result in step 211 is NO, the procedure directly proceeds to step 213. In step 213, the host system 2 increments the device ID code (i) by +1 (step 213). Then the host system 2 determines whether the device ID code (i) has a number less than "1111" (step 214). When the result in step 214 is NO, the procedure returns to step 203. On the other hand, when the result in step 214 is YES, the procedure is terminated. Although the procedure shown in FIG. 22 relates to each optional input unit, this holds true for each optional output unit or each duplex unit.

Figure 23:
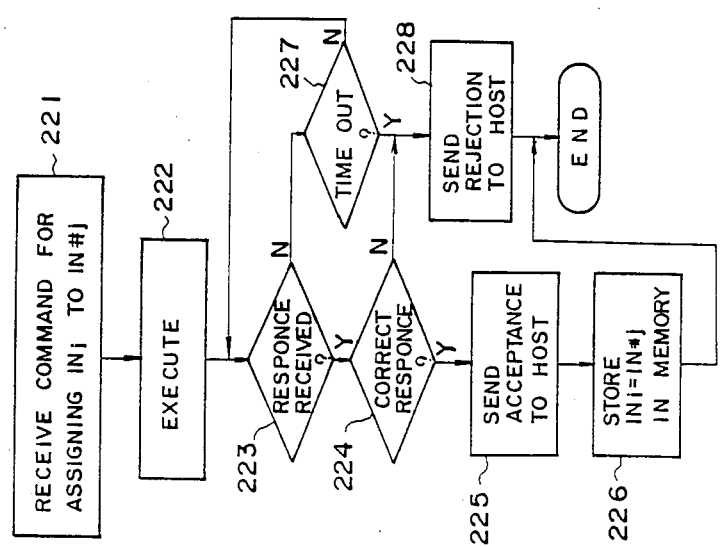

On the other hand, the printer main body 1 operates according to a procedure shown in FIG. 23. The print engine 100 of the printer main body 1 receives the "assign device ID" command for assigning the device ID code INi to the logical ID code #j (step 221). Then the print engine 100 executes the received command (step 222). Then the print engine discerns whether a response to this command is supplied from the related optional input unit (step 223). This is repetitively carried out until a time out error is detected (step 227). When the time out error is detected, the print engine 100 lets the host system 2 know that the present command has been rejected, by sending the response to the command 'FS' (step 228). On the other hand, when the result in step 224 is YES, the print engine 100 discerns whether the correct response is received (step 224). When the result in step 224 is NO, step 228 is executed. On the other hand, when the result in step 224 is YES, the print engine 100 informs the print system 2 that the "assign device ID" command has been accepted, by sending the response to the command 'FS' (step 225). Then the print engine 100 stores information on INi=IN#j into the RAM 203 (step 226). Then the procedure is terminated. The above-mentioned procedure holds true for each optional output unit or each duplex unit.

Figure 24:
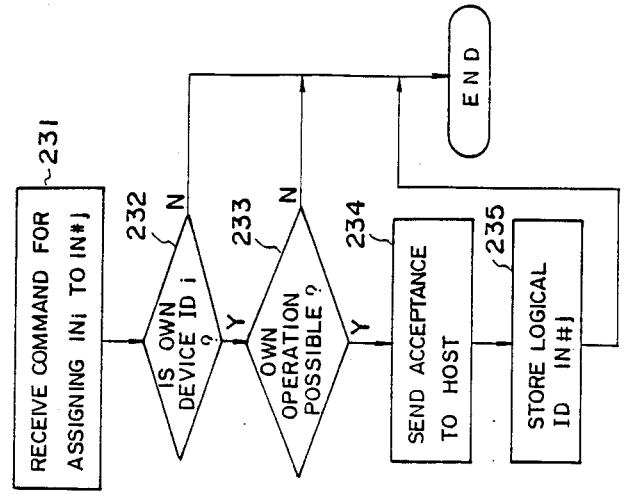

Each optional unit operates according to a procedure shown in FIG. 24. Each optional unit receives the "assign device ID" command for assigning INi to IN#j (step 231). Then each optional unit determines whether its own device ID code is "i" (step 232). When the result in step 232 is NO, the procedure is terminated. On the other hand, when the result in step 232 is YES, the optional unit of concern determines whether its own operation is possible (step 233). When the result in step 233 is NO, the procedure ends. On the other hand, when the result in step 233 is YES, the optional input unit IN#j sends the print engine 100 the response to the "assign device ID" command (step 234). Then the present logical ID code IN#j is stored in the RAM 603 shown in FIG. 10 (step 235). The procedure is terminated.

Figure 25:
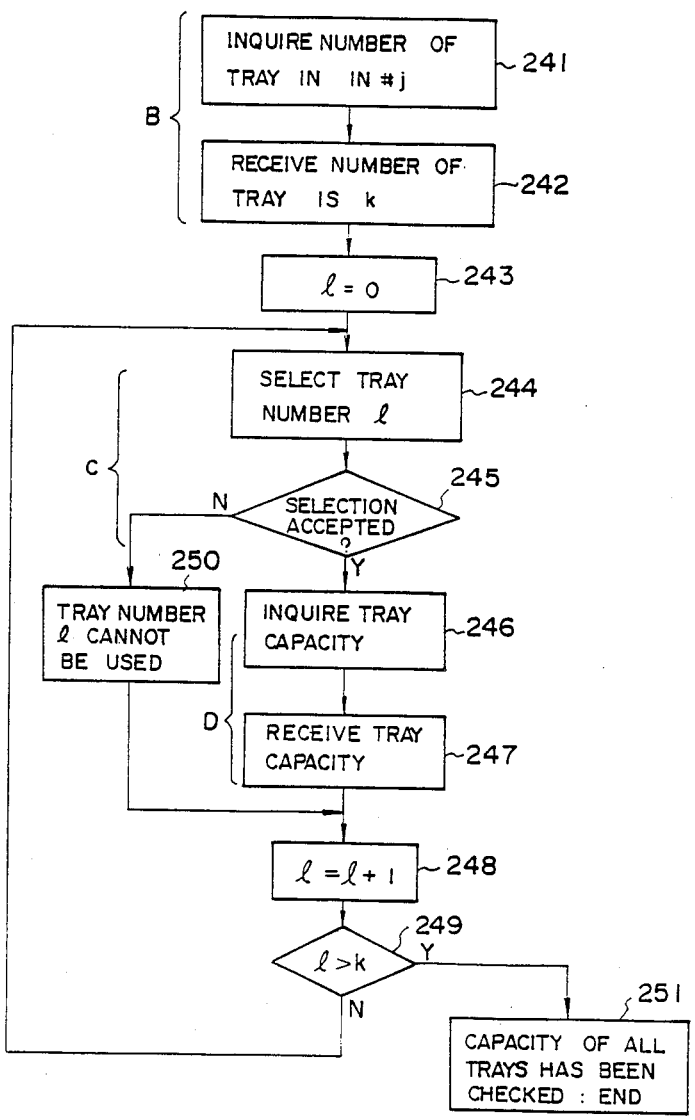

The host system 2 performs procedure A consisting of steps 205 and 206 shown in FIG. 22 in accordance with a procedure shown in FIG. 25. The host system 2 inquires of the optional input unit IN#j the number of trays through the print engine 100, by sending the command 'ENQ' (step 241). Then the host system 2 receives number of trays "k" from the optional input unit IN#j through the print engine 100 through the response to the command 'ENQ' (step 242). Then the host system 2 resets the tray number "l" to 0 (step 243), and then selects a tray having tray number "l" by sending the command 'DC1' (input tray selection) (step 244). Then the host system 2 discerns whether this selection has been accepted (step 245). When the result in step 245 is NO, the host system 2 concludes that the tray "l" cannot be used (step 250), and executes step 248. On the other hand, when the result in step 245 is YES, the host system 246 inquires of the optional input unit IN#j the quantity of the tray "l" by sending the "tray capacity of current active tray" command 'ENQ' (step 246). Then the host system 2 receives the quantity of the tray "l" (step 247). Then the host system 2 increments the tray number by +1 (step 248). Then it is determined whether l>k (step 249). When the result in step 249 is NO, the procedure returns to step 244. On the other hand, when the result in step 249 is YES, all the trays have been checked and therefore the procedure is terminated (step 251).

Figure 26A:
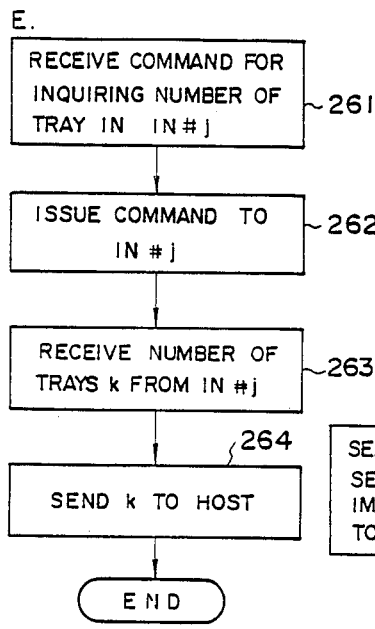

The print engine 100 operates with respect to procedure B consisting of steps 241 and 242 shown in FIG. 25 according to a procedure shown in FIG. 26A. The print engine 100 receives the "unit availability" command 'ENQ' (step 261). Then the print engine issues the "request unit availability" command "***10100" (step 262) to the optional input unit IN#j. Then the print engine 100 receives number of trays "k" by the response from the optional input unit IN#j (step 263). Then the print engine 100 sends the number of trays "k" to the host system 2 by sending the command 'ENQ' (step 264).

Figure 26B:
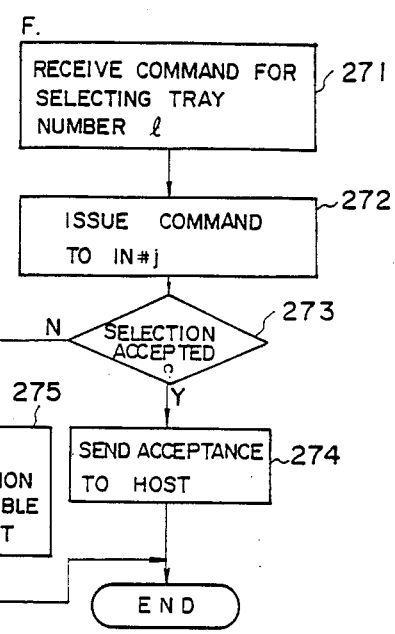

The print engine 100 operates with respect to procedure C consisting of steps 244 and 245 shown in FIG. 25 according to a procedure shown in FIG. 26B. The print engine 100 receives the "input tray selection" command 'DC1' for instructing the selection of a tray "l" (step 271). Then the print engine 100 issues the "tray selection" command "***00001" to the optional input tray IN#j (step 272). Then the print engine 100 discerns whether the present selection has been accepted by the optional input unit IN#j (step 273). When the result in step 273 is NO, the print engine 100 lets the host system 2 know that the present selection is impossible (step 275) by sending the response to the "input tray selection" command. On the other hand, when the result in step 273 is YES, the print engine 100 lets the host system 2 know that the present selection has been accepted by sending the response to the "input tray selection" command (step 274). Then the procedure is terminated.

Figure 26C:
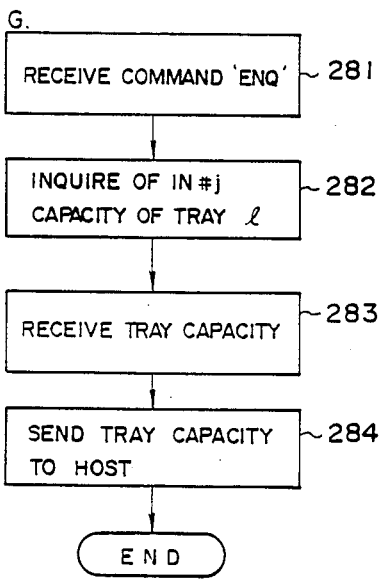

The print engine 100 operates with respect to procedure D consisting of steps 246 and 247 shown in FIG. 25 according to a procedure shown in FIG. 26C. The print engine 100 receives the "tray capacity of current active tray" command 'ENQ' from the host system 2 (step 281). Then the print engine 100 inquires of the optional input unit IN#j capacity of the tray "l" (step 282) by sending the "inquire unit specification #3" command. Then the print engine 100 receives the answer from the optional input unit IN#j (step 283) by receiving the response to the command (step 283). Then the print engine 100 lets the host system 2 know the tray capacity by sending the response to the command received in step 281.

Figure 27A:
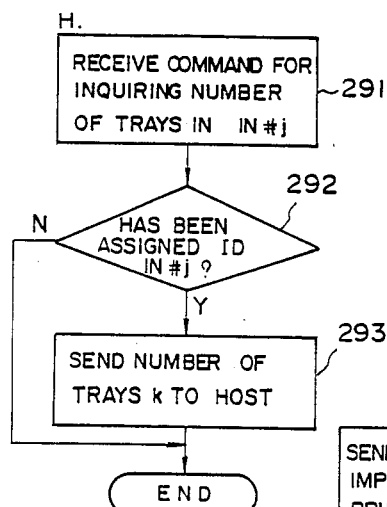

Each of the optional units operates with respect to the procedure E shown in FIG. 26A according to a procedure shown in FIG. 27A. Each optional unit receives the command which inquires capacity of the tray "l" (step 291). Then each optional unit discerns whether its own assigned logical ID code is IN#j (step 292). When the result in step 292 is NO, the procedure is terminated. On the other hand, when the result in step 292 is YES, the optional input unit of concern sends the print engine 100 the response to the command received in step 291 (step 293). Then the procedure is terminated.

Figure 27B:
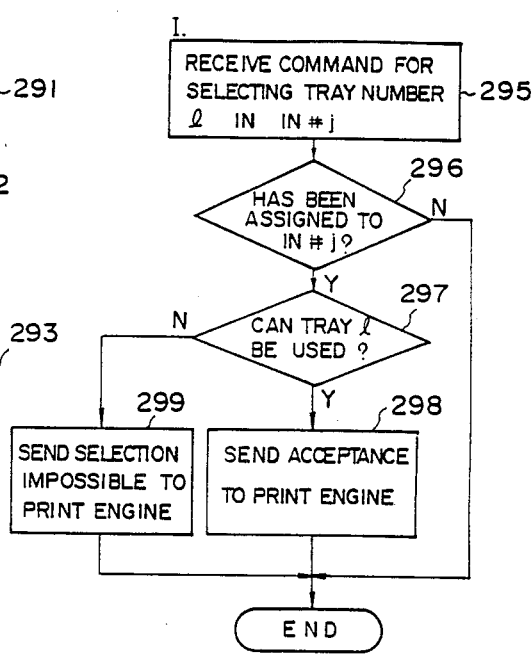

Each of the optional units operates with respect to the procedure F shown in FIG. 26B according to a procedure shown in FIG. 27B. Each optional unit receives the "input tray selection" command for instructing the selection of tray "1" (step 271). Then each optional unit discerns whether its own assigned logical ID code is IN#j (step 296). When the result in step 296 is NO, the procedure is terminated. On the other hand, when the result in step 296 is YES, the optional input unit IN#j determines whether tray "1" can be used (step 297). When the result in step 297 is YES, the optional input unit sends the print engine 100 a response which shows the tray selection has been accepted (step 298). On the other hand, when the result in step 299 is NO, the optional input unit lets IN#j the print engine 100 know that the present tray selection has failed (step 299).

Figure 27C:
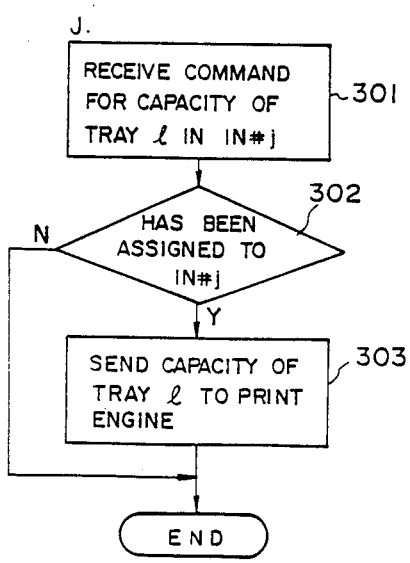

Each optional unit operates with respect to the procedure G shown in FIG. 26C according to a procedure shown in FIG. 27C. Each optional unit receives the "tray capacity of current active tray" command which inquires of the optional input unit IN#j capacity of tray "1" (step 301). Then each optional unit determines whether its own assigned logical ID code is IN#j (step 302). When the result in step 302 is NO, the procedure is terminated. On the other hand, when the result in step 302 is YES, the optional input unit of concern lets the print engine 100 know the capacity of tray "1" (step 303).

Figure 28:
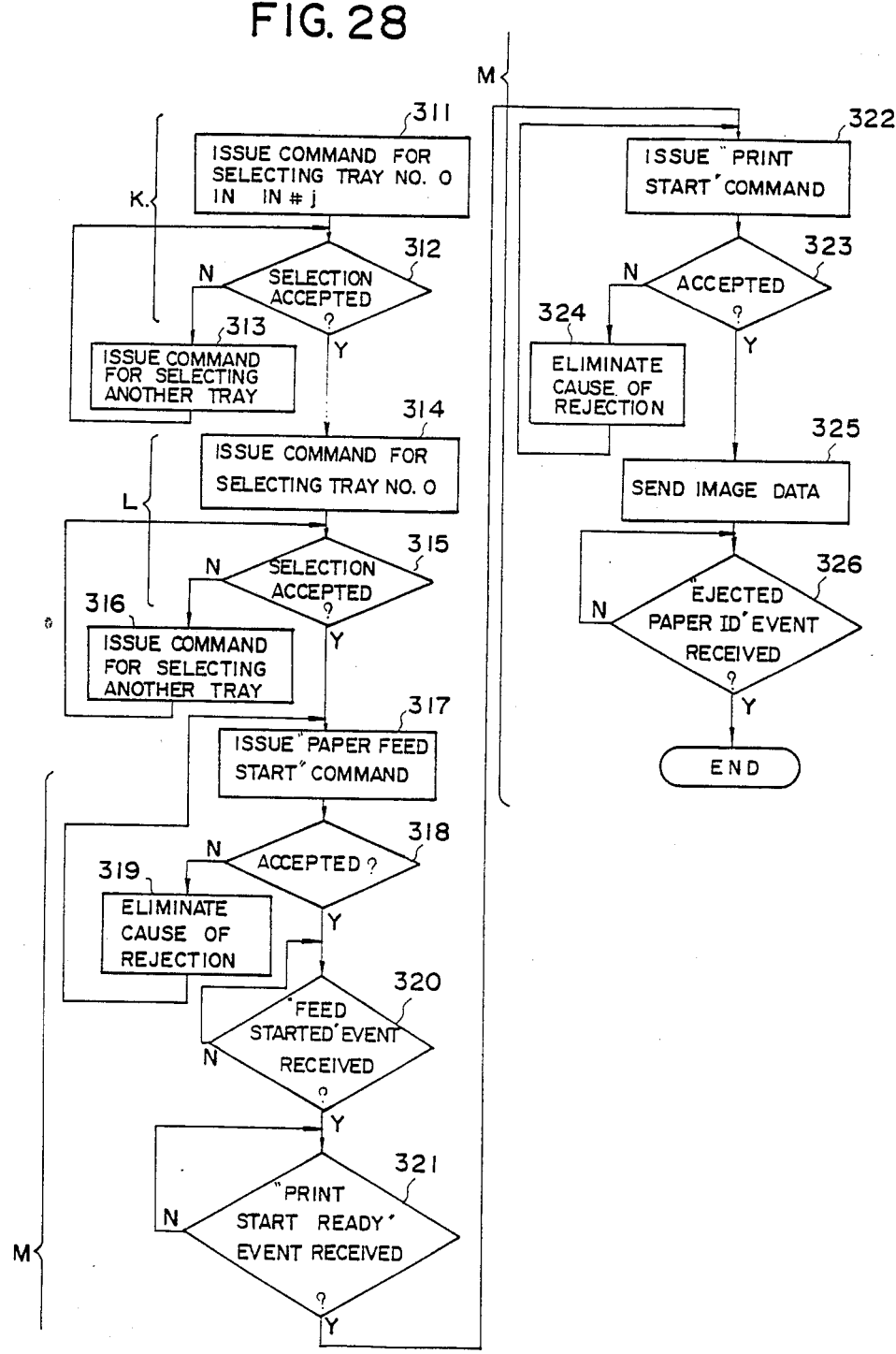

The host system 2 operates with respect to the procedures shown in FIGS. 23 and 24 in accordance with a procedure shown in FIG. 28. The host system 2 issues the "input tray selection" command which requires the tray having a tray number "0" provided in the optional input unit IN#1 (step 311). Then the host system 2 discerns whether the present selection has been accepted (step 312). When the result in step 312 is NO, the host system 2 sends the "input tray selection" which selects another tray (step 313). On the other hand, when the result in step 312 is YES, the host system 2 issues the "input tray selection" command which selects the tray having a tray number "0" provided in the duplex unit DPX#1 (step 314). Then the host system 2 discerns whether the present instruction has been accepted (step 315). When the result in step 315 is NO, the host system 2 sends the "input tray selection" command which selects another tray (step 316). On the other hand, when the result in step 315 is YES, the host system 2 issues the "feed start" command (step 317). Then the host system 2 discerns whether the present command has been accepted (step 318). When the result in step 318 is NO, the host system 2 eliminates a cause of the rejection (step 319). On the other hand, when the result in step 318 is YES, the host system 2 determines whether an event of "feed start" has been received (step 320). When the event has been received, the host system 2 determines whether an event of "print start ready" has been received (step 321). When the result in step 321 becomes YES, the host system 2 issues the "print start" command 'VT' (step 322). Then the host system determines whether this command has been accepted (step 323) from the received response to the command. When the result in step 323 is NO, the host system 2 eliminates a cause of the rejection. On the other hand, when the result in step 323 is YES, the host system 2 sends image data for image forming (step 325). Then the host system 2 determines whether an event of "ejected paper ID" has been received (step 326). When this response is received, the procedure is terminated.

The host system 2 executes procedure K consisting of steps 311 and 312 in the same manner as the procedure F shown in FIG. 26B. Similarly, the host system 2 executes procedure L consisting of steps 314 and 315 in the same manner as the procedure F shown in FIG. 26B.

Figure 29A:
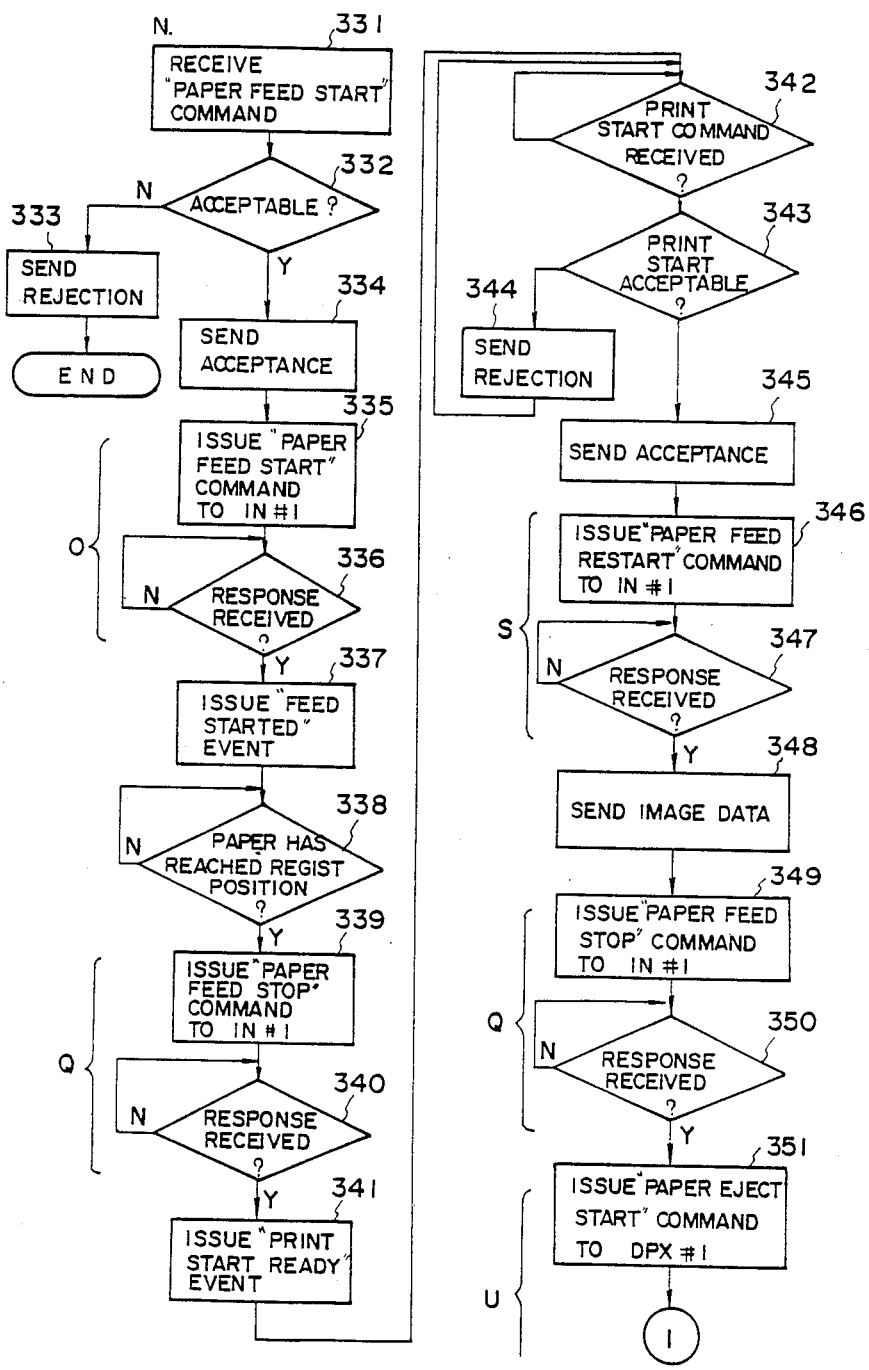
Figure 29B:
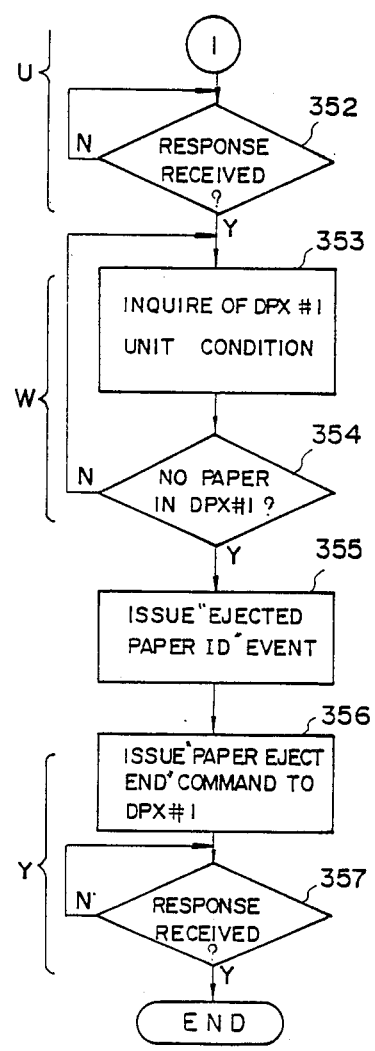
Figure 32:
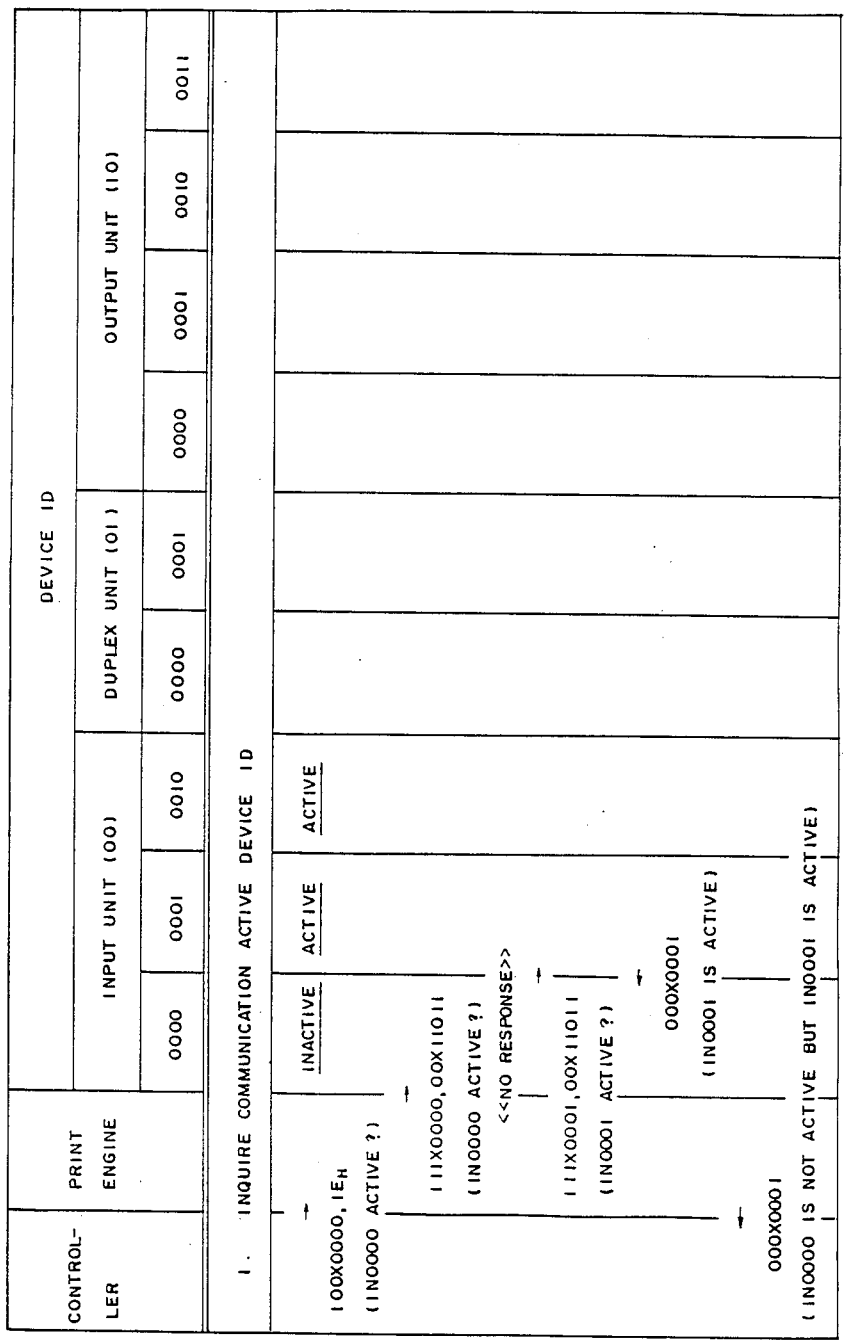
Figure 33:
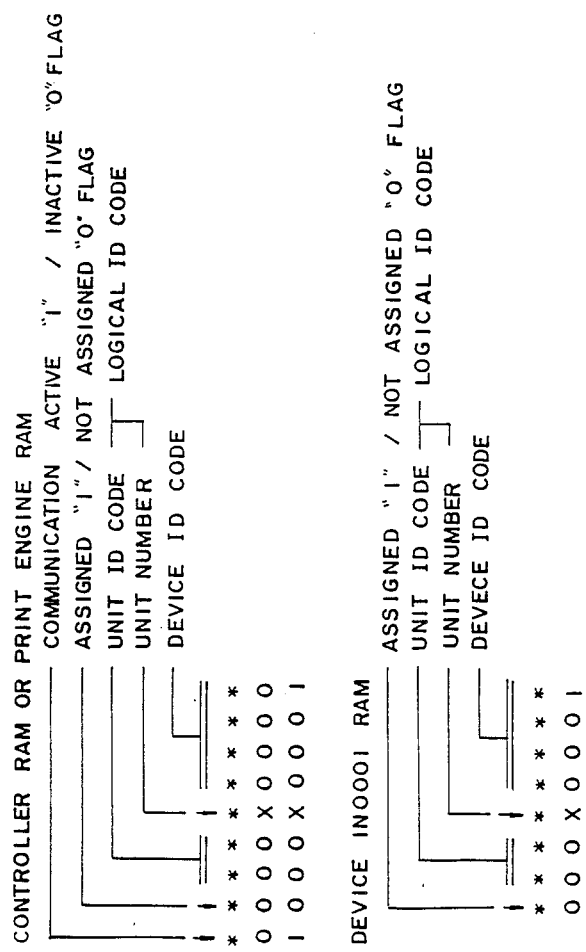
Figure 34:
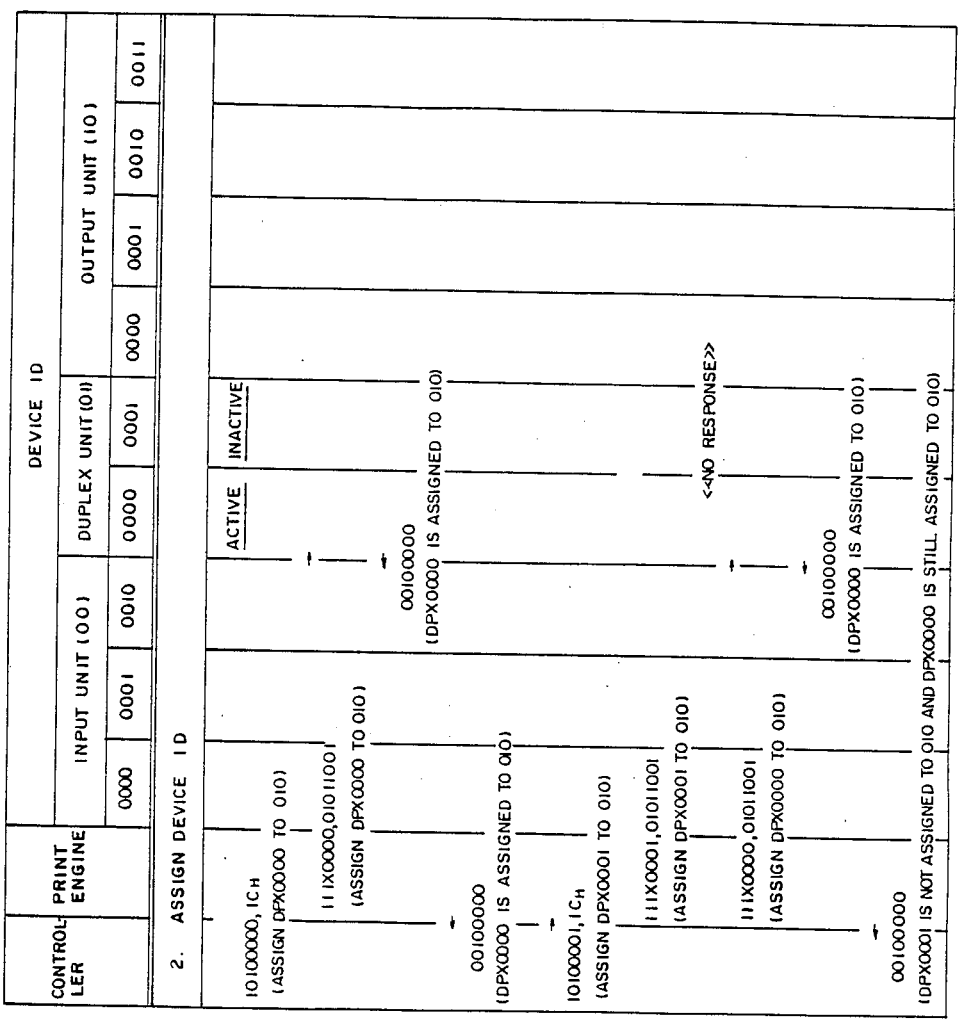
Figure 35B:
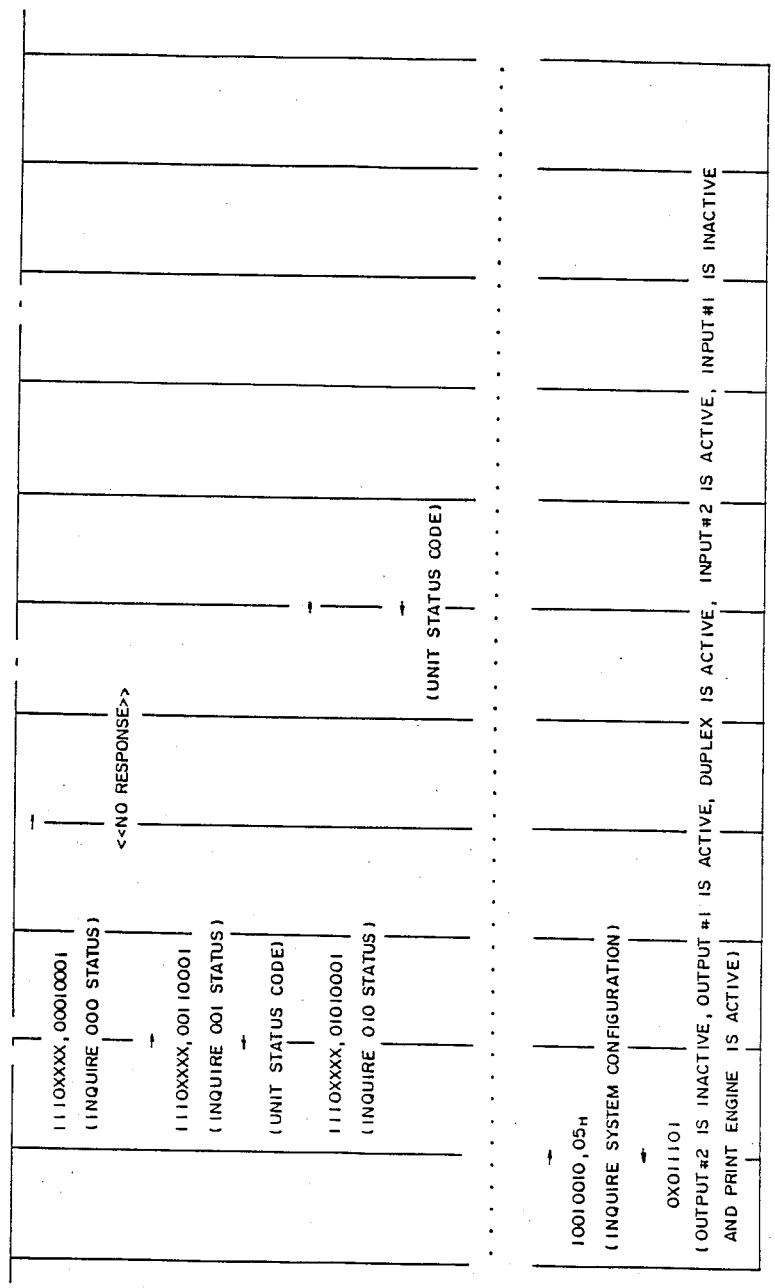
Figure 36:
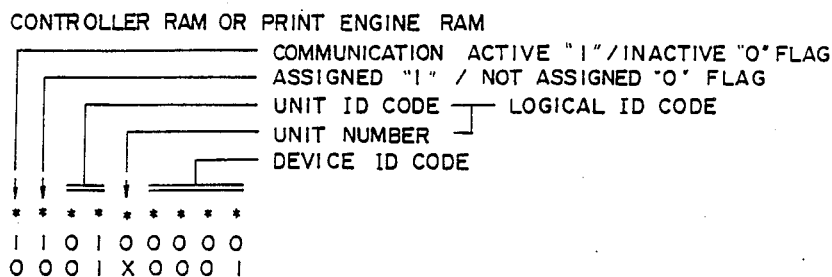
Figure 37:
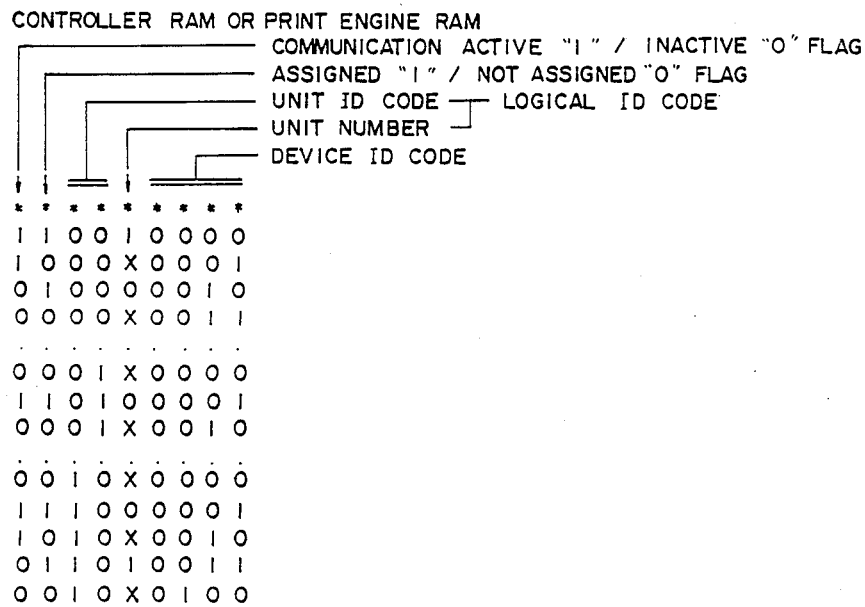

The print engine 100 operates with respect to procedure M consisting of steps 317 to 326 shown in FIG. 28 according to a procedure shown in FIGS. 29A and 29B. The print engine 100 receives the "print start" command 'FF' from the host system 2 (step 331). Then the print engine 100 discerns whether print start is possible (step 332). When the result in step 332 is NO, the print engine 100 sends the host system 100 a response which shows that the "print start" command has been rejected (step 333). On the other hand, when the result in step 332 is YES, the print engine 100 sends the host system 2 a response which shows that the instruction has been accepted (step 334). Then the print engine 100 issues the "paper feed start" command to the optional input unit IN#1 (step 335). Then the print engine 100 determines whether the response has been received (step 336). When the response has been received, the print engine issues an event of "feed start" by using the "event report" command. Then the print engine 100 discerns whether a sheet of paper has been positioned in the registration position (step 338). When the result in step 338 is YES, the print engine 100 issues the "paper feed stop" command to the optional input unit IN#1 (step 339). Then the print engine 100 discerns whether the response has been received (step 340). When the result in step 340 is YES, the print engine 100 issues an event that shows "print start ready" (step 341). Then the print engine 100 waits for the "print start" command 'VT' issued by the host system 2 (step 342). When the command has been received in step 342, the print engine 100 discerns whether print start is possible (step 343). When the result in step 343 is NO, the print engine 100 sends the host system 2 a response which shows that the instruction has been rejected (step 344). On the other hand, when the result in step 343 is YES, the print engine 100 returns to the host system 2 a response that the instruction has been accepted (step 345). Then the print system 2 issues the "paper feed restart" command to the optional input unit IN#1 (step 346). Then the print engine 100 waits for the response to the issued command (step 347). After the response has been received, the print engine 100 receives image data from the host system 2 (step 348). Thereafter, the print engine 100 issues the "paper feed stop" command to the optional input unit (step 349). Then the print engine 100 determines whether the response has been received (step 350). When the response has been received, the print engine 100 issues the "paper eject start" command to the duplex unit DPX#1 (step 351). Then the print engine 100 waits for the response (step 352 shown in FIG. 29B). When the response has been received, the print engine 100 inquires of the duplex unit DPX#1 the unit condition by sending "inquire unit condition" command (step 353). Then the print engine 100 determines whether there is no paper in the duplex unit DPX#1 (step 354). When the result in step 354 is NO, the procedure returns to step 353. Alternatively, when the result in step 354 is YES, the print engine 100 issues the "ejected paper ID" event (step 355). Then the print engine 100 issues the "paper eject end" command to the duplex unit DPX#1 (step 357). When the response to this command has been received, the procedure is terminated (step 357).

Each optional unit operates with respect to procedure O consisting of steps 335 and 336 shown in FIG. 29A according to FIG. 30A. Each optional unit receives the "paper feed start" command which is directed to the optional input unit IN#1 (step 361). Then each optional unit discerns whether its own assigned logical ID code is IN#1 (step 362). When the result in step 362 is NO, the optional units other than the optional input unit IN#1 terminate the procedure. On the other hand, when the result in step 362 is YES, the optional input unit IN#1 starts feeding paper from the tray having a tray number of "0" (step 363). Then the optional input unit IN#1 returns to the print engine 100 the response (step 364). Thereafter, the procedure is terminated.

Each optional unit operates with respect to procedure Q consisting of steps 339 and 340 or steps 349 and 350 in accordance with a procedure shown in FIG. 30B. Each optional unit receives the "paper feed stop" command which is directed to the optional input unit IN#1 (step 371). Then each optional unit discerns whether its own assigned logical ID code is IN#1 (step 372). When the result in step 372 is NO, the optional units other than the optional input unit IN#1 terminate the procedure. Adversely, when the result in step 372 is YES, the optional input unit IN#1 stops feeding paper (step 373). Then the optional input unit IN#1 sends back the response to the print engine 100 (step 374). Then the procedure is terminated.

Each optional unit operates with respect to procedure S consisting of steps 346 and 347 shown in FIG. 29A according to a procedure shown in FIG. 30C. Each optional unit receives the "paper feed restart" command which is directed to the optional input unit IN#1 (step 381). Then each optional unit discerns whether its own assigned logical ID code is IN#1 (step 382). When the result in step 382 is NO, the optional units other than the optional input unit IN#1 terminate the procedure. On the other hand, when the result in step 382 is YES, the optional input unit IN#1 restarts feeding paper (step 383). Then the optional input unit IN31 sends the response to the print engine 100 (step 384), and terminates the procedure.

Each optional unit operates with respect to procedure U steps 351 and 352 shown in FIGS. 29A and 29B in accordance with a procedure shown in FIG. 30D. Each optional unit receives the "paper eject start" command which is directed to the duplex unit DPX#1 (step 391). Then each optional unit discerns whether its own assigned logical ID is DPX#1 (step 392). When the result in step 392 is NO, the procedure is terminated. On the other hand, when the result in step 392 is YES, the duplex unit DPX#1 having the tray of a tray number of "0" starts ejecting paper (step 393). Thereafter, the duplex unit DPX#1 returns to the print engine 100 the response (step 391), and terminates the procedure.

Each optional unit operates with respect to procedure W consisting of steps 353 and 354 shown in FIG. 29B in accordance with a procedure shown in FIG. 30E. Each optional unit receives the "inquire unit condition" command which is directed to the duplex unit DPX#1 (step 401). Then each optional unit discerns whether its own assigned logical ID code is DPX#1 (step 402). When the result in step 402 is NO, the procedure is terminated. On the other hand, when the result in step 402 is YES, the duplex unit DPX#1 sends the unit condition to the print engine 100 (step 403), and terminates the procedure.

Each optional unit operates with respect to procedure Y consisting of steps 356 and 357 shown in FIG. 29B. Each optional unit receives the "paper eject end" command which is directed to the duplex unit DPX#1 (step 411). Then each optional unit discerns whether its own assigned logical ID code is DPX#1 (step 412). When the result in step 412 is NO, the procedure is terminated. Adversely, when the result in step 412 is YES, the duplex unit DPX#1 stops feeding paper (step 413), and sends the print engine 100 the response (step 414). Then the procedure is terminated.

FIGS. 31A, 31B and 31C are diagrams illustrating how commands and responses are actually sent in accordance with the aforementioned procedures related to FIGS. 22 through 25, 26A through 26C, 27A through 27C, 28, 29A and 29B, and 30A through 30F are flowcharts of the entire printer system. FIG. 31A relates to the assignment of device ID codes to logical ID codes. FIGS. 31B and 31C relate to an print operation where paper is fed from input tray #0 of the optional input unit IN#1 and is subjected to duplex printing by the duplex unit DPX#1 and is ejected through output tray #2 of the optional output unit #2. In the illustrated operation, if duplex print is not carried out, the duplex unit DPX#1 shown in the operation shown in FIG. 31B is replaced with the optional output units OUT#2. When a plurality of sheets are printed, the procedure shown in FIGS. 31B and 31C are repeatedly carried out. The printer main body can execute the procedure shown in FIG. 31A between a sequence of image forming steps and the following sequence of image forming steps.

FIGS. 32 through 38 are diagrams of examples showing how to actually use the "inquire communication active device ID" command, "assign device ID" command, "inquire assigned device ID" command, and operation results which are stored in the respective memories of the controller 21, the print engine 100 and optional units.

The present invention is not limited to the aforementioned embodiments, and variations and modifications may be made without departing from the scope of the invention.

What is claimed is:

1. An image forming system comprising:
   image forming means for receiving data from an external system and forming an image on a recording medium from said received data;
   optional units coupled to said image forming means, optional units including at least one recording medium feed unit feeding said recording medium to said image forming means, and at least one recording medium eject unit ejecting said recording medium supplied from said image forming means; and
   a serial signal line coupling said image forming means and said optional units, said serial signal line being in common with said optional units,
   said optional units having their own device identification codes,
   said image forming means including table memory means for storing logical identification codes each being assigned one of said device identification codes, and serial communication means for communicating with said optional units through said serial signal line in serial form, said logical identification codes being sent to said serial signal line through said serial communication means, each of said optional units including memory means for storing its own device identification code and said one of the logical identification codes to which said its own device identification code has been assigned, discerning means for discerning whether one of said logical identification codes sent from said image forming means is identical to its own assigned logical identification code stored in said memory means, and serial communication means for communicating with said image forming means through said serial signal line in serial form, said image forming means receiving said recording medium from one of said optional units related to one of the logical identification codes sent by said image forming means, and ejecting said recording medium to one of said optional units related to one of the logical identification codes sent by said image forming means.

2. An image forming system as claimed in claim 1, wherein each of said logical identification codes includes a first identification code identifying a unit type code of a related one of said optional units and a second identification code identifying one of the optional units of the same unit type.

3. An image forming system as claimed in claim 2, wherein each of said device identification codes includes an identification code identifying the unit type of a related one of said optional units.

4. An image forming system as claimed in claim 2, wherein each of said optional units further comprises means for inputting its own device ID code, and the input device ID code is stored in said memory means of the optional unit.

5. An image forming system as claimed in claim 1, wherein each of said logical identification codes consists of a predetermined number of bits.

6. An image forming system as claimed in claim 1, wherein each of said device identification codes consists of a predetermined number of bits.

7. An image forming system as claimed in claim 1, wherein the number of optional units which can simultaneously be controlled by said image forming means is equal to or less than the number of said optional units coupled to said image forming means.

8. An image forming system as claimed in claim 1, wherein said optional units are detachably attached to said image forming means 9. An image forming system as claimed in claim 1, wherein said optional units include at least one duplex print unit which provides a path for duplex printing.

10. An image forming system as claimed in claim 1, wherein said data supplied from said host system is image code information, and said image forming means forms said image from said image code information.

11. An image forming system as claimed in claim 1, wherein said data supplied from said host system is image information, and said image forming means forms said image from said image information.

12. An image forming system as claimed in claim 1, wherein said image forming system is a laser beam printer.

13. An image forming system as claimed in claim 1, wherein said serial signal line is an optical fiber cable.

14. An image forming system comprising:

image forming means for receiving data from an external system and forming an image on a recording medium from said received data;

optional units coupled to said image forming means, said optional units including at least one recording medium feed unit feeding said recording medium to said image forming means, and at least one recording medium eject unit ejecting said recording medium supplied from said image forming means; and a serial signal line coupling said image forming means and said optional units, said serial signal line being in common with said optional units, said optional units having their own device identification codes, said image forming means including generating means for generating a number of logical identification codes equal to the number of optional units which are coupled to said image forming means through said serial signal line, assigning means for assigning one of said device identification codes to one of said logical identification codes, table memory means for storing said logical identification codes and said device identification codes to which said related logical identification code have been assigned by said assigning means, and serial communication means for communicating with said optional units through said serial signal line in serial form, said logical identification codes being sent to said serial signal line through said serial communication means, each of said optional units including memory means for storing its own device identification code and said one of the logical identification codes to which said its own device identification code has been assigned, discerning means for discerning whether one of said logical identification codes sent from said image forming means is identical to its own assigned logical identification code stored in said memory means, and serial communication means for communicating with said image forming means through said serial signal line in serial form, said image forming means receiving said recording medium from one of said optional units related to one of the logical identification codes sent by said image forming means, and ejecting said recording medium to one of said optional units related to one of the logical identification codes sent by said image forming means.

15. An image forming system as claimed in claim 14, wherein each of said logical identification codes includes a first identification code identifying a unit type code of a related one of said optional units and a second identification code identifying one of the optional units of the same unit type.

16. An image forming system as claimed in claim 15, wherein each of said device identification codes includes an identification code identifying the unit type of a related one of said optional units.

17. An image forming system as claimed in claim 15, wherein each of said optional units further comprises means for inputting its own device ID code, and the input device ID code is stored in said memory means of the optional unit.

18. An image forming system as claimed in claim 14, wherein said image forming means further comprises discerning means for discerning whether each of said optional units is in a communication-active state before said assigning means assigns one of said device identification codes to one of said logical identification codes.

19. An image forming system as claimed in claim 18, wherein said discerning means discerns whether each of said optional units is in a communication-active state at least two times.

20. An image forming system as claimed in claim 19, wherein said image forming means further comprises means for determining, for every optional unit, whether the discernment result obtained first is identical to the discernment result obtained second and instructing said assigning means to assign one of said device identification codes to one of said logical identification codes when both the discernment results are identical to each other.

21. An image forming system as claimed in claim 14, wherein each of said logical identification codes consists of a predetermined number of bits.

22. An image forming system as claimed in claim 14, wherein each of said device identification codes consists of a predetermined number of bits.

23. An image forming system as claimed in claim 14, wherein said assigning means assigns one of said device identification codes to one of said logical identification codes in accordance with a predetermined priority.

24. An image forming system as claimed in claim 14, wherein said assigning means assigns one of said device identification codes to one of said logical identification codes starting from said at least one recording medium feed unit.

25. An image forming system as claimed in claim 14, wherein said assigning means assigns one of said device identification codes to one of said logical identification codes in accordance with a demand supplied from said external system.

26. An image forming system as claimed in claim 25, further comprising means for sequentially discerning whether each of said optional units can meet said demand supplied from said external system according to a predetermined priority and for having said assigning means assign to one of said logical identification codes device identification codes related to an optional unit which can meet said demand.

27. An image forming system as claimed in claim 14, wherein said optional units include some optional units which can simultaneously be controlled by said image forming means.

28. An image forming system as claimed in claim 14, wherein said optional units are detachably attached to said image forming means.

29. An image forming system as claimed in claim 14, wherein said optional units include at least one duplex print unit which provides a path for duplex printing.

30. An image forming system as claimed in claim 14, wherein said data supplied from said host system is image code information, and said image forming means forms said image from said image code information.

31. An image forming system as claimed in claim 14, wherein said data supplied from said host system is image information, and said image forming means forms said image from said image information.

32. An image forming system as claimed in claim 14, wherein said image forming system is a laser beam printer.

33. An image forming system as claimed in claim 14, wherein said serial signal line is an optical fiber cable.

34. An image forming system comprising:

image forming means for receiving data from an external system and forming an image on a recording medium from said received data;

optional units coupled to said image forming means, said optional units including at least one recording medium feed unit feeding said recording medium to said image forming means, and at least one recording medium eject unit ejecting said recording medium supplied from said image forming means; and a serial signal line coupling said image forming means and said optional units, said serial signal line being in common with said optional units, said optional units having their own device identification codes, said image forming means including: generating means for generating a number of logical identification codes equal to the number of optional units which are coupled to said image forming means through said serial signal line, assigning means for assigning one of said device identification codes to one of said logical identification codes, table memory means for storing said logical identification codes and said device identification codes to which said related logical identification code have been assigned by said assigned means, serial communication means for communicating with said optional units through said serial signal line in serial form, said logical identification codes being sent to said serial signal line through said serial communication means, and command generating means for generating commands which instruct desired one or more optional units to execute predetermined operations, said commands being sent to said desired one or more optional units through said serial communication means and said serial signal line, each of said optional units including:

memory means for storing its own device identification code and said one of the logical identification codes to which said its own device identification code has been assigned, discerning means for discerning whether one of said logical identification codes sent from said image forming means is identical to its own assigned logical identification code stored in said memory means, serial communication means for communicating with said image forming means through said serial signal line in serial form, and interpreting means for interpreting said commands supplied from said image forming means, said image forming means receiving said recording medium from one of said optional units related to one of the logical identification codes sent by said image forming means, and ejecting said recording medium to one of said optional units related to one of the logical identification codes sent by said image forming means, each of said optional units being controlled by said commands supplied from said image forming system.

35. An image forming system as claimed in claim 34, wherein said commands include a first type command composed of an argument and an operator, and wherein said operator includes one logical identification code of a desired one optional unit with which said image forming system wants to communicate and an instruction which is to be executed by said desired optional unit.

36. An image forming system as claimed in claim 35, wherein said image forming means sends, through said serial communication means each of said command by sending said argument first and said operator second.

37. An image forming system as claimed in claim 34, wherein said commands include a second type command composed of an argument and an operator, and said operator includes a global identification address and an instruction which is to be executed by all the optional units, and wherein when each of said optional units receives said second type command, each of said optional units executes said instruction with highest priority.

38. An image forming system as claimed in claim 37, wherein when said image forming system is required to urgently communicate with all the optional units, said command generating means generates said second type command, which is sent to all the optional units through said communication means and said serial signal line.

39. An image forming system as claimed in claim 37, wherein when power supply to said image forming system is turned on, said command generating means generates said second type command which has an instruction for instructing all the optional units to be initialized, and said generated second type command is sent to all the optional units through said serial communication means and said serial signal line.

40. An image forming system as claimed in claim 38, wherein when a fault occurs in the image forming system, said command generating means generates said second type command which has an instruction for stopping all the optional units, and the generated second type command is sent to all the optional units through said serial communication means and said serial signal line.

41. An image forming system as claimed in claim 38, wherein each of said optional units means includes means for performing a self diagnosis, and said command generating means generates said second type command which has an instruction for instructing all the optional units to execute the self diagnosis, and wherein said generated second type command is sent to all the optional units through said serial communication mean and said serial signal line.

42. An image forming system as claimed in claim 35, wherein said operator includes a predetermined number of bits.

43. An image forming system as claimed in claim 34, wherein each of said logical identification codes includes a first identification code identifying a unit type code of a related one of said optional units and a second identification code identifying one of the optional units of the same unit type.

44. An image forming system as claimed in claim 43, wherein each of said device identification codes includes an identification code identifying the unit type of a related one of said optional units.

45. An image forming system as claimed in claim 43, wherein each of said optional units further comprises means for inputting its own device ID code, and the input device ID code is stored in said memory mean of the optional unit.

46. An image forming system as claimed in claim 34, wherein said image forming means further comprises discerning means for discerning whether each of said optional units is in a communication-active state before said assigning means assigns one of said device identification codes to one of said logical identification codes.

47. An image forming system as claimed in claim 46, wherein said discerning means discerns whether each of said optional units is in a communication-active state at least two times.

48. An image forming system as claimed in claim 47, wherein said image forming means further comprises means for determining, for every optional unit, whether the discernment result obtained first is identical to the discernment result obtained second and instructing said assigning means to assign one of said logical identification codes to one of said device identification codes when both the discernment results are identical to each other.

49. An image forming system as claimed in claim 34, wherein each of said logical identification codes consists of a predetermined number of bits.

50. An image forming system as claimed in claim 34, wherein each of said device identification codes consists of a predetermined number of bits.

51. An image forming system as claimed in claim 34, wherein said assigning means assigns one of said device identification codes to one of said logical identification codes in accordance with a predetermined priority.

52. An image forming system as claimed in claim 34, wherein said assigning means assigns one of said device identification codes to one of said logical identification codes starting from said at least on recording medium feed unit.

53. An image forming system as claimed in claim 34, wherein said assigning means assigns one of said device identification codes to one of said logical identification codes in accordance with a demand supplied from said external system.

54. An image forming system as claimed in claim 53, further comprising means for sequentially discerning whether each of said optional units can meet said demand supplied from said external system according to a predetermined priority and for having said assigning means assign to one of said logical identifical codes a identification codes related to one an optional unit which can meet said demand.

55. An image forming system as claimed in claim 34, wherein the number of optional units which can be simultaneously controlled by said image forming means is equal to or less than the number of said optional units coupled to said image forming means.

56. An image forming system as claimed in claim 34, wherein said optional units are detachably attached to said image forming means.

57. An image forming system as claimed in claim 34, wherein said optional units include at least one duplex print unit which provides a path for duplex printing.

58. An image forming system as claimed in claim 34, wherein said data supplied from said host system is image code information, and said image forming means forms said image from said image code information.

59. An image forming system as claimed in claim 34, wherein said data supplied from said host system is image information, and said image forming means forms said image from said image information.

60. An image forming system as claimed in claim 34, wherein said image forming system is a laser beam printer.

61. An image forming system as claimed in claim 34, wherein said serial signal line is an optical fiber cable.

62. An image forming system as claimed in claim 34, wherein each of said optional units includes means for sending a response to each of said commands to said image forming means through said serial signal line.

* * * * *